(12) United States Patent
Fieldman

(10) Patent No.: US 11,562,657 B1
(45) Date of Patent: Jan. 24, 2023

(54) QUEUING FOR A VIDEO CONFERENCE SESSION

(71) Applicant: Study Social, Inc., Gainesville, FL (US)

(72) Inventor: Ethan Fieldman, Gainesville, FL (US)

(73) Assignee: VR-EDU INC., Gainesville, FL (US)

( * ) Notice: Subject to any disclaimer, the term of this patent is extended or adjusted under 35 U.S.C. 154(b) by 0 days.

(21) Appl. No.: 17/555,138

(22) Filed: Dec. 17, 2021

Related U.S. Application Data

(60) Provisional application No. 63/127,021, filed on Dec. 17, 2020.

(51) Int. Cl.
*G09B 5/14* (2006.01)
*H04L 12/18* (2006.01)

(52) U.S. Cl.
CPC ............ *G09B 5/14* (2013.01); *H04L 12/1822* (2013.01); *H04L 12/1827* (2013.01)

(58) Field of Classification Search
None
See application file for complete search history.

(56) References Cited

U.S. PATENT DOCUMENTS

| | | | | |
|---|---|---|---|---|
| 2004/0006595 A1* | 1/2004 | Yeh | ...................... | H04L 12/1813 709/204 |
| 2014/0171047 A1* | 6/2014 | Mai | ........................ | H04M 3/566 455/416 |
| 2015/0341442 A1* | 11/2015 | Inoue | .................. | H04L 12/1822 709/227 |
| 2016/0073056 A1* | 3/2016 | Katzman | ............. | G06F 3/04842 348/14.07 |
| 2017/0353508 A1* | 12/2017 | Yoakum | .............. | H04L 65/4038 |
| 2022/0167021 A1* | 5/2022 | French | ............. | H04N 21/25875 |

* cited by examiner

*Primary Examiner* — Hemant S Patel
(74) *Attorney, Agent, or Firm* — Polsinelli PC

(57) ABSTRACT

Provided is a means for professors and tutors to easily queue and manage students in a video conference session during online office hours or similar scenarios in which the professor gives one student one-to-one attention while other students wait their turn but are able to listen. Students queue in order of arrival, transparency is provided to students so that they know where they are in the queue relative to other students, and provides students with real-time status updates, thus reducing frustration and making the experience of waiting and queuing more psychologically palatable and pleasant. There is a current student having a one-on-one session with the professor; the rest are waiting and listening in the queue. Further, the professor need only click one button in order to place the current student at the back of the queue and bring the next student in the queue into the one-on-one session. A virtual reality room also has a queue.

3 Claims, 42 Drawing Sheets

Video Conference Session – Jessica Computer

Video Conference Sign-In Page

Video Conference
Landing Page

Video Conference Session – Professor Computer

Video Conference Session – Student Computer

*Video Conference Session – Professor Computer*

*Video Conference Session – Professor Computer*

*Video Conference Session – Jessica Computer*

*Video Conference Session – Professor Computer*

*Video Conference Session – Professor Computer*

*Video Conference Session – Professor Computer*

*Video Conference Session – Student Computer*

*Video Conference Session – Student Computer*

*Video Conference Session – Professor Computer*

*Video Conference Session – Professor Computer*

*Video Conference Session – James Computer*

*Video Conference Session – Professor Computer*

*Video Conference Session – Professor Computer*

*Video Conference Session – Professor Computer*

*Video Conference Session – Professor Computer*

*Video Conference Session – Professor Computer*

*Video Conference Session – Jessica Computer*

*Video Conference Session – Jessica Computer*

*Video Conference Session – Professor Computer*

*Video Conference Session – Professor Computer*

*Video Conference Session – Professor Computer*

*Video Conference Session – Professor Computer*

*Video Conference Session – Professor Computer*

*Video Conference Session – Student Computer*

*Video Conference Session – Professor Computer*

*Video Conference Session – Professor Computer*

*Video Conference Session – Student Computer*

*Video Conference Session – James Computer*

*Video Conference Session – Waiting Student Computer*

*Video Conference Session – Patrick Computer*

*Video Conference Session – Patrick Computer*

*Video Conference Session – Professor Computer*

*Video Conference Session – Patrick Computer*

Video Conference Session – Patrick Computer

Video Conference Session – Patrick Computer

*Video Conference Session – Professor Computer*

*Virtual Reality Session – Professor Computer*

*Virtual Reality Session – Professor Computer*

*Virtual Reality Session – Student Computer*

QUEUING FOR A VIDEO CONFERENCE SESSION

CROSS-REFERENCE TO RELATED APPLICATIONS

This application claims priority of U.S. provisional application No. 63/127,021, filed Dec. 17, 2020, entitled QUEUING FOR A VIDEO CONFERENCE SESSION.

This application is related to U.S. Pat. No. 10,540,906 entitled "Dynamic Filtering and Tagging Functionality Implemented in Collaborative, Social Online Education Networks," filed Apr. 11, 2016, U.S. Pat. No. 10,126,927 entitled "Collaborative, Social, Online Education and Whiteboard Techniques," filed Mar. 9, 2015, U.S. Pat. No. 10,515,561 entitled "Video Presentation, Digital Compositing, and Streaming Techniques Implemented Via A Computer Network," filed Sep. 27, 2018, U.S. Pat. No. 10,404,943 entitled "Bandwidth Reduction in Video Conference Group Sessions," filed Nov. 21, 2018, to U.S. Pat. No. 10,768,885 entitled "Video Conference With Shared Whiteboard and Recording," filed Apr. 23, 2019, and to U.S. provisional application No. 63/121,828, filed Dec. 4, 2020, entitled VR AND TEXTBOOK DRAWING WORLD, all of which are hereby incorporated by reference.

FIELD OF THE INVENTION

The present invention relates generally to video conferencing technology. More specifically, the present invention relates to productive and efficient queuing of participants in a video conference session.

BACKGROUND OF THE INVENTION

Historically, professors have always held office hours at colleges and universities (and so have teachers at high schools and elementary schools to a lesser extent). Typically, a professor schedules office hours for two hours a week, the students line up in the hallway and enter the professor's office one at a time in order to ask questions, receive feedback, etc. Tutors may also have similar drop-in hours in which students line up outside the tutor's office and enter one at a time. One disadvantage with this approach is that the students in the hallway cannot hear what is being said in the professor's office: each student may have the same question about a math problem from a recent examination, but, the professor must explain the same problem over and over again as each student enters.

A similar inefficiency is seen in a doctor's waiting room, for example. Many patients may be waiting in the waiting room, all with questions about flu symptoms, but only one patient at a time is allowed into the examination room with the doctor. Although there is the issue with patient privacy, much of the information that the doctor gives to these patients must be repeated to each and every patient that enters the examination room ("these are flu symptoms," "you should rest, drink fluids, etc.," and "see me again if any further symptoms such as high fever develop").

As computing devices become more ubiquitous and more mobile (e.g., laptops, mobile telephones), as professors and students choose to work remotely and even take classes remotely, and as the recent pandemic forces more professors and students to meet online, professors and students are choosing to hold office hours, tutoring sessions, etc., using video conferencing software in which the parties meet online.

Not surprisingly, the makers of video conferencing software have attempted to model their products on the historical notion of office hours, unfortunately bringing the old inefficiencies and even more importantly, introducing new inefficiencies and problems. For instance, video conferencing software (and professors) allows students to schedule online meeting times in time slots, such as 1 p.m., 1:15 p.m., 1:30 p.m., etc. Such scheduling is highly inefficient because if one student does not show up for his or her time slot the professor has nothing to do for those fifteen minutes and the next student does not know that the earlier student did not show up. Or, a student may only take two minutes and again, the professor has thirteen extra minutes. Similarly, if a professor needs eighteen minutes to explain the concept to a student, that means that the next student spends a frustrating three minutes either trying to get the professor's attention (via the conferencing software, text messages, etc.) or simply gives up and does not attend the time slot, leaving more time vacant.

Some video conferencing software uses the concept of a "waiting room" in which any waiting students are admitted to an intermediate screen and are allowed to join the video conference session with the professor when the professor admits the student. But, the students in the waiting room have no idea how many other students are in the waiting room and thus how long they might be waiting, and they certainly cannot hear what is occurring during the actual online session between the professor and another student. If each of a dozen students has the same question about a math problem on a recent examination, the professor must repeat this information a dozen times. Another problem with online appointment-based models for video conference sessions is that a student with a question on the day of the online office hours may not have enough lead time to schedule an appointment.

Further, professors have to wrestle with managing the waiting room using the video conferencing software (while he or she is trying to conduct an online meeting), listen for their landline to ring, mobile telephone or other messaging application in case a student needs to cancel a session, change a session, or is simply running late. Professors also have to worry about how to customize a message (if any) in the online waiting room and must limit the time each student has in order to squeeze everyone into the schedule. Even though scheduling software does exist, it is not well integrated with the video conferencing software and again, does not solve the problems described above that scheduling introduces.

Accordingly, improved techniques and systems are desired that improve upon existing video conferencing technology in order to provide for more efficient and productive video conferences between professors and students.

SUMMARY OF THE INVENTION

To achieve the foregoing, and in accordance with the purpose of the present invention, techniques are disclosed that promote a queue that is productive for all participants and efficient for the professor.

One advantage of the present invention is that it increases access to professors at a university, teachers in a high school, etc. More students are able to interact with professors, students will have more time online with a professor, will have their questions answered, and will learn accordingly. Not only will students benefit, but also professors who can spend less time online. Even universities, colleges, high schools, etc., will benefit from increased student and professor satisfaction.

Embodiments of the present invention provide means for professors and tutors to easily queue and manage students in a video conference session during online office hours or similar scenarios in which the professor gives one student one-to-one attention while other students wait their turn but are able to listen, as is explained below.

The invention allows students to queue in order of arrival, provides transparency to students so that they know where they are in the queue relative to other students, and provides students with real-time status updates, thus reducing frustration and making the experience of waiting and queuing more psychologically palatable and pleasant. There is a current student having a one-on-one session with the professor; the rest are waiting and listening in the queue. Further, the professor need only click one button in order to place the current student at the back of the queue and bring the next student in the queue into the one-on-one session.

The invention allows the current one-on-one student to optionally request to "go private" with the professor (who can toggle on/off this option), thus making the one-on-one session private. Or, the session may be fully viewable to other waiting students. During a private one-on-one session, a screen is displayed to the other students in the queue stating that the session is currently private along with an estimated time when done. If a private one-on-one session goes over the estimated time, the counter may run in negative numbers.

The invention allows professors to maintain a more efficient and transparent queuing system without operating a scheduling system—students are automatically put in the queue, and professors can see how many students are waiting. The professor is given an estimated time for each student so they can quickly budget and notify the queue if needed, and can broadcast to all students if there is a hard stop or if there is a need to reschedule. Estimated time may be derived from a machine learning algorithm which may calculate estimated time based upon that professor's average time with a particular student, based upon that student's average time with all professors, or using other metrics.

The professor can see student's questions as students can enter their questions when they enter the virtual queue; professors can elect to "fast track" a student, moving him or her immediately to the front and into the one-on-one session, or may enable many students to speak who have common questions.

In a first embodiment a method and system admits participants to an online video conference session.

In a second embodiment a method and system manages a queue in an online video conference session when a participant leaves.

In a third embodiment a method and system manages a queue in an online video conference session when a host advances the queue.

In a fourth embodiment a method and system unmutes a participant in an online video conference session.

In a fifth embodiment a method and system enables a private mode in an online video conference session.

In a sixth embodiment a method and system admits a new participant to an online video conference session.

In a seventh embodiment a method and system advances a participant in a queue in an online video conference session.

In an eight embodiment a method and system unmutes a participant with a similar question in an online video conference session.

In a ninth embodiment a method and system automatically closes an online video conference session.

In a tenth embodiment a method and system indicates the end of an online video conference session.

In an eleventh embodiment a method and system moves all waiting participants to a waiting room of an online video conference session.

In a twelfth embodiment a method and system enables a host and first participant to draw upon an electronic whiteboard in an online video conference session.

In a thirteenth embodiment a method and system opens a chat window exclusive to participants who are waiting to speak in an online video conference session.

In a fourteenth embodiment a method and system uploads a media file from a waiting participant in an online video conference session.

In a fifteenth embodiment a method and system admits participants to an online virtual reality conference session.

In a sixteenth embodiment a method and system records self ratings of a participant in an online video conference session.

Each of these embodiments may be implemented separately or may be combined with any other embodiment, may be implemented as a method or as a system.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Online Education System Overview

Figure 1:
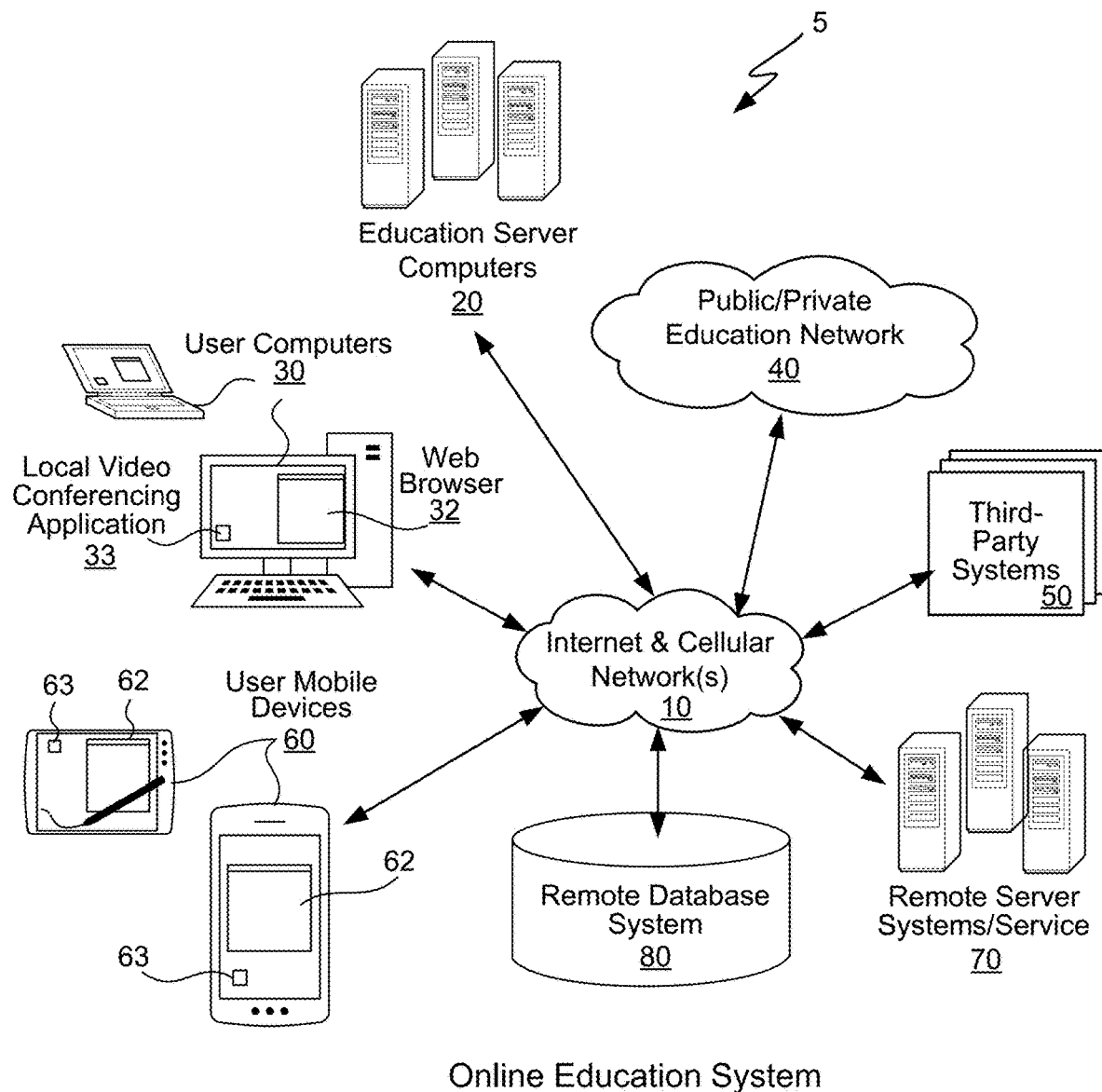
FIG. 1 is a block diagram of an Online Education System (OES), which may be implemented via a computerized data network.

FIG. 1 is a block diagram of an Online Education System (OES) 5, which may be implemented via a computerized data network. The Online Education System 5 includes any number of online education server computers (ESC) 20 that help to implement the inventive embodiments described below. Public or private education networks 40 include, for example, student information systems (SIS) and student data management networks.

Third-party systems 50 include computers and software for social networks (e.g., Facebook, Twitter, Google, etc.), online video conferencing and Web seminars (e.g., WebEx, Zoom, Microsoft Teams, Adobe Connect, Skype, etc.), Web-based video conferencing applications and tools, online virtual reality conferencing, applications and tools, and computational knowledge engines such as Wolfram Alpha, as well as the associated Web sites and databases of these third-party systems.

Remote server systems and services 70 include content provider servers and services such as media streaming, database storage and access, financial transactions, payment gateways, electronic commerce, event management, etc. Remote database systems 80 provide access to any remote database.

User computers 30 include any number of computers used by participants, students, teachers, tutors, etc., and include personal computers (PCs), desktop computers, laptop computers, set-top boxes, etc., and typically each will include a Web browser 32 to access the World Wide Web via network 10. As known in the art, a browser may download custom code (typically JavaScript) when interacting with a Web site in order to provide functionality especially for that Web site that executes within the user browser. Also included is a local video-conferencing application 33 that a user may download from a video conference service Web site to a computer in order to better participate in a video conference.

User mobile devices 60 are any number of mobile telephones, smartphones, tablet computers, personal digital assistants (PDAs), or similar devices used to communicate voice and data over a cellular, Wi-Fi or similar network, and each may also include a Web browser 62 and any number of software applications 63 (or "apps") used to perform functions on the device and over the network. A user may download an application 63 (or "app") to a mobile device (telephone, tablet computer, etc.) in order to participate in the video conference.

Typically, a user will participate in a video conference using either his or her browser (with custom code), the local application 33 which the user has downloaded, or an application 63. Internet and cellular networks 10 include the Internet and cellular networks over which the above devices and systems communicate.

Education Server Computer

Figure 2:
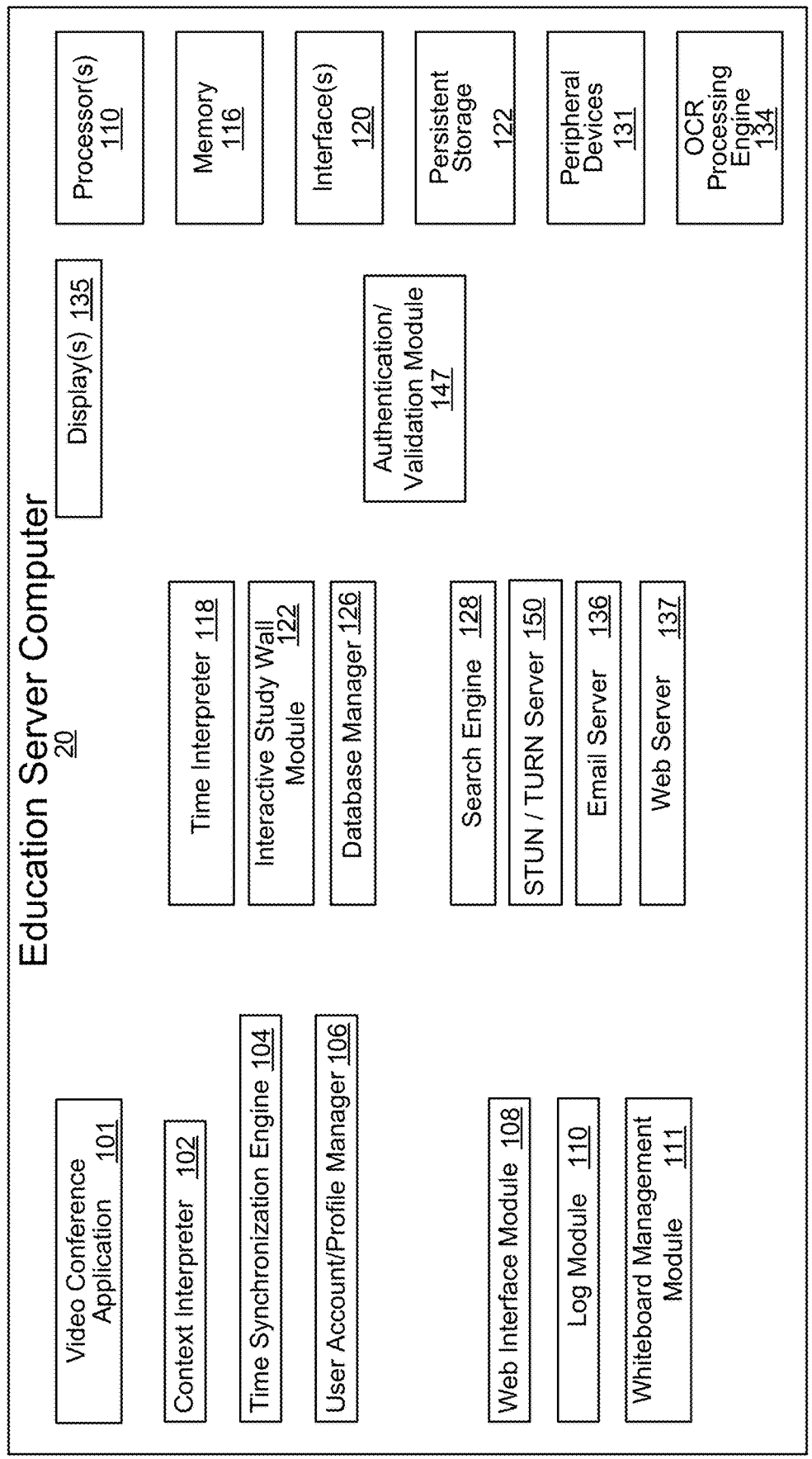
FIG. 2 is a block diagram of an education server computer that includes a number of software modules, servers and hardware as described below.

FIG. 2 is a block diagram of an online education server computer 20 that includes a number of software modules, servers and hardware as described below. As known in the art, the functionality of this computer 20 may be spread over multiple server computers.

Server computer 20 includes a video conference application 101 that implements video conferencing and virtual reality conferencing as mentioned above and as described in the below diagrams. The present invention may be used with any of a variety of online video conference services such as those available from: Zoom Video Communications Inc. ("Zoom"), Google, Inc. ("Google Hangouts," "Google Meet"), Microsoft, Inc. ("Skype," "Teams"), Cisco Systems Inc. ("WebEx Meetings"), Adobe ("Adobe Connect"), Facebook, Inc. ("Facebook Messenger"), etc., as well as online or off-line virtual-reality conference services such as those available from Engage VR, Spatial, etc.

In one particular embodiment, the present invention is used with the GoBoard video conference service available from Study Edge, LLC, which is combined with an online, shared, electronic whiteboard. The patents referenced above describe this video conference and electronic whiteboard application in greater detail.

To facilitate video conferencing, included is a STUN or TURN server 150 (or both) for facilitating communication between user computers 30 and user mobile devices 60. Server 150 is used to signal to participant computers as to who is in a video conference, their IP addresses, etc. Session Traversal Utilities for NAT (STUN) is a set of methods and a protocol for traversal of NAT gateways in real-time voice, video, messaging and other applications. STUN allows hosts to communicate and is used by other protocols such as Interactive Connectivity Establishment (ICE), the Session Initiation Protocol (SIP), or WebRTC. The protocol uses a third-party network server (STUN server) located on the public side of the NAT, usually the public Internet.

Traversal Using Relays around NAT (TURN) is a protocol that also assists in traversal NATs or firewalls for voice, video and messaging applications. Traversal Using Relay NAT (TURN) is a protocol that allows a client to obtain IP addresses and ports from relay that relays data through a server that resides on the public Internet. Although TURN almost always provides connectivity to a client, it is resource intensive for the provider of the TURN server. It is desirable to use other mechanisms (such as STUN or direct connectivity) before using a TURN server. Interactive Connectivity Establishment (ICE) methodology may be used to find the optimal connectivity means.

Typically, two WebRTC clients communicate with each other using ICE. ICE allows WebRTC to find the best path to connect peer computers. It may be able to do that with a direct connection between the clients, but also works for clients where a direct connection is not possible (i.e., behind NATs). In the case of asymmetric NAT, ICE uses STUN server 150. In most cases, a STUN server is only used during the connection setup and once that session has been established, media will flow directly between clients. If a STUN server cannot establish the connection, ICE uses TURN. A TURN server is often used in the case of a symmetric NAT. Unlike STUN, a TURN server remains in the media path after the connection has been established. Thus, it is not typically used unless data is ever to be stored or recorded.

Of course, other techniques may be used to implement the basic video conferencing services. By way of example, other than using peer-to-peer, video conferencing services may be implemented using a central server for routing audio, video and data between participant computers, such as is used by Zoom, Inc.

Server computer 20 also includes a context interpreter 102 which analyzes contextual criteria relating to a detected event or condition and automatically determines a contextually-appropriate response. Examples of contextual criteria include: location-based criteria of a client or agent device; time-based criteria; identity of user; user profile information; transaction history information; recent user activities; and location-based business-related criteria. A time synchronization engine 104 manages universal time synchronization via NTP or GPS. Time interpreter 118 may modify or change identifier activation and expiration times based on various criteria such as time, location, transaction status, etc. User account or user profile manager 106 stores user information in a suitable database of server computer 20. Web Interface module 108 manages communications and transactions with a Web portal of the ESC computer 20. Log module 110 generates and manages transactions, history logs, system errors, connections from APIs, etc. Whiteboard management module 111 implements various types of electronic whiteboard functions used by module 122 or application 101. Interactive study wall module 122 implements functions related to an online, shared, electronic study wall used by students, tutors and teachers.

Database manager 126 handles various tasks relating to database updating, database management, database access, etc. A search engine 128 searches for transactions, logs, items, accounts, etc., in the various databases. Electronic mail server 136 provides various functions relating to e-mail activities and communications. Web server 137 provides various functions relating to Web server activities and communications.

Authentication/validation module 147 performs various types of authentication/validation tasks such as authenticating devices and users, verifying passwords, SSL certificates, biometric identification information, or other security-related information, verifying activation or expiration times, etc. Module 147 may authenticate the identity of the current user or client computer. For example, the current user may be required to perform a sign in process at their computer or mobile device in order to access functionality of the ESC computer 20. OCR processing engine 134 performs optical character recognition of images such as those captured by a mobile device camera or camera of a computer.

Server computer 20 itself includes at least one processor 110, memory 116 (such as volatile memory or RAM), interfaces 118 which include wired interfaces or wireless interfaces, persistent storage 122 (such as hard disks, non-volatile memory, unalterable memory, flash drives, optical storage, etc.), peripheral devices 131 and one or more displays 135.

Begin Video Conference

As mentioned above, people find it now easier than ever to work remotely from almost any location. Working remotely also drives the use of video conferences in which two or more people hold a virtual meeting and communicate using video and audio using their own computers. Video conferences are useful for professors and students, for tutors and students, doctors and patients, virtually any online interaction where a person wishes to manage a session in which multiple people are vying for his or her time. Thus, the present invention is not only applicable to the traditional professor-student interaction but also for these other situations.

The invention may be implemented in various embodiments in software. The software may work alongside an existing video conference platform (e.g., Zoom, Microsoft Teams, etc.) such that the user need not manually download any external or additional software in order to use the invention. The invention may include numerous API calls so that other platforms can incorporate the invention into their existing ecosystem. As described below, the invention may execute in an application on a Web server computer (where a participant accesses the platform via a Web browser), may execute in a local application of a platform that a participant downloads to his or her computer, may execute in a local application which has been modified by the installation of a custom plug-in function, may execute in a custom local application that a developer has modified using an SDK of a platform, and may even execute using a combination of these techniques, for example where a professor uses a downloaded local application and a student accesses the platform via a Web browser. In the example implementation below using the GoBoard service, reference is made to application 101 that performs the functionality of the invention, although one of skill in the art will be able to implement this functionality in a local application, in a plug-in function, using an SDK, in a mobile "app", etc.

The below describes how a video conference session is begun between multiple participants using the GoBoard service. Of course, the participants may be using any other suitable video conferencing software or service (such as those mentioned above) in order to hold the session. Access to GoBoard is via the link "www.goboard.com" and in one embodiment requires no explicit downloading of software manually by a user to a desktop or laptop computer (although the application 101 may download JavaScript code to the participant's browser for use in implementing various of the steps described below). In another embodiment, a user downloads local application software from application 101 to his or her computing device. Thus, a GoBoard video conference is able to run on different platforms: a browser version available via the Internet from any computer browser (requiring no software to be downloaded by the user), a version running on a local application (the "GoBoard App") which the user typically downloads to a tablet computer or mobile device, a local application downloaded to his or her desktop or laptop computer, all versions which access the video conference application 101.

GoBoard works well with an iPad tablet computer, an Apple digital pen and the GoBoard App. A Google Chrome browser is best (if on a desktop computer) along with at least 5 Mbps internet download speed. The following figures show embodiments of the present invention being used with the GoBoard online service, although use of the invention with GoBoard in particular is not required.

In the browser version, a participant (e.g., a tutor, a student, worker, individual, or other user) accesses the video conference application 101 using his or her computer. Using GoBoard as an example, a participant using a desktop computer connects to the Web site "https://goboard.com" using a browser; this opens a link from the participant computer or mobile device to application 101 on server computer 20. Application 101 downloads JavaScript code to implement (within the user's browser) the functionality of a WebRTC connection for audio and video conferencing, and optionally to operate a shared electronic whiteboard. Within this whiteboard, users can share text, shapes, images, and other media objects in real time.

If using another video conference service, the participant opens that service as appropriate which may then implement embodiments of the present invention herein described. In one embodiment, each participant computing device implements WebRTC which is a real-time peer-to-peer communication platform for sharing video streams and audio streams between participant computers. Other similar peer-to-peer communication platforms may also be used as well as a central server communication platform to share video, audio and data.

Figure 3A:
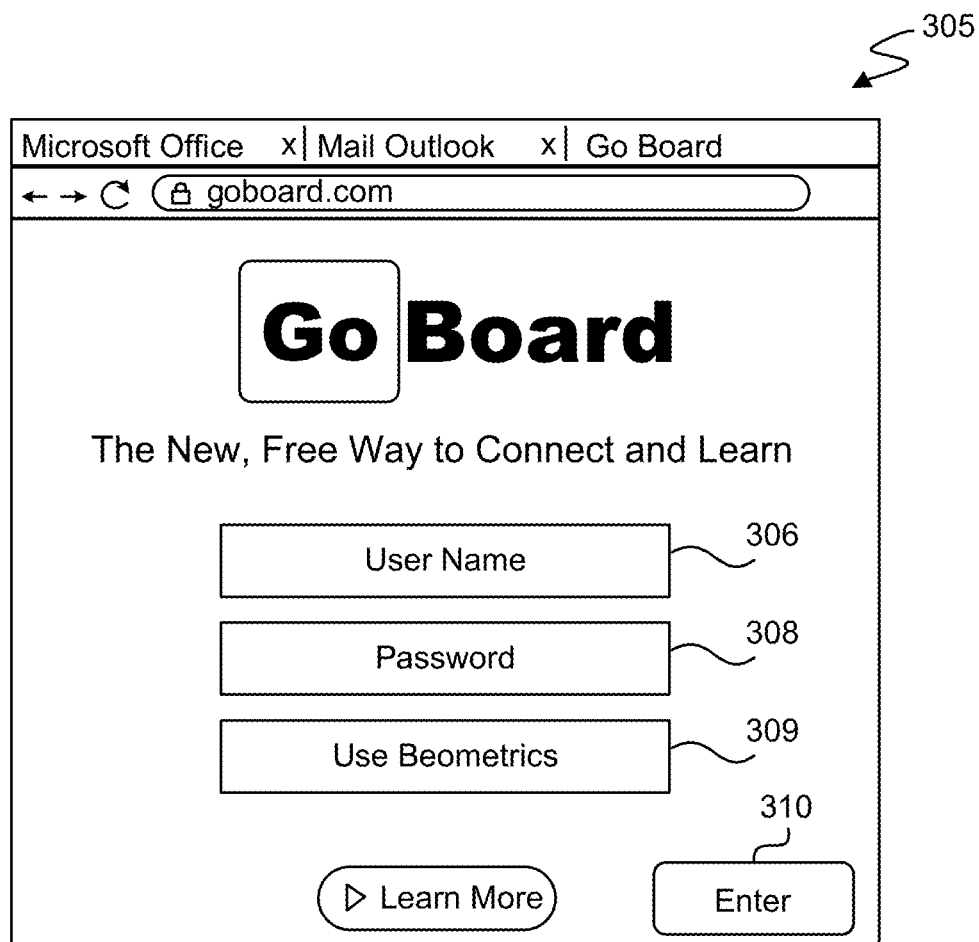
FIG. 3A illustrates the GoBoard sign-in page that appears once a participant accesses application 101.

FIG. 3A illustrates the GoBoard sign-in page 305 that appears once a participant accesses application 101. A participant may identify himself or herself by either entering a user name 306 and a password 308 or by using biometric information 309. If choosing to use a user name and password, the participant enters that information, presses Enter 310, and the application 101 will assume that the information entered is sufficient to uniquely and accurately identify the participant. Application 101 may then assign that participant a unique identifier for use during implementation of this invention. Alternatively, the user may press Use Biometrics 309 and will then be prompted to enter any of a variety of biometric information such as a retinal scan, a finger or thumb print, a sample of speech for voice recognition. The mechanisms by which biometric information may be entered by a user into a computer and how that biometric information is processed to uniquely identify a user are known to those of skill in the art. Once the participant identity is verified application 101 then assigns that participant a unique identifier.

Figure 3B:
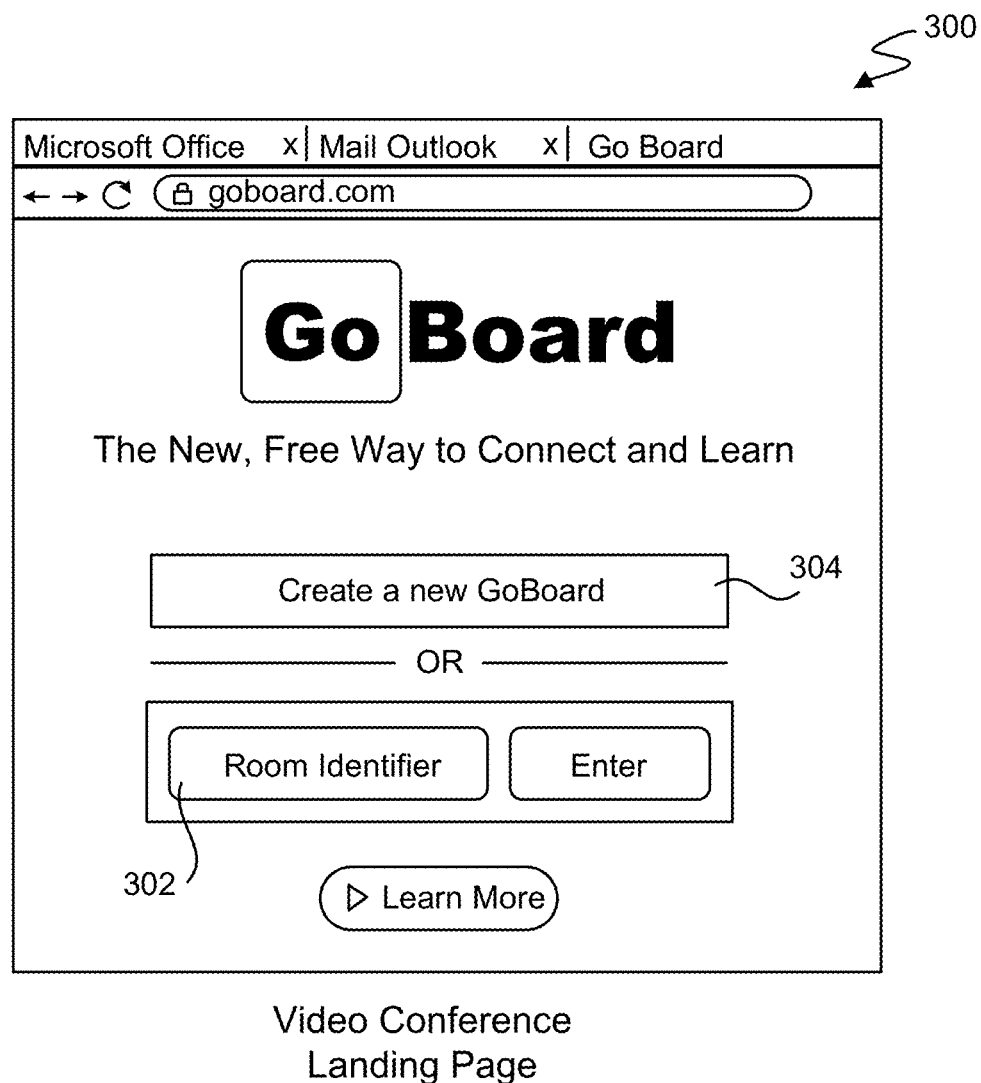
FIG. 3B illustrates the GoBoard landing page that appears once the participant has accessed the application.

FIG. 3B illustrates the GoBoard landing page 300 that appears once the participant has verified their identity above. A participant may enter an existing GoBoard room identifier at 302 in order to join an existing session (i.e., a session that has already been started by another participant) or may click upon button 304 in order to start a new session in which the participant will be the first one to join. Any institution may also choose to create room identifiers ahead of time for each person, e.g., "university.goboard.com/abc123," where "abc123" is a student identification number to allow each student to hold a conference with a tutor (or others) and to save work within a single session. Or, an institution may create room identifiers for particular projects and allow individuals to join those sessions identified by those identifiers. Application 101 may also provide a URL link to a participant by which other participants may join.

Application 101 may keep track of whether a participant is a host of a session (i.e., a tutor, instructor, teacher, chairman in charge of the meeting, etc.) in a user account (or user profile) database managed by profile manager 106. The user account database may keep track of information such as the user name, e-mail address of the user, institution, a user PIN, birth date, telephone number, biographic information, geolocation information, IP address of current computing device being used, user security questions, user-specific settings, etc.

In general, a variety of techniques may be used to identify who is the host of the session or who has which role. In a first technique, all participants join a session as equals and each has a button or selection available on his or her computer screen that says "Host." When someone wishes to take charge of the session and answer questions from others, he or she presses that button and this sends a signal to application 101 indicating that that person will now be the host and the others will be in the queue. The others are ordered in the queue in the order in which they originally joined the session, although other default means may also be used. In the virtual reality embodiment described below, the participant presses the "Host" button on the virtual tablet computer in front of them.

In a second technique, application 101 can access a third-party Student Information System (SIS) of a school district in order to determine, based upon how each participant logged in, who is a teacher and who is a student. In other words, when each participant logs in (into a computer, tablet, VR headset, etc.) the SIS will know who is the teacher (or professor) and who are the students.

In a third technique each participant has a "Host" button on their computer screen (or virtual reality tablet) but pressing this button pops up a window which requires a password. Only one teacher or professor within a session will be given this password off-line, a priori, so that that person may then assume the role of host.

Figure 4:
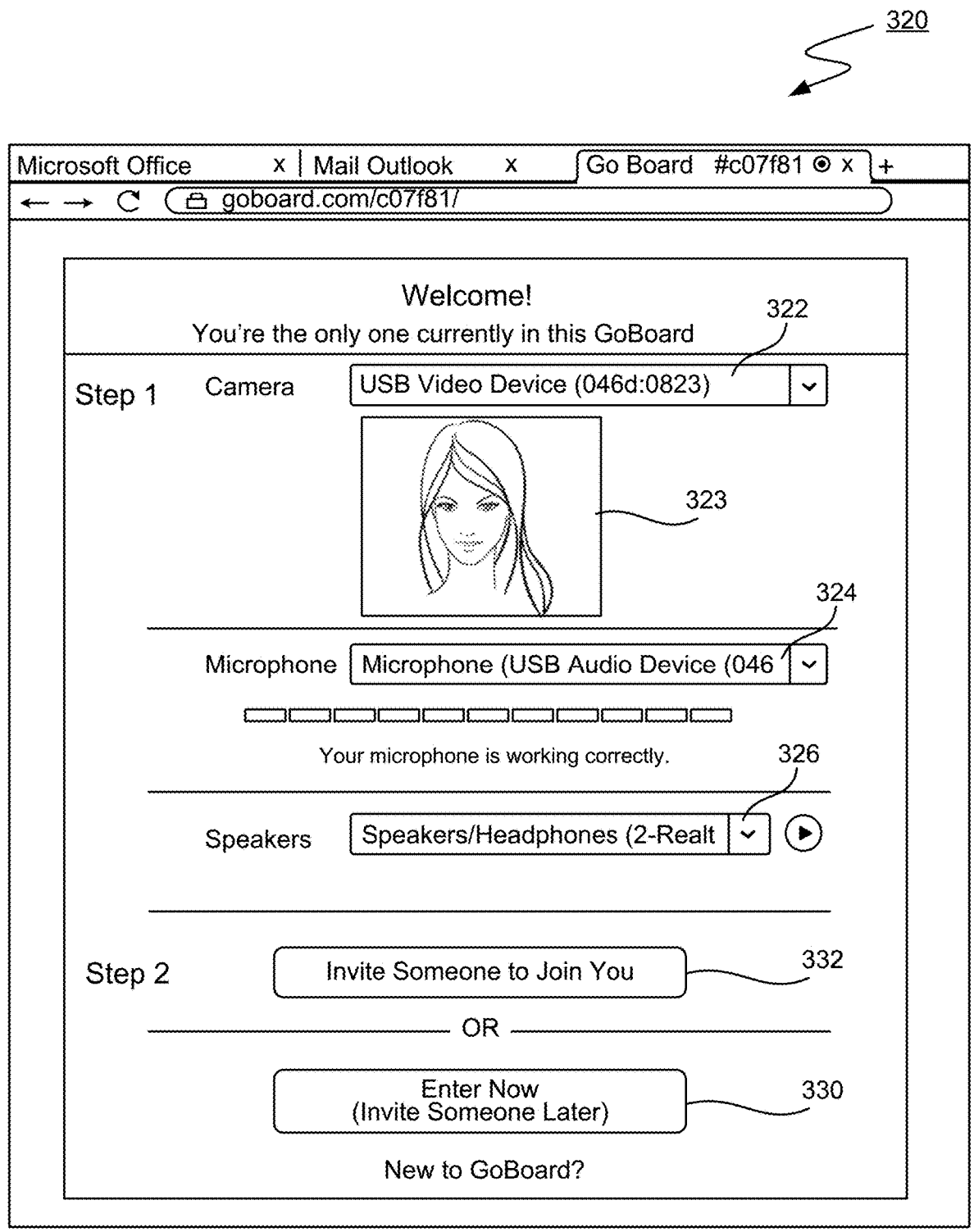
FIG. 4 shows a welcome screen on the participant's computing device that shows two steps.

FIG. 4 shows a welcome screen 320 on the participant's computing device that shows two steps. Display 322 indicates which particular camera is enabled on the participant computer; window 323 displays a live video image of the participant taken using the camera on his or her computer; 324 indicates which particular microphone is enabled on the participant computer; and 326 indicates which particular speakers are enabled on the participant computer.

The first step is to enable input and output. A participant may click upon 322 in order to enable any camera installed on his or her computing device. The camera enabled by the user on his or her computer may not necessarily be a front-facing camera that is typically filming the user in front of the computer, but may also be a rear-facing camera (such as found on a mobile telephone), or other camera connected to the device that the user enables. It is the video from this enabled camera that will be sent as a video stream to the devices of the other participants. The participant may also click upon 324 in order to enable any microphone on his or her computer, and click upon 326 in order to enable any speakers on his or her computer.

Once a participant has enabled his camera, microphone and speakers, this information will be stored on the participant computer, be sent to the computers of all other participants, and may also be sent to application 101 on server computer 20. This information is stored by the browser (Google Chrome or Firefox, for example) in local storage, typically a local cache on the user's computer that the browser can read, stored in the local application, or in the mobile "app". Information such as the status of each user's camera, microphone and speakers, as well as their role, is stored here. Additional information like name, e-mail address, IP address, and network connection information may also be stored in these locations.

The second step is to invite another or join a session. The participant may click upon 330 in order to enter a session (indicated from the room identifier entered at 302 or a new session previously indicated at 304), or may click on 332 in order to invite another participant to join this session. Thus, the participant may choose option 330 in order to immediately enter a session identified earlier in FIG. 3B (by entering a room identifier or creating a new session). Once this option is chosen, conference application 101 allows the participant to join or creates the online video conference session (and optionally the shared electronic whiteboard) and provides the session with a URL (such as "https://goboard.com/abc123") and then displays the session on the participant screen as will be explained below. Video conferencing capability using a suitable peer-to-peer communication platform is thus enabled on the participant computer. As mentioned earlier, a central server communication platform may also be used.

Figure 5:
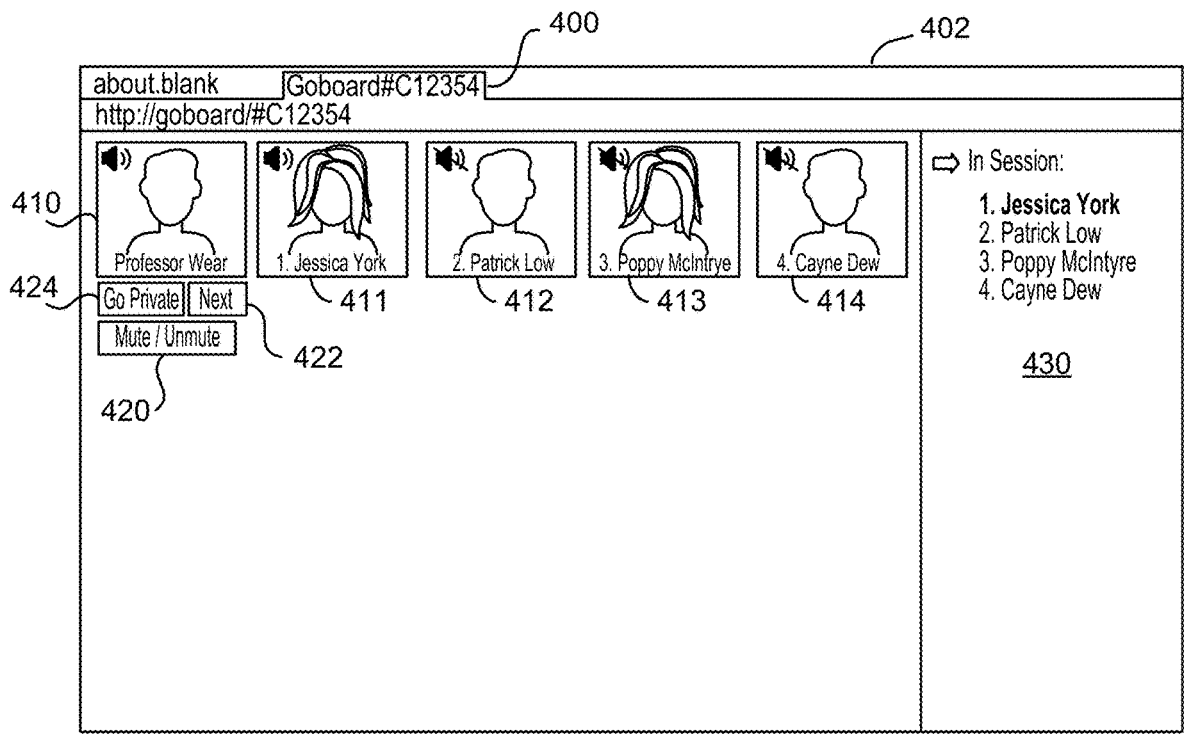
FIG. 5 illustrates a session of a video conference in the browser of the professor computer

If option 332 is chosen, then application 101 displays on the participant computer a screen to invite another user. Included is a link to the current session, e.g., "goboard.com/c07f81" (either the room identifier entered or the identifier of the new room), which may be copied, sent in an e-mail message, sent via a third-party service (e.g., Facebook Message), etc. Once the second user receives the link, he or she clicks upon the link to join the first participant, as is shown in FIG. 5. The steps of FIG. 4 are optional if a participant has enabled by default his or her camera, microphone and speakers, such as by changing settings or a profile in the GoBoard service, or by using defaults of their computing device. In these scenarios, FIG. 4 does not appear and a participant is admitted immediately to a session after signing in.

If the original participant is using a tablet or mobile device and wishes to download the application (or "app") in order to use the videoconferencing service he or she downloads the application using known techniques. The participant then clicks upon and executes the GoBoard App. If the participant is using the GoBoard App on a tablet computer or mobile device he or she may still use WebRTC. In other words, WebRTC is not always browser based; it can be operated from within a mobile telephone and from within any type of application—browser, mobile application, desktop application or otherwise.

Typically, before a participant joins a session, information concerning the participant and his or her computer is sent from the computer to the STUN server 150 in server computer 20. This information, termed "participant metadata," includes the role of the participant (e.g., host, participant, student, tutor, etc.), and stream information such as network parameters, etc., that will allow other computers to establish video and audio streams with the participant's computer. The STUN server receives comprehensive network information for each connection between the peer devices including network address, port, network routing information and timestamp of last successful connection. It stores this data in a local database or file-based cache storage. Some may also be stored in memory (e.g., RAM).

A typical STUN server 150 stores such participant metadata in a memory cache for later distribution to other participants. The role of server 150 is general participant tracking and identification of participants. Server 150 does not send or receive video or audio streams to or from participants; it simply informs all participants which other participants are in the current session. Thus, server 150 uses very little bandwidth. In another embodiment a central server on computer 20 does receive video or audio streams from participants and distributes these streams to the other participants.

Students Join Session

FIG. 5 illustrates a session 400 of a video conference in the browser 402 of the professor computer. The Web site and unique room identifier appear in the address bar of the browser. Shown is a video box 410 having a video image of the host, a professor, taken via the camera of his or her computer. Video image 410 of the professor may also be a still image, as may any of the other video images of the students. An icon over the professor image indicates that the professor's voice is currently not muted.

Button 420 enables or disables his microphone, button 422 enables the next student and button 424 enables private mode with the current student. Although not shown, a button allows the professor to enable or disable his or her device camera, and another button enables or disables sharing. The following (among other) information may be shared: a portion of the presenter's computer display screen; a particular window on that screen (e.g., an application executing); a file or document of an application; the entire display screen (the "desktop"); the whiteboard of the GoBoard; video from another camera attached to the participant's computer; etc., all being generally referred to as "shared content." These buttons 420-424 (once a user has signed in and joined), and others, typically appear below the video box on the computer corresponding to the image captured by the camera of that computer or may be superimposed on the video box. E.g., browser 402 shows the buttons below the professor because this is the computer of the professor who is sitting in front of the computer and camera.

Also shown on the professor computer in browser 402 are video boxes 411-414, each having a video image (or still image) of a student in the video conference in a gallery view. Each of the other computers being used by these students will also have a similar screen as in session 400, although different buttons may appear below the computer owner's image and a student may not have the same buttons as the professor. Shown is a window 430 indicating the order of students waiting to speak with the professor. Jessica is first in line and is currently speaking with the professor, students Patrick, Poppy and Cayne are second, third and fourth, respectively. Further, as mentioned above, each student may be accessing the video conference using a browser, a local application on a computer, or an application ("app") that has been downloaded to a mobile device; thus, the screen of each student computer may appear differently than that of the professor who is using a browser on a desktop computer.

In this example, shown is a view on the professor's computer showing the professor image 410 in the top left corner and the video boxes 411-414 of the students in order, across the top from left to right and also extending down the right-hand edge, if needed. Of course, other arrangements are possible and it is not strictly necessary that the video boxes appear in any particular order, nor be numbered. Even window 430 is optional.

The professor has the ability to mute and un-mute his audio, as does the first student. Each of the second, third and fourth students (and subsequent) has an icon superimposed on their image indicating that they are currently muted and each cannot undo this. As shown, there is no waiting room in this session; all the students who have joined the session are in the session with the professor.

Figure 6:
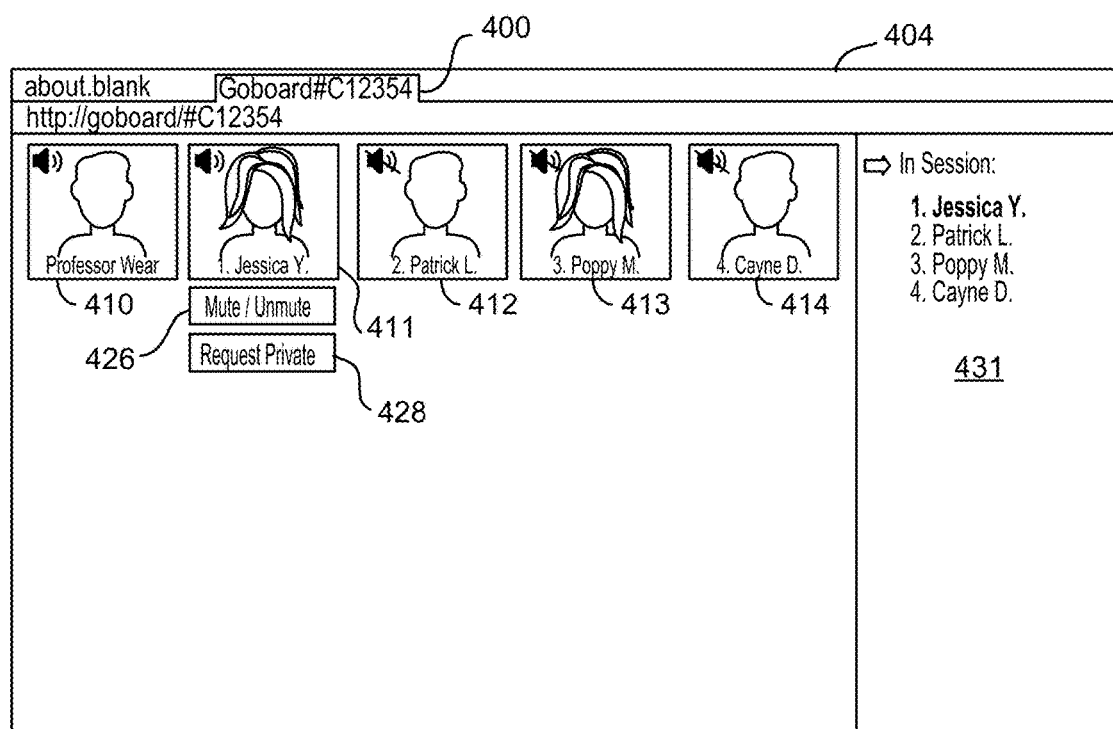
FIG. 6 illustrates session of the video conference in a browser of the student Jessica computer.

FIG. 6 illustrates session 400 of the video conference in a browser 404 of the student Jessica computer. Jessica has button 426 enabling her to mute or un-mute her audio, and button 428 to request a private session with the professor. The view from the computers of students Patrick, Poppy and Cayne shows the same session except that each of these has no mute/un-mute button and cannot un-mute their audio on their own, and do not have a Request Private button.

Figure 7:
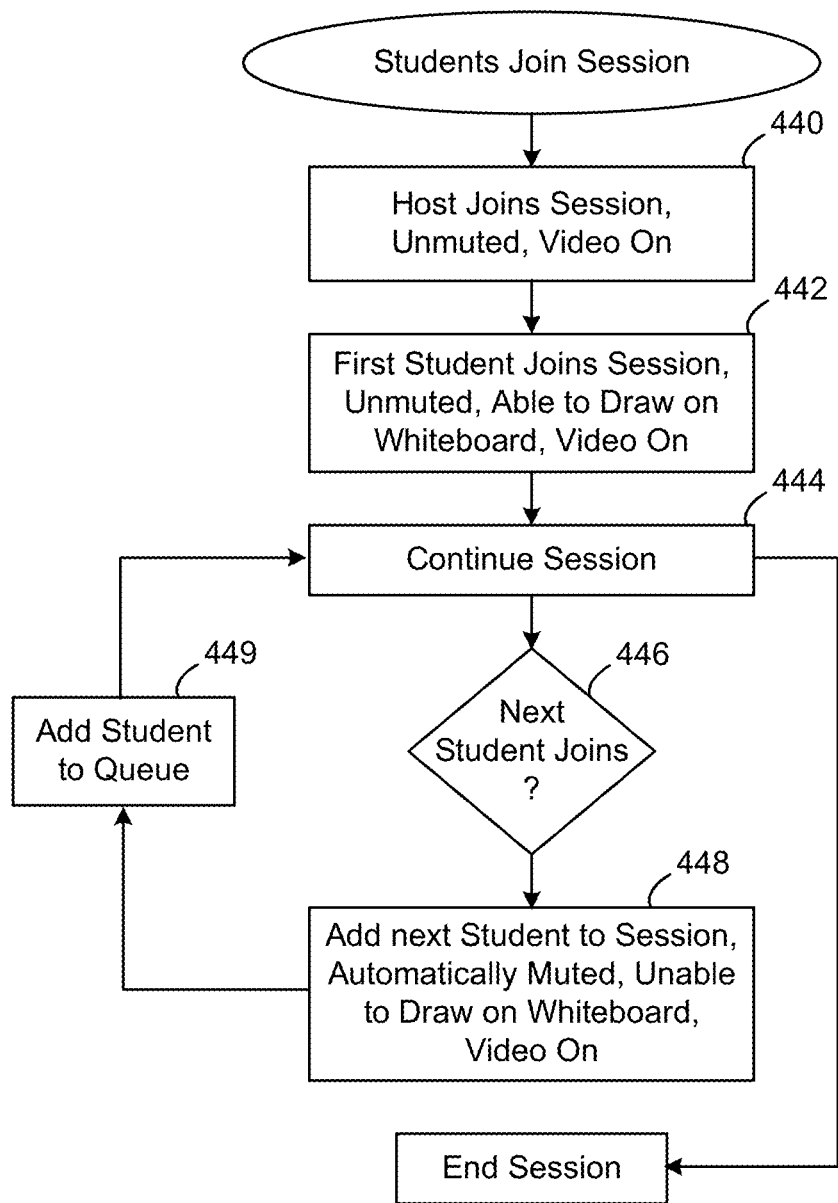
FIG. 7 is a flow diagram describing one embodiment by which a professor and students join a video conference session.

FIG. 7 is a flow diagram describing one embodiment by which a professor and students join a video conference session. Reference will be made to FIGS. 5 and 6. In a step 440 the host joins the video conference session and his or her audio is un-muted and the video is on. It is also possible that the audio is muted and that video is off when the host first joins, but the host has the option at any time to toggle 420 their audio, turn their video feed on or off, or draw upon any whiteboard that is used. In the examples herein, the host is shown to be a professor as the invention lends itself well to a video conference session between a professor and students, although the host may be any teacher, tutor, consultant, group leader, or any person that decides to make use of the queuing functionality of the present invention. It is also not required that the professor be the first person to join the session; even if the professor joins after one or more of the students have joined, the professor will still be the host, will be able to mute or un-mute his audio, toggle his video feed on or off, and take advantage of the host options as described below.

In a step 442 the first student (that is, the first person to join the session that is not the host) joins the session and his or her audio is not muted, his or her video is on and he or she has the ability to draw upon any whiteboard that is used, such as is shown in FIGS. 5 and 6. Similar to the professor, it is possible that his or her audio is muted and his or her video is off when the first student joins, but this first student does have the option to toggle 426 their audio, and to turn the video feed on or off (subject to any restrictions placed by the professor as described below). In the examples herein, the other participants are shown to be students, although these participants may be any suitable group (corresponding to the host) wishing to form a queue in order to speak with the host. The student who is currently first in line (e.g., Jessica, in video box 411) and is having the one-on-one session with the professor, and who has an un-muted microphone, is referred to as the "spotlight" student. As explained further below, there may be more than one spotlight student.

In a step 444 the session continues and the professor and spotlight student may converse, and more students may continue to join. If, in step 446, it is detected that another student has joined the session then control moves to step 448 otherwise control remains at step 444.

In step 448 the next student (Patrick) has joined the session and he is immediately placed into session 400, appears in the box 412, is able to hear both the professor and the spotlight student, but his audio is muted and he is unable to draw on any whiteboard that is being used. Application 101 mutes the audio feed from these waiting students by sending a command to the student computer to mute that student's audio as is known in the art. Basically, this command is a mute override because the student is then unable to enable their own audio. If, however, the student's audio is enabled, he or she is able to mute themselves.

He is also unable to un-mute his microphone and may not be able to toggle his video feed on or off if the professor has enabled restrictions as described below. Once joined, in step 449 application 101 adds this next student to the queue in order of arrival, that is, a first in first out scheme. In a preferred embodiment, subsequent students joining in step 446 will have their video off, may not enable it, and will automatically have it turned on when he or she becomes the spotlight student.

Application 101 keeps track of this queue in step 449 and the order of the students and may represent the queue graphically within session 400. By way of example, the students may simply be ordered as shown, from left to right in order of their arrival, may have a numeral superimposed on their image indicating their place in the queue, or window 430 may be used showing the queue via text, via numerals, or graphically. By showing the queue visually on screen, each student can immediately see their place in line and can choose whether to remain in the queue or come back at a later time. In a virtual-reality embodiment the avatars may appear in order in the virtual-reality room, or, each avatar has associated with it a number such as floating above the avatar, below it, or on its body, in order to signify the queue order.

The session then continues at step 444 with the professor and spotlight student conversing and Patrick simply listening and watching. Accordingly, the other students Poppy and Cayne join the session in steps 446-449 and are placed in the queue in order as shown, their microphones are automatically muted but they may watch and to listen to the professor and the spotlight student conversing in step 444. At some point, the session may end as shown.

While in the session (or meeting room), the other students can view and hear what is occurring between the professor and the spotlight student, but they are unable to contribute directly (for example, by asking questions which would distract from the session that is occurring). These other students in the meeting room have their microphones muted and may have their videos off by default. In other embodiments described below, the professor has the option to turn on or off the microphones and video of all students who are waiting to speak. The students are automatically placed in the queue and are ordered by the time they join the meeting room, i.e., as each student joins, he or she is placed at the back of the line. In this example, Cayne was the last to join and is shown at the end of the queue in video box 414.

In addition, students can see who else is in the meeting room. While the professor typically will see the full name of each student in the waiting room, the other students can only see the first name and last initial of the other students. This means that if students recognize someone in their class with a similar topic, they can communicate and start to collaborate while they wait. They may even resolve their question together before they are able to speak to the professor, in which case they can leave the queue. They can also agree to speak together, so that when it is the turn for one in the queue, the other will raise his or her hand in order to join in the spotlight at the same time (as explained below).

Noteworthy in these figures and in this flow diagram is that there is no so-called "waiting room." As soon as a student joins the session (such as by clicking a link, entering a meeting identifier, or using other suitable techniques), and has signed in and enabled their camera and microphone (as shown in FIGS. 3-4, for example), he or she is automatically placed in the actual meeting room of the session such as a shown in FIGS. 5 and 6. A student does not need to wait in the waiting room waiting for the professor to admit the student, and the professor is not distracted with students in the waiting room while the professor is attempting to have a conversation with the spotlight student. Thus, the burden on the professor is reduced, the other students are not frustrated and are able to hear a relevant conversation between the professor and spotlight student.

End of Queue Feature

In another embodiment of the invention, the professor need only click one button in order to begin conversing one-on-one with the next student in line. When the professor is done speaking with the current spotlight student, he or she simply hits the Next button which automatically mutes the audio of the spotlight student, turns off their video stream (if desired), sends them to the back of the queue, and brings the next student in the queue into the spotlight, automatically turning on their audio and video stream. The student sent to the back of the queue may either remain in the queue (because he or she has further questions), or may elect to exit the session (since all questions were answered, for example).

Figure 8:
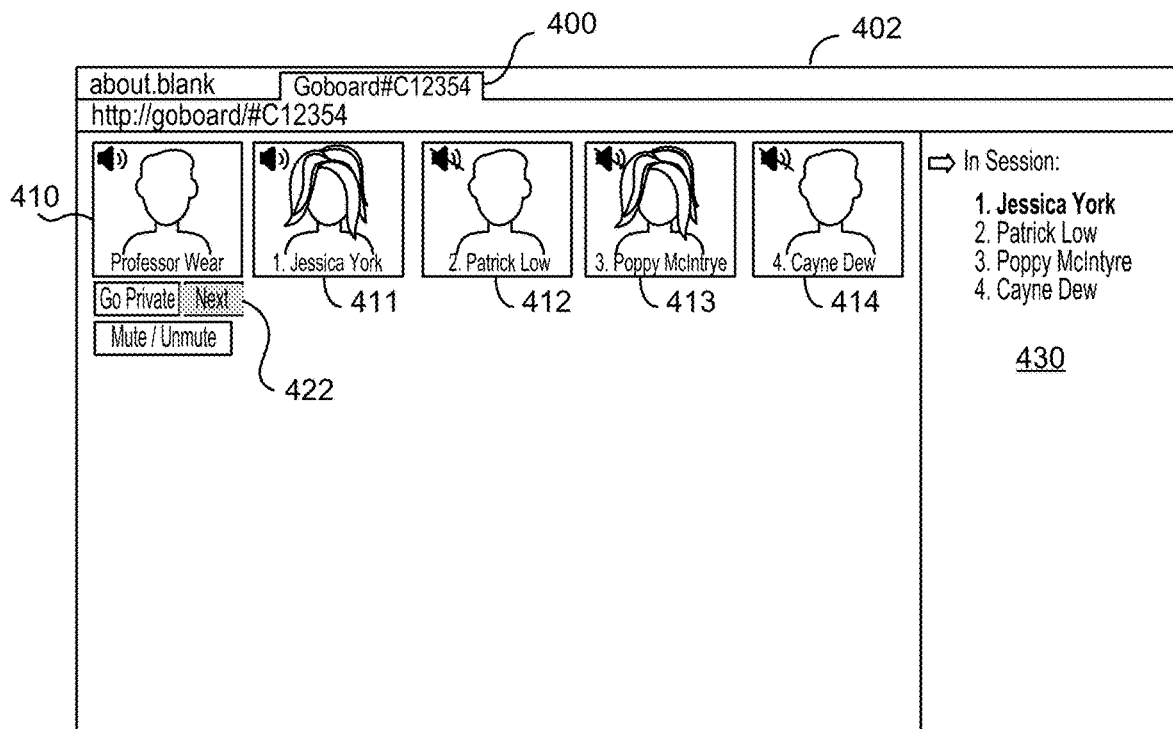
FIG. 8 illustrates the video conference session from the professor's perspective.

FIG. 8 illustrates the video conference session 400 from the professor's perspective. Shown are the same students in the same order as before, except that now the professor has finished speaking with Jessica, the spotlight student, and has clicked the Next button 422 (now shown in gray) in order to move her to the back of the queue and to bring up Patrick next.

Figure 9:
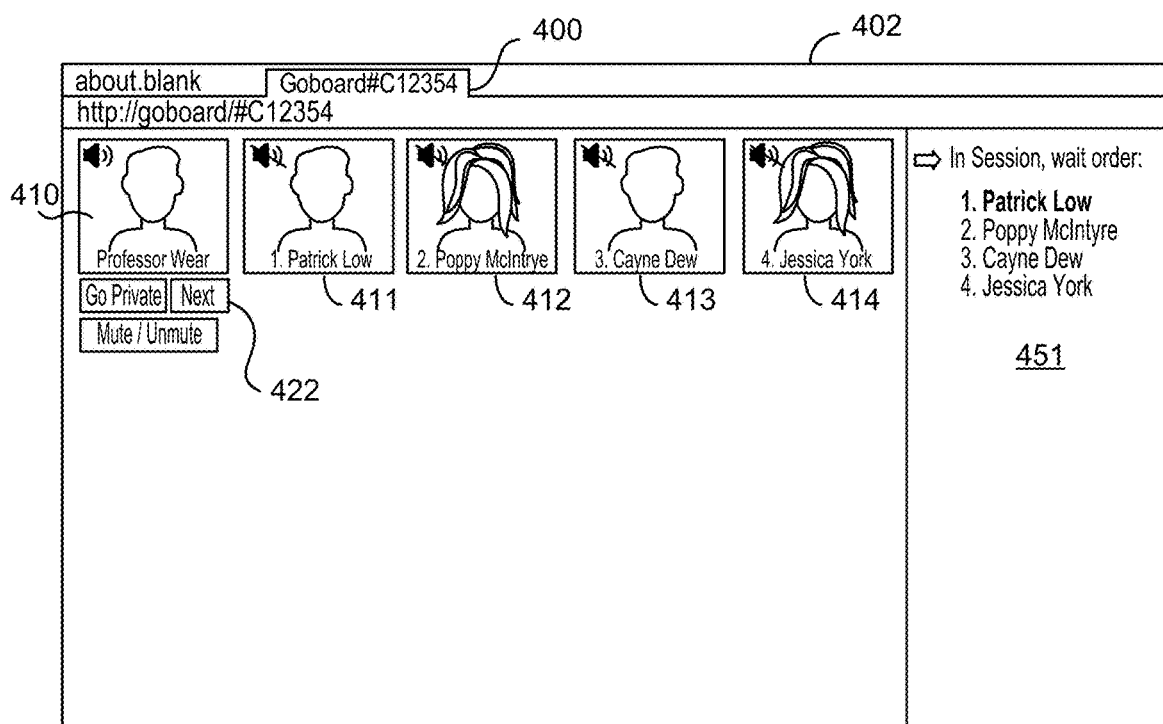
FIG. 9 illustrates session from the professor's perspective after clicking the Next button.

FIG. 9 illustrates session 400 from the professor's perspective after clicking the Next button. Patrick is now the spotlight student in video box 411 and his microphone has been un-muted. Jessica has been moved to the rear of the queue into box 414 and her microphone has been muted; the other two students remain in the same order but each has moved up one position. Window 451 now shows the new order of students in the queue.

Figure 10:
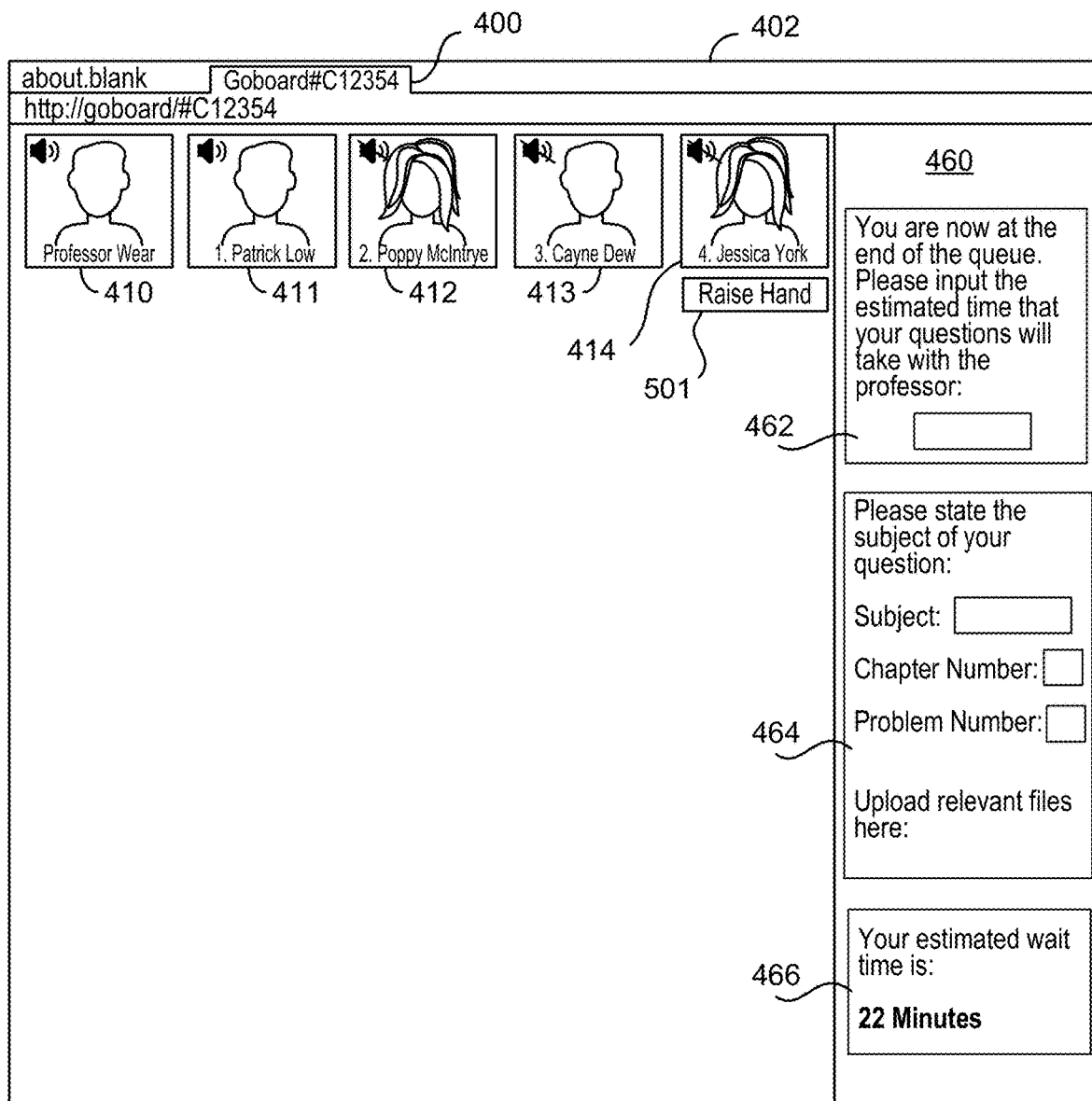
FIG. 10 illustrates session from the perspective of Jessica's computer after she has been moved to the rear of the queue.

FIG. 10 illustrates session 400 from the perspective of Jessica's computer after she has been moved to the rear of the queue. As shown, she is now at the rear of the queue and does not have an option to un-mute her microphone. In addition, because she is now back in the queue (and similar to what a new student joining the queue would see), she is shown three windows. Window 462 asks her to estimate the time that her question will take with the professor. Window 464 asks her to input the subject matter of her question or to upload files. Window 466 tells her what her estimated wait time is now. The functionality of these windows will be explained below in the context of a new student joining the queue, and are optional when the spotlight student is moved to the rear of the queue.

Figure 11:
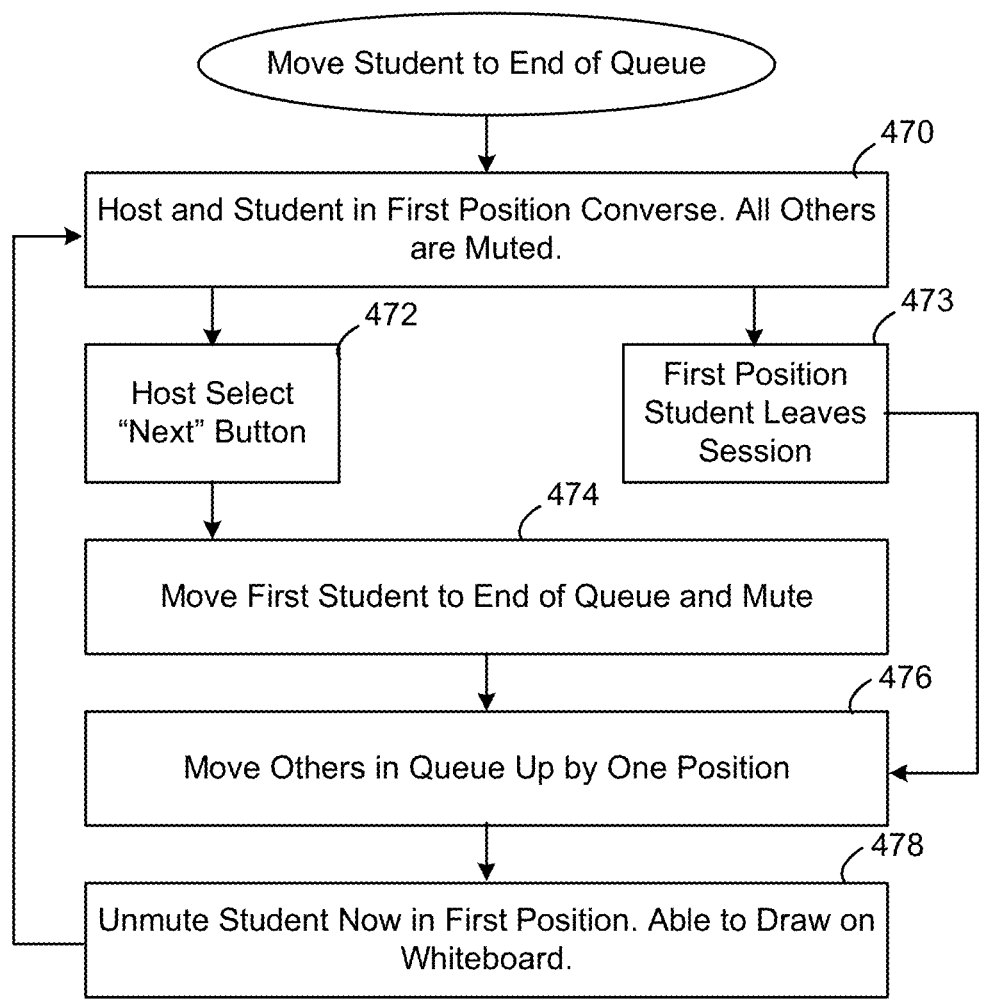
FIG. 11 is a flow diagram describing one embodiment by which a student is automatically moved to the end of the queue with a single click.

FIG. 11 is a flow diagram describing one embodiment by which a student is automatically moved to the end of the queue with a single click. In order to best implement the above functionality, the flow may proceed as follows. In a first step 470, the professor and the spotlight student (Jessica) converse as has been previously described and the other students are muted. In step 472 the professor selects the Next button 422 as shown in FIG. 8. In step 474 the spotlight student Jessica is automatically moved to the end of the queue and her audio feed is muted as is shown in FIG. 9 (and her video feed is disabled if using that design choice). As shown in FIG. 10 she may be presented with windows 460-466 and may input the information requested. In step 476 the other students are each moved up one position and Patrick is now the spotlight student and his microphone is now un-muted as shown in FIG. 9 (and his video is turned on if it had been off). He may then converse with the professor and in step 470 the cycle will repeat again when the professor clicks the Next button. In the same way that application 101 muted Patrick's microphone as discussed above, that application then sends a command to un-mute that microphone, which basically means that the mute override has been removed and Patrick's audio is enabled.

Alternatively, the students move up through the queue automatically when the spotlight student leaves the session. For example, as shown in FIG. 8, if Jessica has finished speaking with the professor and does not need to return to the end of the queue to ask another question, she may simply leave the session in step 473 by clicking a Leave or Exit button, by closing her browser, closing the video conference application on her computer, or using any other similar technique that indicates to application 101 and that Jessica has left the session. Accordingly, the professor does not need to click the Next button, and application 101 automatically moves the others in the queue up by one position as described in step 476 and the flow continues as described above. If Jessica desires to leave the session, but the professor clicks the Next button before she leaves, she will be moved to the end of the queue as described above but may then simply leave the session at that time.

Multiple Speakers Feature

In this embodiment, the professor may un-mute numerous students in order to speak with other students in the queue in addition to the spotlight student. The professor may realize that an issue he is discussing with the spotlight student should also be discussed with other students, or he may realize that one or more other students in the queue wish to join the discussion. More specifically, any waiting student in the queue may press a button that indicates that the waiting student has the same question (e.g., a "Raise hand" button) indicating that the student has a question on the same topic. Students use this button to virtually raise their hand to show the professor that they too have the same question or otherwise desire to speak. The professor then decides whether to let that student in to the spotlight session as well. The professor may ask the spotlight student for permission to add other students into the current one-on-one session. For example, FIG. 10 at 501 shows such a "Raise Hand" button that appears on Jessica's computer when she is back in the queue waiting. Although not shown, the other students in the queue who are muted (Poppy and Cayne) also have such a button.

Figure 12:
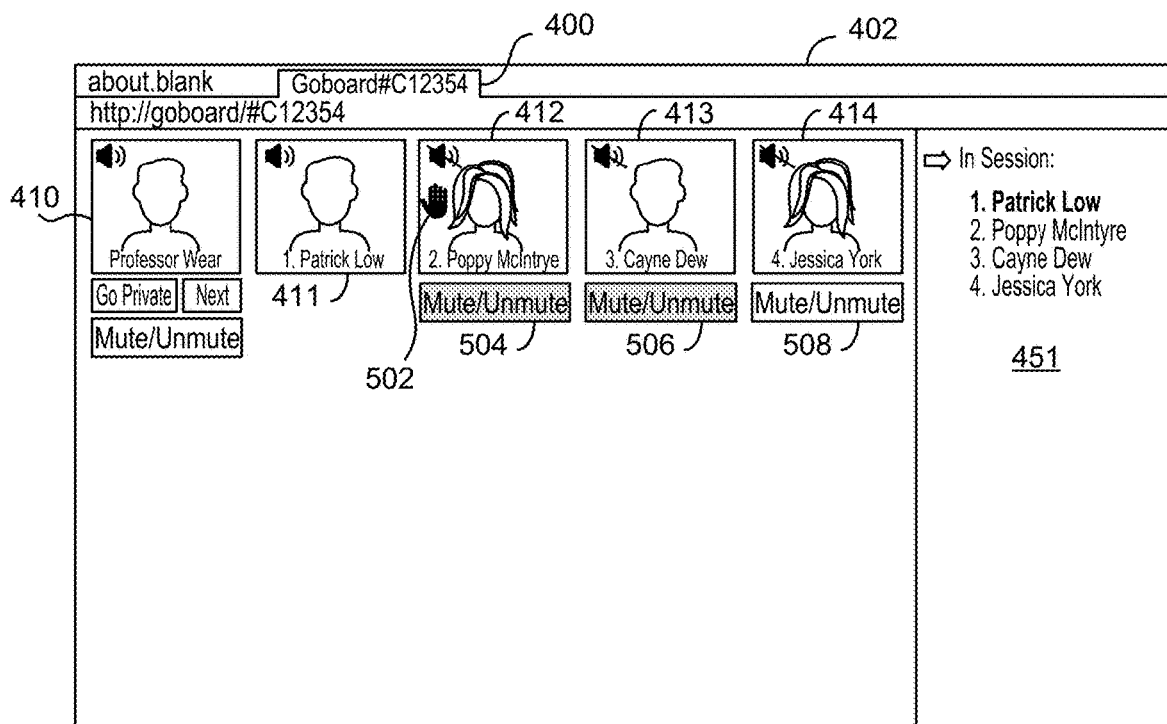
FIG. 12 illustrates session from the point of view of the professor's computer in which he desires to add multiple speakers.

FIG. 12 illustrates session 400 from the point of view of the professor's computer in which he desires to add multiple speakers. As shown, Patrick is currently the spotlight student and it appears that Poppy has pressed her Raise Hand button from her computer because the hand icon 502 now appears next to her image on the professor's computer. Currently, the other students in the queue (aside from the spotlight student) have their audio feed muted. Next to each of these students (below their video boxes 412, 413 and 414) there is a Mute/Un-mute button 504, 506, 508 that the professor may press from his computer. These other students waiting in the queue still have icons superimposed on their images indicating that they are on mute. These buttons 504 and 506 are in gray indicating that the professor has just pressed these buttons in order to un-mute these students. In addition, there is a hand icon 502 superimposed on the image of student Poppy indicating that she desires to speak during the session and has selected an option "Raise Hand" from her computer. The professor desires to hear from Poppy because he sees icon 502 and the professor desires to hear from Cayne for some other reason that the professor has. The button 508 below the student Jessica (at the end of the line) has not been pressed.

Figure 13:
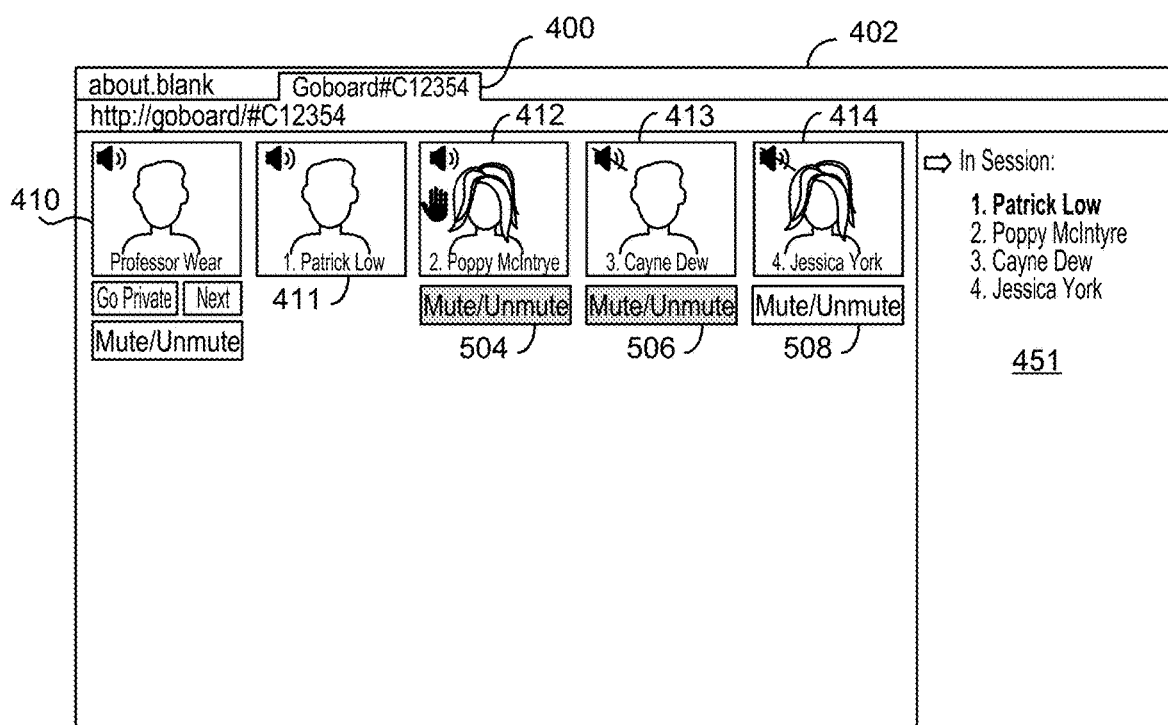
FIG. 13 illustrates session on the professor's computer after he has un-muted Poppy and Cayne.

FIG. 13 illustrates session 400 on the professor's computer after he has un-muted Poppy and Cayne. As shown, buttons 504 and 506 are in gray indicating that those students have been un-muted, and superimposed on the images of Poppy and Cayne is the loudspeaker icon indicating that they are both un-muted. The students Patrick, Poppy and Cayne may now all speak in the session and be heard, along with the professor. Jessica is still muted.

Figure 14:
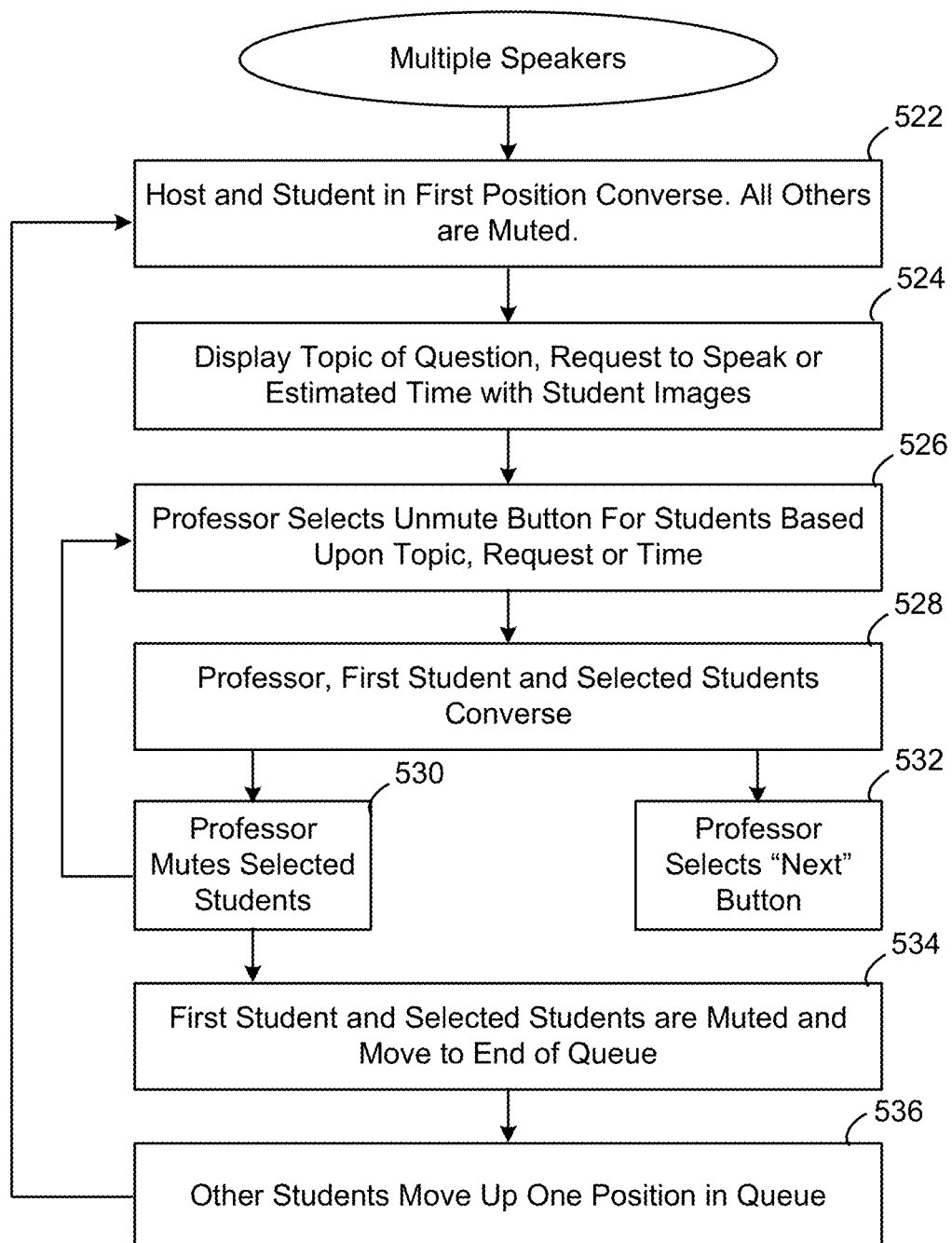
FIG. 14 is a flow diagram describing one embodiment by which the professor may enable multiple speakers to speak during the session.

FIG. 14 is a flow diagram describing one embodiment by which the professor may enable multiple speakers to speak during the session. In a first step 522 the professor and the spotlight student are conversing during the session and the other students waiting in the queue have been muted, such as is shown in FIG. 12. In step 524 application 101 displays on the professor's computer the topic that each student has a question about, a request to speak icon, or an estimated time of the question, each being associated with an image or name of one of the students waiting in the queue. This information is gathered via input from the students themselves. For example, FIG. 12 at 502 shows a request to speak icon; FIGS. 23, 24, 26-28, 30, 35, 42, 43, 49 and 51 show question topics and estimated time of questions superimposed on an image of each student. The professor is able to view this information on his computer and decide which, if any, other students waiting in the queue he should un-mute.

Next, in step 526 the professor decides whom to un-mute based upon question topic, request to speak or estimated time of question (or for any other reason) and selects the un-mute button for that particular student or students, for example, buttons 504 and 506. This selection is transmitted to application 101 which then un-mutes the audio feed for these selected students, changes their loudspeaker icon to indicate that they are now un-muted, and updates the information displayed on the screens of the participants. In addition, if these students had their video feeds disabled, selecting buttons 504 and 506 will also automatically enable those video feeds. Application 101 may un-mute the audio feed and enable the video feeds as discussed above.

In step 528 the professor, spotlight student and any of the selected students may now converse during session, such as shown in FIG. 13 in which the professor, Patrick, Poppy and Cayne may now converse during the session. In step 530, the professor may decide to mute any of the students that he has un-muted, using buttons 504-508, for example, and those selected students will now be muted by application 101. If video is on it will now be disabled.

By way of example, should the professor now mute both Poppy and Cayne using buttons 504 and 506 the session will again appear as in FIG. 12 in which both of the students are muted. The session then continues with any students conversing who are not muted, although the professor may un-mute students in step 526 and mute them again in step 530 as he or she desires.

In step 532 the professor may decide that the conversation between Patrick, Poppy and Cayne has resolved all of their questions and the professor desires to move to the next student in the queue. Once the Next button is pressed in step 534 all of the students who were un-muted and had been conversing are now moved to the end of the queue (in the same order they had been in) and they are then muted and video disabled if desired. The student who had been next in line behind any of these conversing students is now moved up to the spotlight, his or her audio feed is now un-muted, and all other students who have not been speaking are now moved up one position in the queue in step 536. In this example, the order of the queue would then be Jessica as the spotlight student, followed by Patrick, Poppy and Cayne in that order, all muted.

In order to avoid moving all of the multiple students who had been conversing to the rear of the queue, the professor first mutes the additional students he had added to the discussion so that only the spotlight student is now un-muted; then, when the professor clicks the Next button, only the spotlight student is moved to the end of the queue as discussed above. In either case, once step 536 has finished, then control returns to step 522 in which the professor and the spotlight student begin to converse as described above.

Private Mode

In some instances, the professor or the spotlight student or both, would prefer that a question is dealt with privately. The professor has a "Private" button, which they can hit to turn off the audio and perhaps the video streams sent to the other students in the waiting room. Private mode can be enabled at the start of a session when the student joins, and also later during the one-on-one session. When students join the meeting room, they can indicate that their question is a private matter, which the professor will see. Or, the "Private" button can be selected by the professor at any time during the session, not just at the beginning of the session. In a private session, the other students in the meeting room will see a message indicating that the current session is private.

Figure 15:
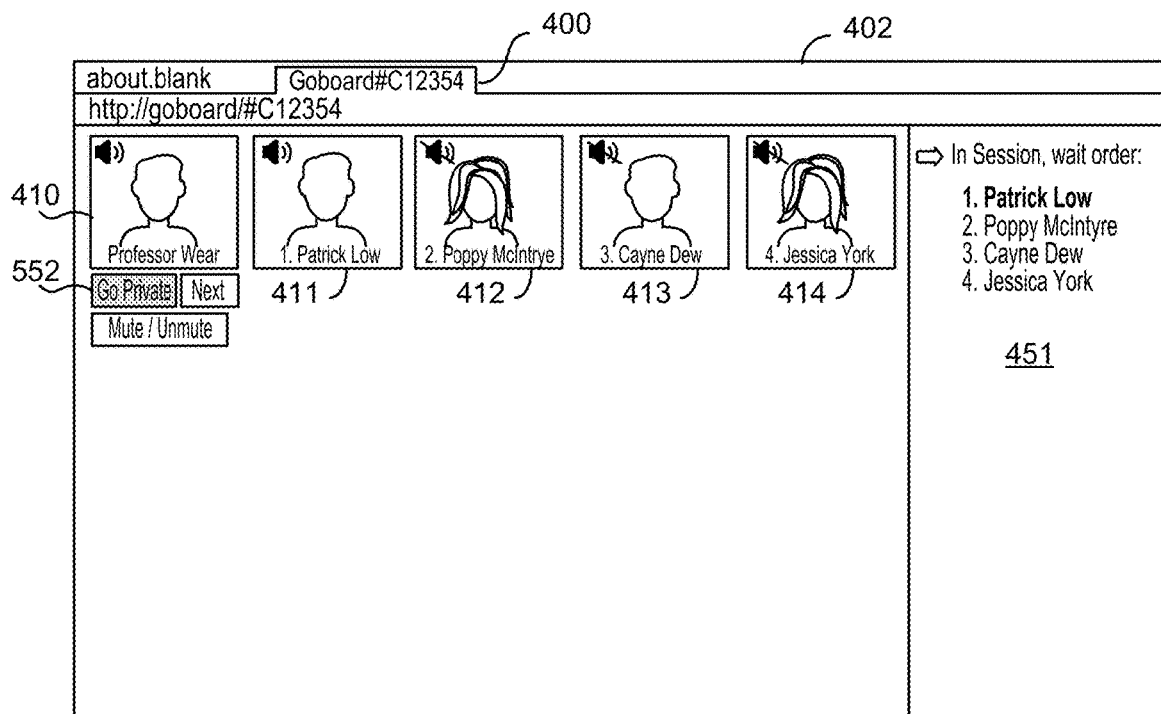
FIG. 15 illustrates an embodiment of the session in which the professor and student wish to discuss a matter privately.

FIG. 15 illustrates an embodiment of the session in which the professor and student wish to discuss a matter privately. As shown, the professor and the spotlight student, Patrick, are conversing during the session and the other students in the queue are muted but are able to listen in. The professor and the spotlight student have decided that they would like to discuss a matter in private so the professor has just clicked the Go Private button 552 which is shown in gray.

Figure 16:
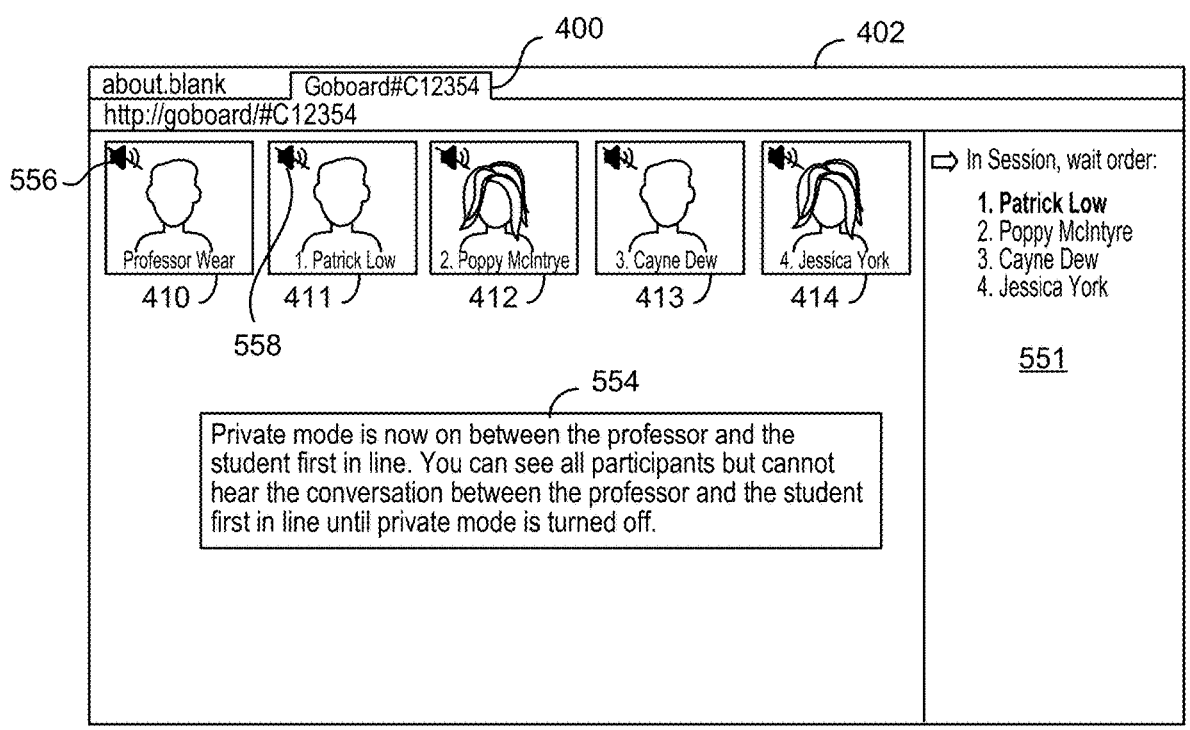
FIG. 16 illustrates the session from a waiting student's computer after the professor has clicked the Go Private button.

FIG. 16 illustrates the session from a waiting student's computer after the professor has clicked the Go Private button. As shown, from the perspective of any of the students waiting in the queue, Poppy, Cayne, Jessica, icons 556 and 558 indicate that the professor and the spotlight student are now muted from the other students' perspective and these students may not listen to the conversation between the professor and Patrick. A window 554 appears on the other student's computer indicating what is happening. Although not shown, the perspective from Patrick's computer would still show that he is not muted and neither is the professor. A window or other symbol may also be displayed upon Patrick's computer indicating that he is now in private mode with the professor. The professor's computer appears as in FIG. 15, showing the Go Private button in gray, indicating that the session is now in private mode.

Figure 17:
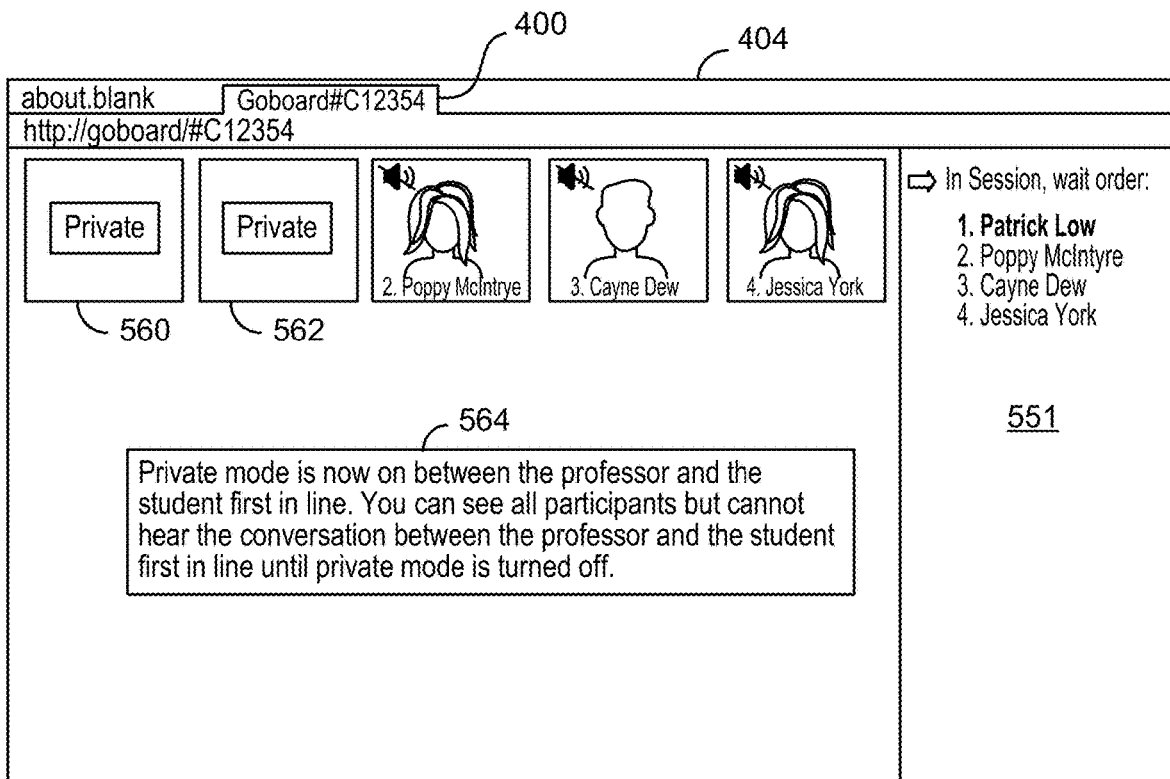
FIG. 17 illustrates another embodiment of the session from a waiting student's computer after the professor has clicked the Go Private button.

FIG. 17 illustrates another embodiment of the session from a waiting student's computer after the professor has clicked the Go Private button. In this embodiment, the video images of the professor and the spotlight student are disabled on the computers of the other students in the queue. As shown, from the perspective of any of the students waiting in the queue, Poppy, Cayne, Jessica, images 560 and 562 indicate not only that the professor and the spotlight student are now muted from the other student's perspective, but also that these other students may not see the professor or Patrick, and that thus these students may not listen to nor see the conversation between the professor and Patrick. A window 564 appears on the other student's computer indicating what is happening. From the perspective of the professor's computer or Patrick's computer, each would still be able to see and hear one another.

Figure 18:
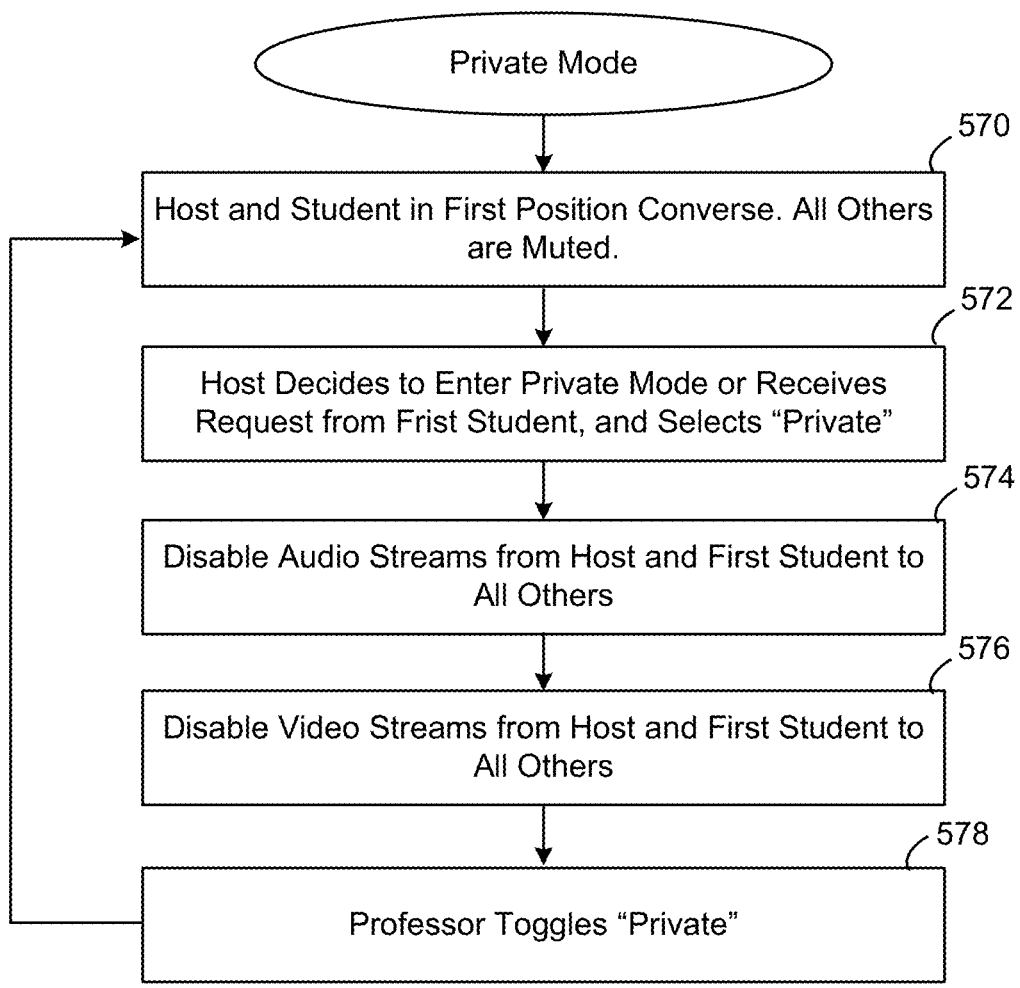
FIG. 18 is a flow diagram describing one embodiment in which the professor enters private mode with a student.

FIG. 18 is a flow diagram describing one embodiment in which the professor enters private mode with a student. Initially, in step 570 the professor and the spotlight student are engaged in a conversation and the other students in the queue are muted, such as is shown in FIG. 15. In step 572 the professor decides to enter private mode with the spotlight student or receives a request from the spotlight student to enter private mode. For example, FIG. 6 shows a button 428 in which a student may indicate that he has a private question to discuss with the professor. This button may appear on the computer of any student in the queue. Accordingly, the professor decides to enter private mode with the spotlight student and this selection is transmitted to application 101. In step 574 application 101 then takes action to disable the audio streams from the professor and from the spotlight student to all of the other students. Accordingly, as shown in FIG. 16 from a student computer perspective, none of the waiting students are able to hear what the professor and the spotlight student are saying because each of the audio feeds from the central server (or from a peer computer) from the professor and the spotlight student are disabled to these other student computers. Similarly, the feed of the electronic whiteboard is also disabled to these other student computers.

Optionally, in step 576 the application may also disable the video streams from the professor and the spotlight student to all of the other students. Accordingly, as shown in FIG. 17 from a student computer perspective, none of the waiting students are able to see or to hear what the professor and the spotlight student are saying.

At this point, the professor and the spotlight student may have a private conversation that none of the other students can hear and may not be able to see. When the conversation is done, the professor then toggles button 552 and control returns to 570 in which the professor and the spotlight student are conversing and any of the students may listen to and see them because the audio feeds from the professor in the spotlight students are now enabled again in the feed of electronic whiteboard is also now enabled. The audio feeds from the professor and spotlight student computers are now also enabled if they had been disabled.

New Student Questions and Estimated Wait Time

In this embodiment, a new student who joins an ongoing session is asked to input a variety of information to assist with management of the session and is also provided with an estimated wait time.

Figure 19:
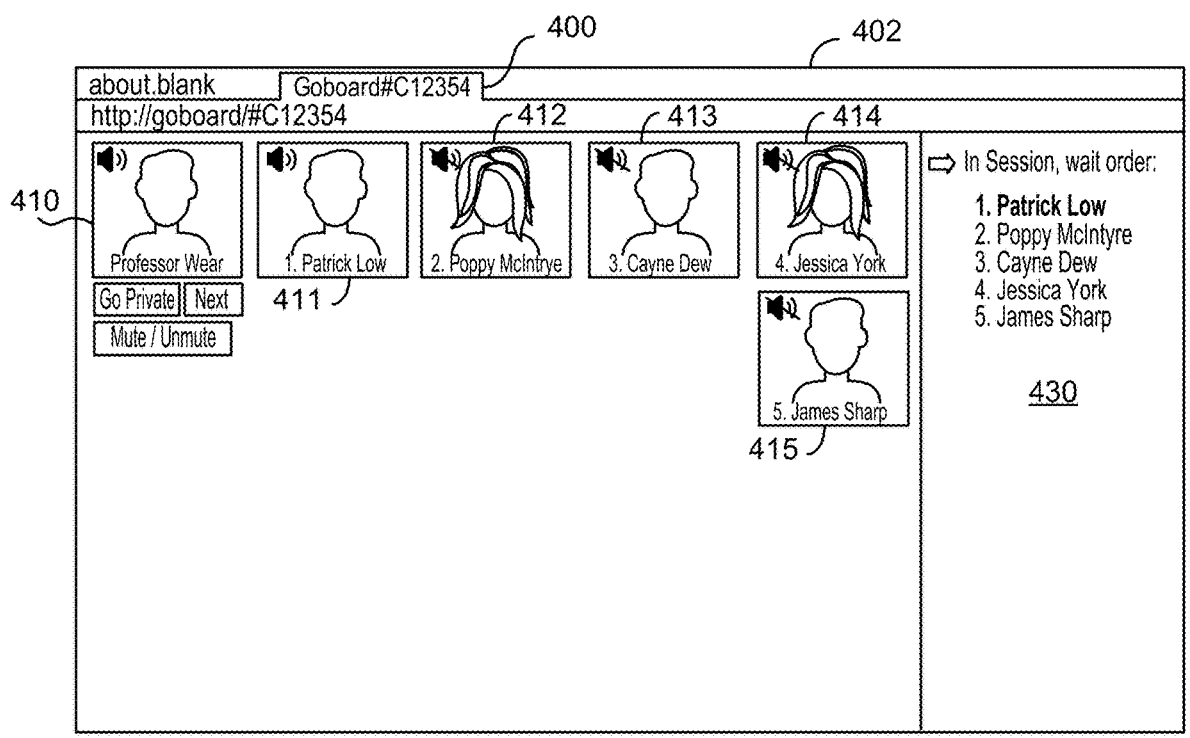
FIG. 19 illustrates a session in which a new student has joined.

FIG. 19 illustrates a session in which a new student has joined. As shown, new student James now appears on the professor's computer in video box 415 and is at the end of the queue in the fifth position.

Figure 20:
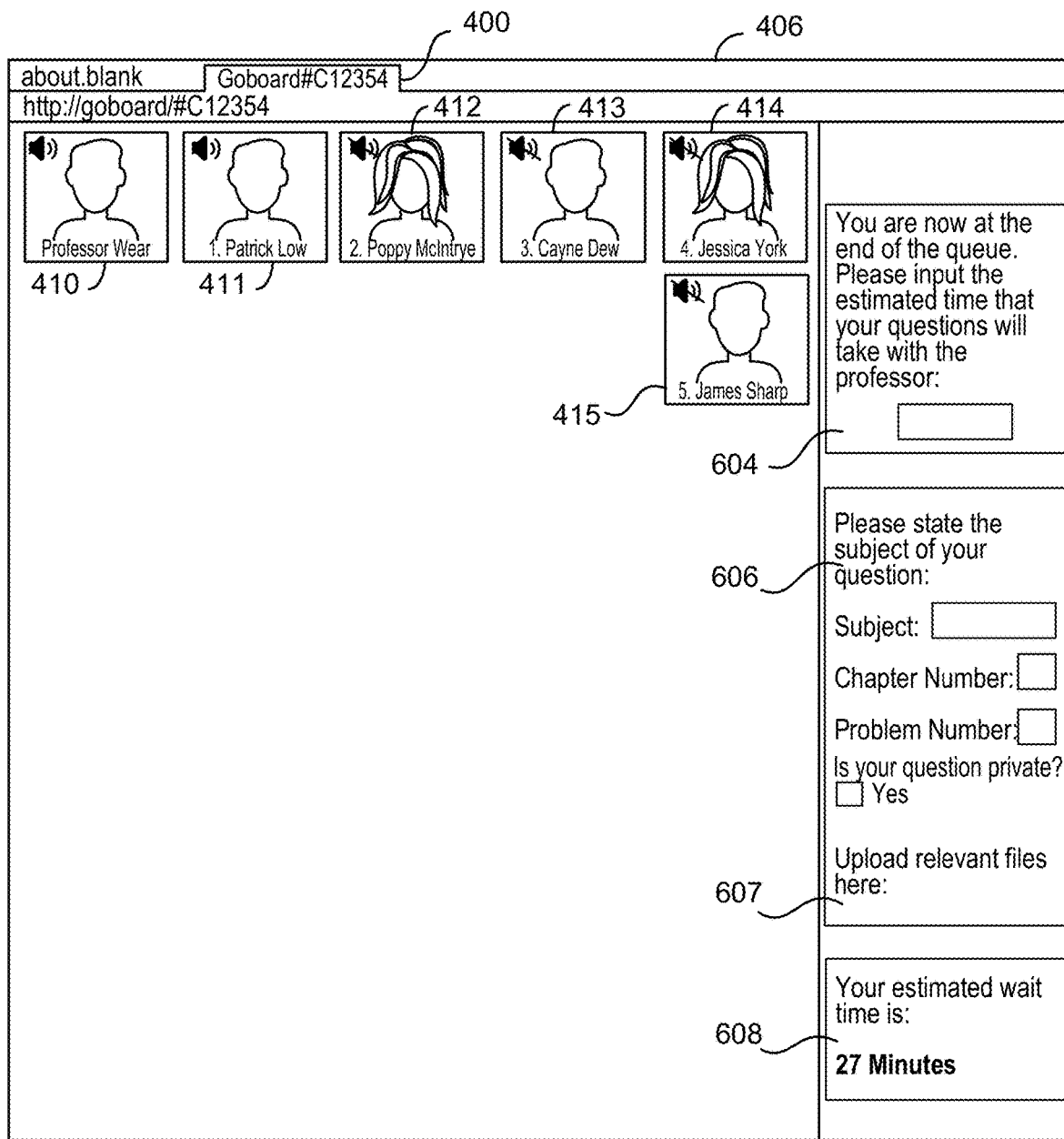
FIG. 20 illustrates the session from the perspective of the new student's computer.

FIG. 20 illustrates the session from the perspective of the new student's computer. As shown, he is muted and is presented with windows 604 and 606 asking for information, and is presented with window 608 telling him what his estimated wait time is.

Figure 21:
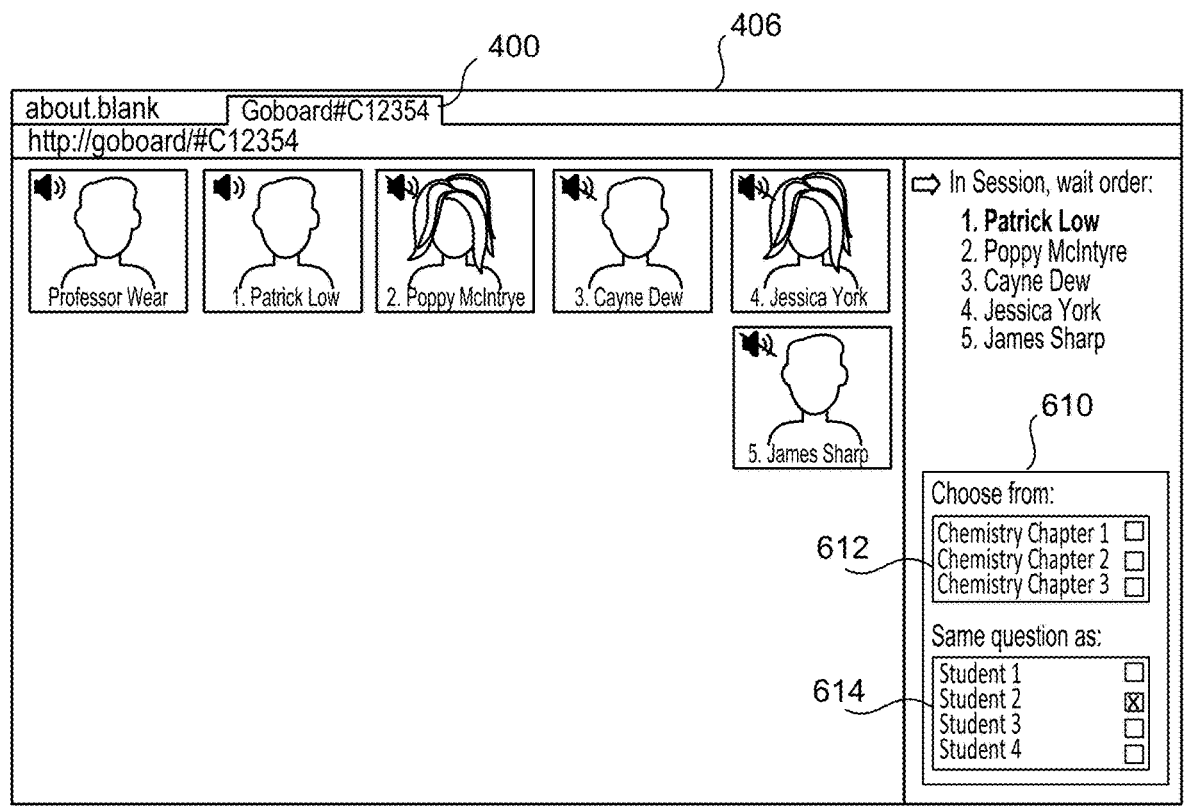
FIG. 21 illustrates the session from the perspective of the new student's computer showing alternative input windows.

FIG. 21 illustrates the session from the perspective of the new student's computer showing alternative input windows. As shown, window 610 asks for the new student to make selections.

Figure 22:
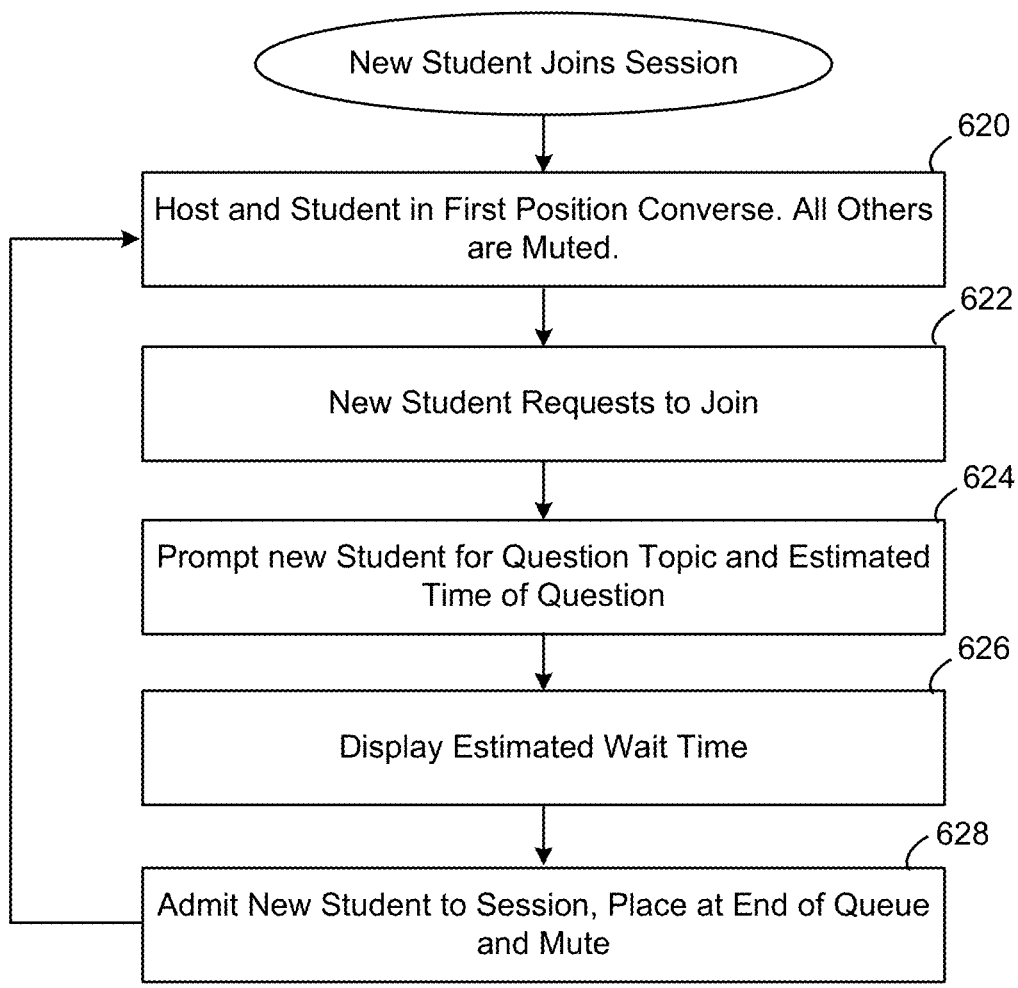
FIG. 22 is a flow diagram describing an embodiment in which a new student joins an ongoing session.

FIG. 22 is a flow diagram describing an embodiment in which a new student joins an ongoing session. In step 620 the professor and the spotlight student engage in a conversation while the other students are waiting in the queue, are muted, but may listen to the conversation, as has been described above. In a step 622 a new student, in this case James, requests to join session 400. He may do this in any manner of ways such as by clicking upon a link that has been distributed by e-mail, text etc., may type a URL with the meeting room identifier into an address bar of a browser, may type the meeting room identifier into a local application he has downloaded or into a mobile application, and may use sign-in pages such as shown in FIG. 3A or 3B, etc.

When the student first signs in he or she may be asked for information to help the professor recognize the student (e.g., first name, last name, class section, student identifier, etc.), and this identifying information may be requested using the sign-in pages of FIGS. 3A and 3B, or, some or all of this identifying information may be requested in a window of FIG. 20 (not shown).

Application 101 receives this request from the new student computer and then takes the following steps in order to admit this new student to the session. As shown in FIG. 19, the new student may be admitted to the session and appear at 415 on the professor's computer (and on the other student's computers) as soon as the new student requests to join the session and before the new student answers the questions in boxes 604, 606 and 610. Alternatively, the new student must enter information into boxes 604, 606 and 610 before he or she is actually admitted to the session and can listen to the ongoing discussion. In either case, and as explained above, there is no waiting room under control of the host where the new student must wait until the professor admits him or her. As soon as a new student requests to join the session (or alternatively, as soon as the questions are answered), the student is admitted to the session.

In a step 624 as shown in FIG. 20 the new student is prompted for his or her topic and the estimated time. Preferably, each student who joins the session is asked to provide information before being added to the session. This information is used in various of the below embodiments. Window 604 asks the student to estimate the time that their question will take with the professor, and window 606 asks for specifics about the question. A student may be asked a series of questions to automate the time estimation process and to prepare both the professor and the student or, these questions may be presented at once on the same screen.

Window 604 asks how long they expect their question to take (which is helpful for the professor and also for the expected wait time estimate for students who may join later). A professor may choose to move a student into the spotlight position ahead of the rest of the queue if the student has a relatively short estimated time. For example, a student might simply be dropping off an envelope and enters "one minute" in window 604. As will be further explained below, a professor can choose a specific student from anywhere in the queue with a very short estimated time instead of clicking "Next." This chosen student then jumps to the front of the queue. Short questions can also be answered by the professor in the session chat window. Thus, if the student has indicated that they have a one-minute question, "What time is tomorrow's assignment due?", the professor can quickly respond "Assignment due tomorrow at 5 p.m." in the chat window for all students to see, or can simply explain orally to everyone in the session.

Window 606 asks for question specifics such as subject, chapter, problem, etc., which provide a number of advantages, or, the student may be allowed to type in a free-form phrase or sentence with their question or topic. Alternatively, instead of window 606 a new student may be presented with window 610 which may list the class, subject or topic relating to their question. Preferably this is a drop-down menu and professors can populate these fields beforehand (e.g., by section topics, chapters, test topics). Box 612 asks the student to choose a particular chemistry chapter, for example. The advantages are these. One, the professor will be able to see who has which questions and can decide to group students together, answer certain questions by addressing the whole group, or may move students with certain questions up to the front. Two, other students in the queue can see who has questions on which topic and may start a conversation off-line (via telephone, text message, etc.) with a fellow student. And three, requiring the student to input their question topic helps the student begin to focus on the specific question and prepare for the one-on-one with the professor. Requiring each student to choose a question primes the students' brains so that the questions are well-articulated beforehand, which makes each session more efficient for the professor.

Again, these answers allow the professor to see that several students in the line in different places may all have the same question, or at least on the same topic, and can bring them all in together to speak as described above. The question topics are displayed in the session (as explained further below) for other students in the meeting room, so that all students can see what other students want to ask about; thus, they can message each other while in the meeting room, collaborate, form a study group, etc. This information can also be used by the professor to reorder the queue, so that the most common question can be addressed first. Or, the professor reorders the queue so that foundational questions are addressed first and more specific or difficult questions may be answered later.

Box 614 provides a shorthand way for a new student to simply check a box indicating that the question he or she has is the same as another student in the queue. By way of example, box 614 shows that the new student has selected the box corresponding to the student in the second position, namely Poppy. This selection will be displayed (as described further below) superimposed on the image of student James, e.g., "same question as Poppy") so that the professor can easily see which students have the same questions.

A new student may also be asked to input other information into application 101 via other windows (not shown) such as a self rating on how much help they need (e.g., a confusion scale, ranging from "1", "I have no idea where to start" to "10", "I know all the steps needed, except one item of clarification"). This self rating serves two purposes: it gauges how deeply a professor needs to go into a topic, so that a professors can choose a more appropriate starting point; and, it allows for a "before/after" snapshot—students are asked for their self rating on the topic after their one-on-one session has ended, so that a professor can gauge how well the session went. FIG. 10 at 468 shows that when a student is moved to the end of the queue after speaking with the professor that he or she are again asked for the self rating. These two ratings, before and after, may be sent electronically to the professor, stored in a computer 20 database for later analysis or display, aggregated with other student ratings, averaged with other student ratings, etc.

Step 624 may prompt for other information. Although it is preferable that a student enter input for at least boxes 604 and 606 (alternatively box 610) before that student is added to the session, in an alternative embodiment, a student is added to the session even if he or she does not input any information. This alternative embodiment facilitates adding students to the session quickly, and may be appropriate in certain situations, but it could aggravate the professor.

In step 626 application 101 displays on the new student computer the estimated wait time for that student (i.e., the time before the student may speak with the professor) such as shown in box 608. This wait time may be shown along with the requested input, before that input, or immediately after. Thus, whenever a new student joins a session, application 101 generates an automated estimate of the expected time in queue for students (which is also helpful for the professor and for subsequent students who join), which may be built from the following data:

Average time of the last five-ten people in the queue that day (or some other number of people).

Average time of the questions for that specific subject (or topic) that have already happened during the current session.

Average time of the particular students in the queue. For example, over time, we know that a student, "Jane" takes on average seven minutes per question when she attends a session. Therefore if Jane is in the queue, we can make a more accurate estimate of Jane's time in the queue.

Students' input of how long they expect that their question will take; this input may be given less weight in the model because people tend to underestimate how much time things will take.

Average time that a student leaves the queue before their question is answered.

This estimated wait time lets students know how long they will be waiting, and thus they can plan their study around the professor's office hours, also taking into account how long they will be waiting versus when the office hours will end. In addition, if a student enters the meeting room and the application calculates that the student will not reach the front of the queue before the end of the office hours, the application knows that they are unlikely to be seen that day, and a message in a window (not shown) can automatically be generated, such as "Your estimated wait time today is 45 minutes. Office hours ends in 40 minutes, so you may not be seen today." See FIGS. 29-31.

In addition to the above requested input information, the student may also be asked to upload any files, images, diagrams, textbook pages, etc., relevant to their question using hyperlink 607. See FIGS. 49-52. This information may be uploaded to a central server such as the education server, etc.

In step 628 once the new student has entered information the application admits the new student to the session, he or she is placed at the end of the queue and muted, such as a shown in FIGS. 19-21. Once application 101 receives the student topic and estimated time, it then displays this information in association with the student name, image, video box, etc. as the case may be, for example as in FIGS. 26-28. Control returns to step 620 where the professor and the spotlight student continue to converse. In fact, the professor and the spotlight student continue to converse normally without interruption during this entire process of the new student joining the session; the professor is not distracted by the new student joining and does not need to take any steps, click any buttons, monitor any waiting room, etc.

At the end of each student's session when the student leaves the session (or at the end of the entire session), the application collects and stores data on each student including:

Name of the student, or other identifier.

Name of professor.

Subject or Class to which the question is related.

Chapter, quiz, examination or topic number that relates to the question.

The time stamps of the one-on-one session start and end (or elapsed time) for the actual question time when as the spotlight student (perhaps more than once).

The time stamps of the start and end (or elapsed time) of any portion of the one-on-one session that was private. This allows tracking of which students tend to "go private" frequently and how long private sessions take per student or per professor.

Student given estimated time a question may need.

Student given self-rating of their confusion level before session.

Student given self-rating of their confusion level post session.

Student given self-rating on how accurate was their estimated time.

This data is collected in a database of computer 20, is aggregated after each session for all students and may be used to perform future analysis, or may be displayed, etc.

Time to Wait and Move Student Up

In another embodiment of the invention the estimated time per student question is displayed in association with the student image and the professor has ability to move any waiting student up to the front of the line. In addition, the estimated end of the office hours are shown graphically.

Figure 23:
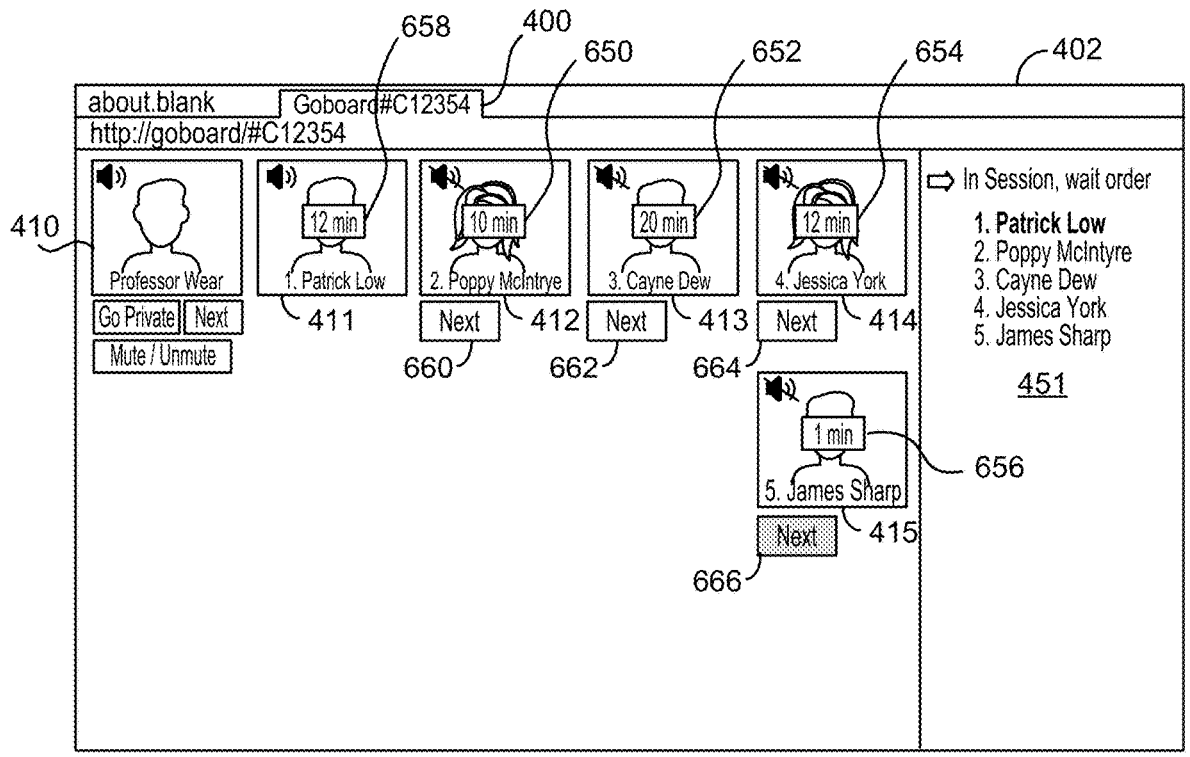
FIG. 23 illustrates the session from the professor's perspective showing estimated time per question and the ability to move any student up to the front.

FIG. 23 illustrates the session from the professor's perspective showing estimated time per question and the ability to move any student up to the front. As shown, and based upon the input provided by the student when he or she first joined the session, superimposed on each student image (or in close association with) is an estimated time of each student question 650-658. This is the time that each student has estimated his or her question will take and is shown for the benefit of the professor and for students later in the queue. Also shown below each waiting student is a button Next 660-666 allowing the professor to move any student up to the front of the queue. Button 666 is in gray indicating that the professor has just selected this button.

Figure 24:
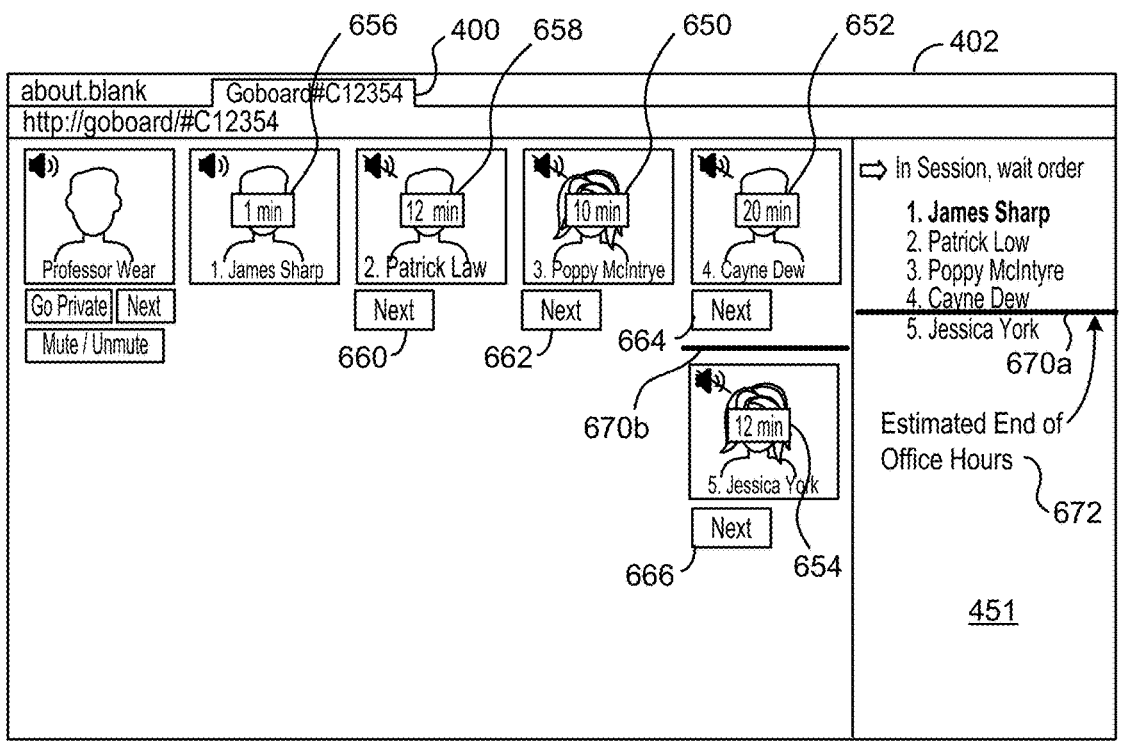
FIG. 24 illustrates the session from the professor's perspective after moving James to the front of the queue.

FIG. 24 illustrates the session from the professor's perspective after moving James to the front of the queue. As shown, each student image includes an estimated time of question 650-658, each waiting student has a Next button below their image 660-666, and James has been moved to the spotlight position. In addition, based upon the knowledge of the professor's office hours, the current time, and the estimated time per student question, application 101 has drawn a line 670*a* (or other graphical representation) within window 451 and provided text 672 indicating that the professor's office hours will likely end before Jessica has a chance to speak with the professor. The line (or other) may also be drawn between images at 670b as shown or upon any other visual representation of the queue.

Figure 25:
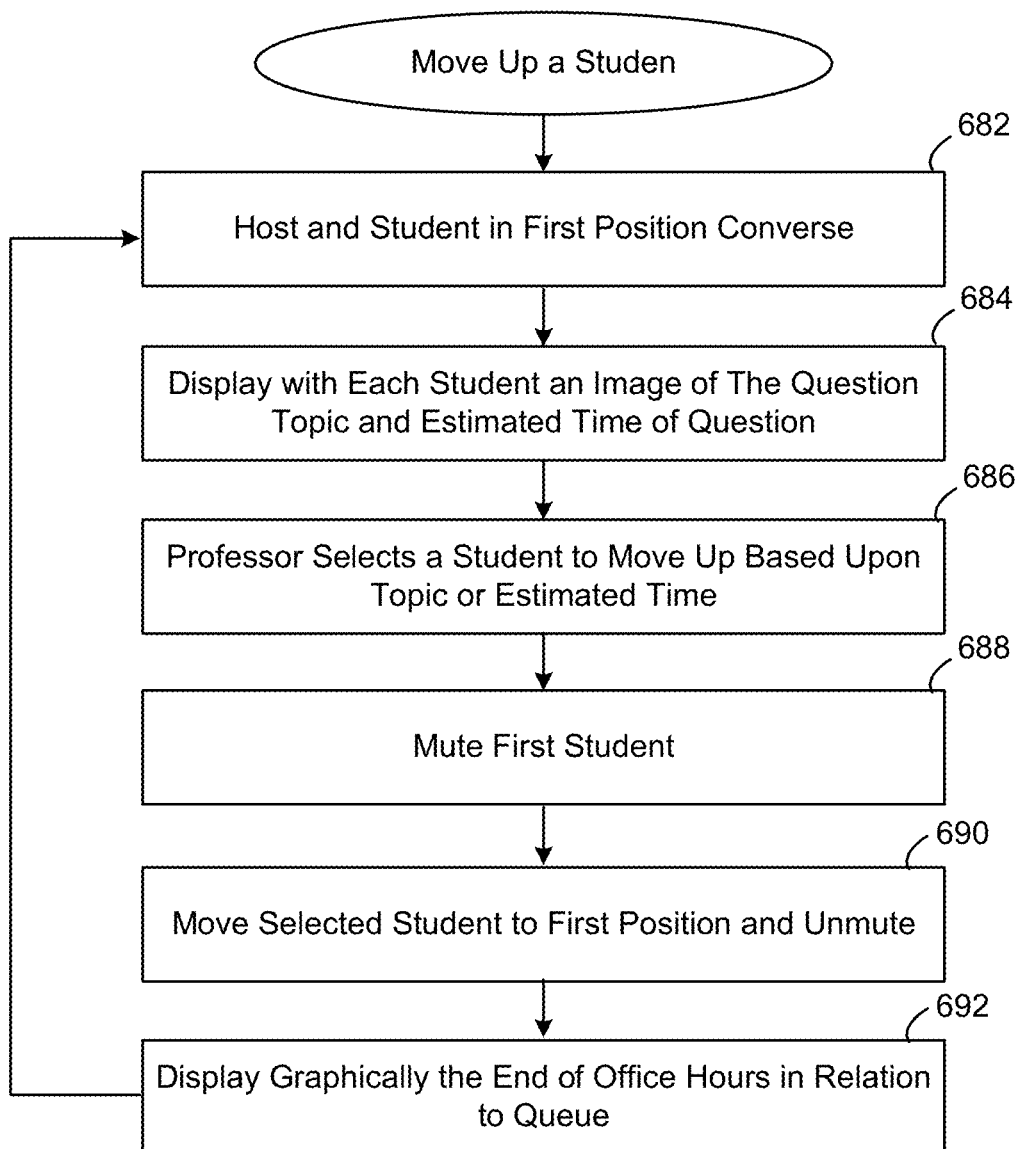
FIG. 25 is a flow diagram describing and embodiment in which a professor may move a waiting student to the front of the queue.
Figure 26:
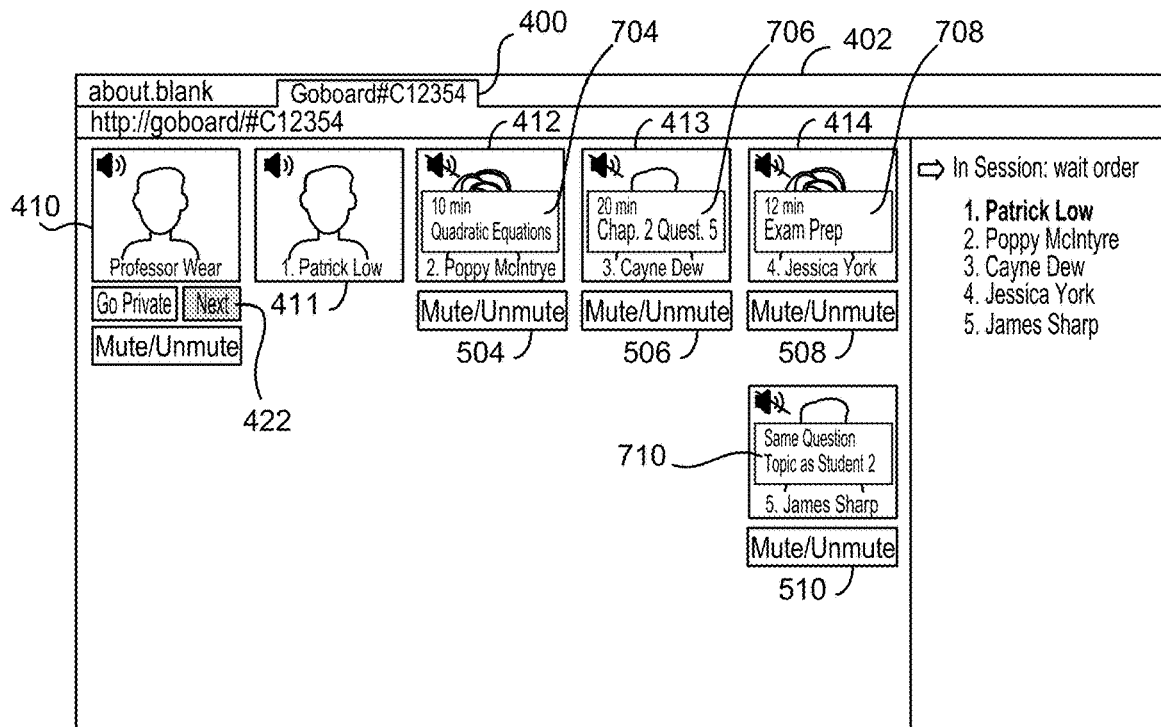
FIG. 26 illustrates the session in which student's questions and their estimated times are displayed superimposed on their images.
Figure 27:
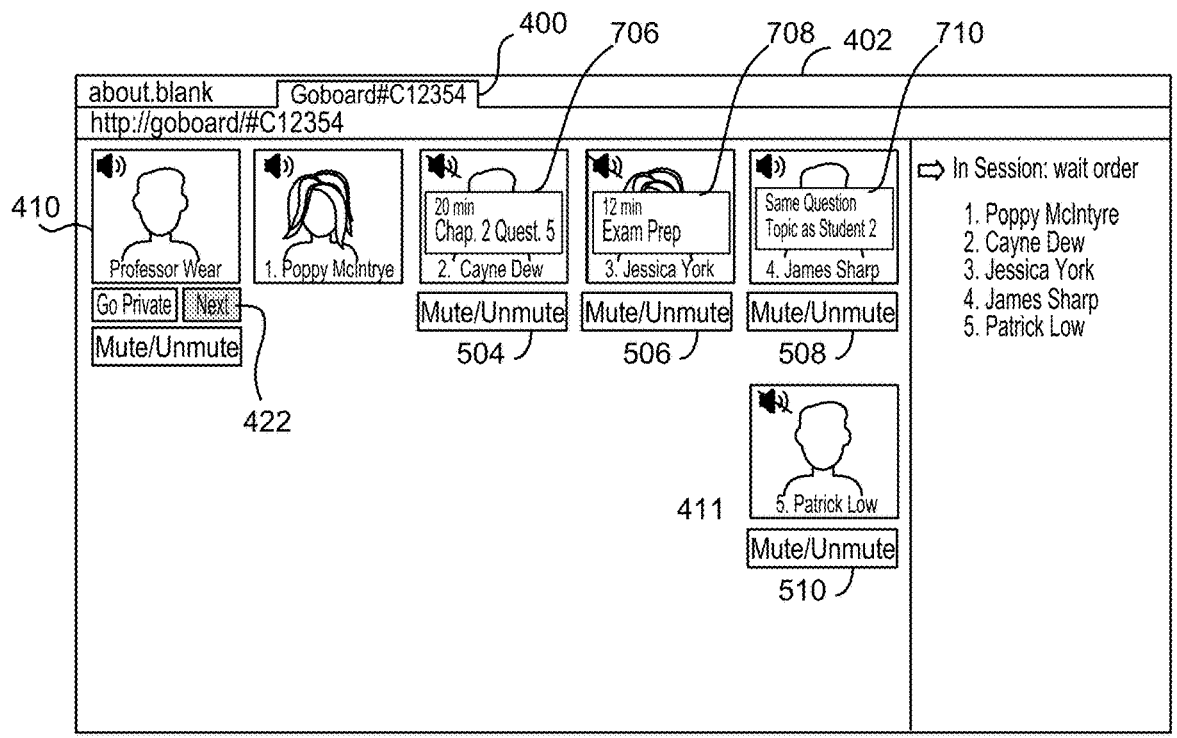
FIG. 27 illustrates the session after the professor has pressed the Next button.
Figure 28:
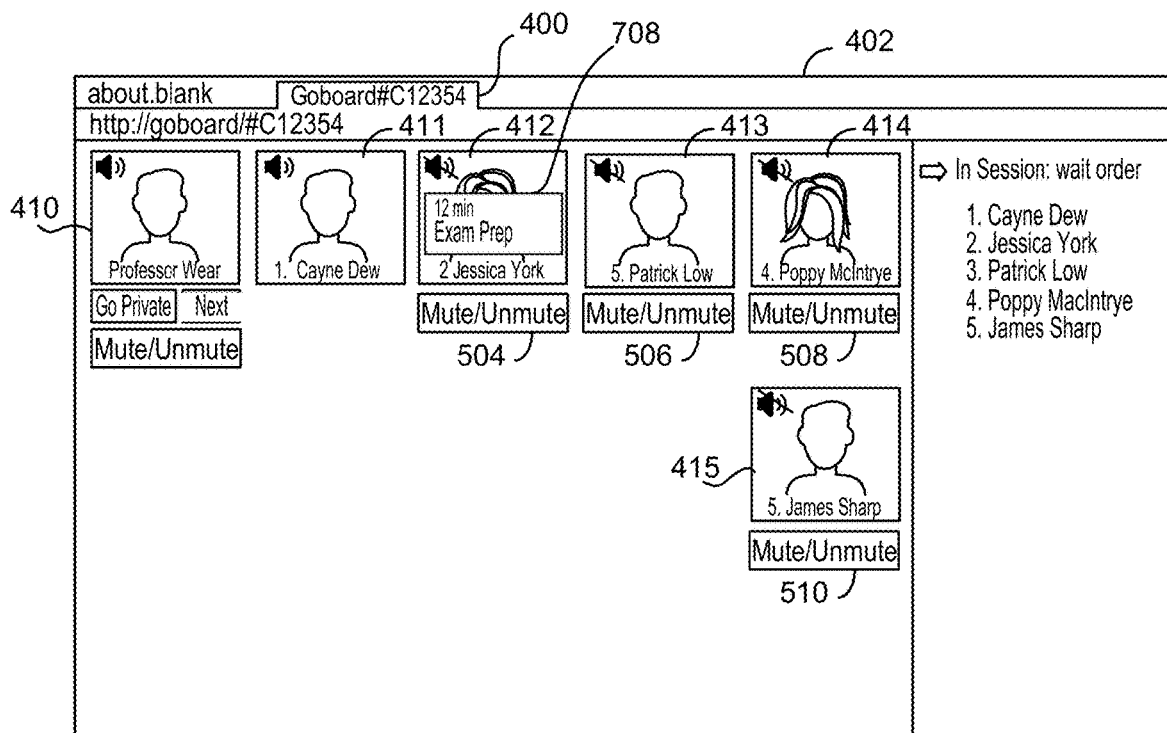
FIG. 28 illustrates the session after the professor has pressed the Next button for the second time.

FIG. 25 is a flow diagram describing an embodiment in which a professor may move a waiting student to the front of the queue. In step 682 the professor and the spotlight student converse and the other students listen as has been described above. In a step 684 the estimated time of a student question is presented along with the image of that student such as a shown in FIGS. 23 and 24 and is easily viewable by the professor or by any of the student in that session. In addition, or alternatively, each student's question or the topic of that question is also displayed along with the image of that student such as is shown in FIGS. 26-28. Thus, the professor may choose to move a student up based upon the estimated time of the student question, the topic of the student question, a combination of those, or for any other reason.

In a next step 686 the professor selects a student to move up to the front of the queue by clicking upon the Next button below the image of that student, for example by clicking upon button 666 in order to move student James up to the front of the queue, presumably because his question will only take one minute, as shown in FIG. 23. Application 101 receives this input and performs the following steps. Next, in step 688 the audio feed of the spotlight student Patrick is muted and his video is disabled if necessary. In step 690 the selected student James is moved to the front of the queue, his audio feed is un-muted and his video is enabled, and the rest the students in the queue are moved one position down as shown in FIG. 24. Accordingly, control may return to step 682 and James is now the spotlight student and may converse with the professor while the other students may only listen.

In another optional feature of this embodiment, in step 692 the application 101 has calculated the end of the office hours in relation to the queue (using input from the professor re duration of office hours, current time, and the estimated times of student questions shown) and has graphically draw a line in-between the fourth and fifth positions shown at 670a or 670b indicating that the office hours will end before Jessica has a chance to talk to the professor. This line is visible on the professor and all student's computers.

State Your Question

In another embodiment of the invention the professor may decide to un-mute multiple students in order to have multiple students speak at once based upon the estimated time of their questions, topic of their questions, or for other reasons.

FIG. 26 illustrates the session in which student's questions and their estimated times are displayed superimposed on their images. FIGS. 19-22 disclose capturing this information. The professor is currently speaking with spotlight student Patrick. As shown, the topics of questions 704-710 are superimposed on the corresponding students along with the estimated time of the questions. In particular, James has input that his topic is 710 the "same question topic as student 2." Also below each waiting student as described above is a Mute/Un-mute button 504-510 allowing the professor to mute or un-mute individual students. The professor notices that Poppy will be the next student and that James has indicated that his question is the same as Poppy's question. The button 422 is in gray indicating that the professor has finished speaking with the spotlight student Patrick and has pressed this button in order to advance the queue. Accordingly, the queue advances as has been discussed above.

FIG. 27 illustrates the session after the professor has pressed the Next button. As shown, Patrick has moved to the end of the queue and is now muted, and all of the other students have moved up one position. Because the professor has noted that James has the same question as Poppy does, the professor has selected button 508 (now shown in gray) thus allowing James to be un-muted and also join the conversation. The professor may also choose any other student to be un-muted based upon the time of their question or for any other reason. Thus, the professor, Poppy and James now have a conversation regarding quadratic equations while the other students listen. At the end of this conversation the professor has again selected button 422 because the conversation with Poppy and James is over, and thus the queue advances once again. Application 101 unmutes James after the professor presses the button by sending a signal to the computer James to counter the previous mutual override signal therefore allowing James to speak.

FIG. 28 illustrates the session after the professor has pressed the Next button for the second time. As shown, and as described above, because both Poppy and James were un-muted when the professor pressed Next, they both now move to the end of the queue with Poppy appearing before James. The students each move up accordingly and Cayne is now the spotlight student.

Automatic Closing of Session

In this embodiment, the session may be automatically closed. The professor may choose to close the meeting room at any time, but there is also an automatic trigger which closes entry to the room when the estimated wait time of a student in the queue (or who is about to join) is such that the student is unlikely to be first in line before the end of the professor's office hours. If so, the meeting room is locked and students will be unable to join. Or, the student is allowed to join with a warning, i.e., this trigger may also be turned off, if professors prefer that students are able to join and are simply told that that they are unlikely to be seen in time.

There is also an option for students to submit questions to professors if they cannot stay in the office room, thus professors receive a report of outstanding questions at the end of the session. Professors may then elect to cover these topics in a subsequent class, or send out resources or a general e-mail message about these questions after the meeting.

Figure 29:
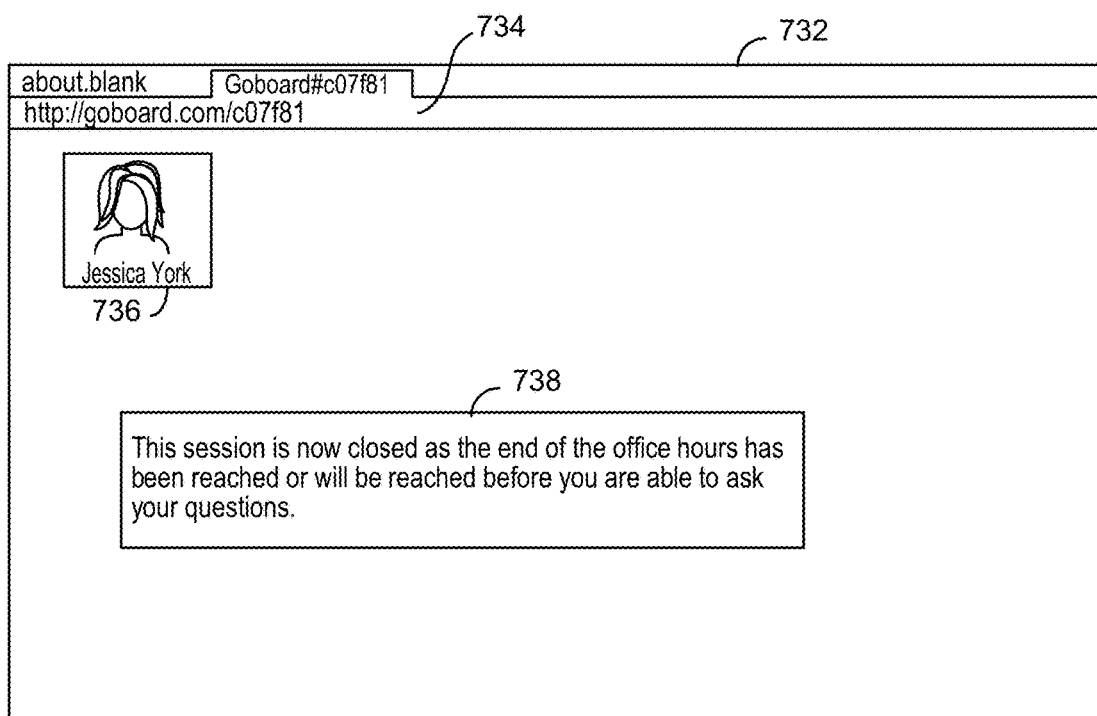
FIG. 29 illustrates a page of the session displayed to a student when the session is closed.

FIG. 29 illustrates a page 734 of the session displayed to a student when the session is closed. Student Jessica has attempted to join an online session (such as session 740 shown in FIG. 30) using her browser 732, and has signed in as shown in FIGS. 3A and 3B, but the session is closed or will be closed. Thus, instead of being shown the welcome page of FIG. 4, her browser displays page 734 including window 738 informed her that either the session is now closed because office hours is over, or office hours will end before she is able to ask a question. Her image and name 736 appears on the page because she has signed in and because her computer camera has captured her image, as shown in FIG. 4.

Figure 30:
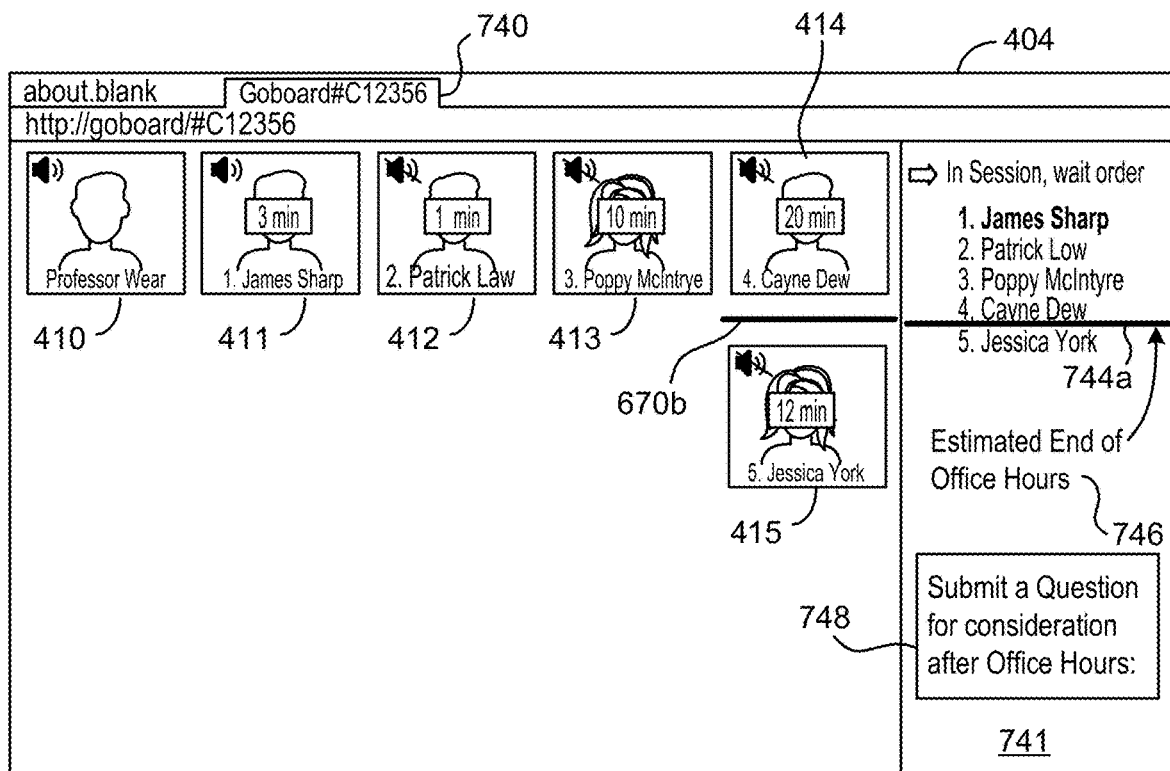
FIG. 30 illustrates a session in which a new student has joined but is warned that office hours may end before she is able to speak with the professor.

FIG. 30 illustrates a session in which a new student has joined but is warned that office hours may end before she is able to speak with the professor. Shown is session 740 in which the professor and students 411-414 have joined earlier and Jessica has been allowed to join. Application 101 calculates the end of office hours, draws line 744a (or other graphical representation) between the last two students and displays warning 746 with an arrow. In addition, window 748 allow Jessica to enter a question that the professor may consider after office hours has ended. The line (or other) may also be drawn between images as shown at 744b.

Figure 31:
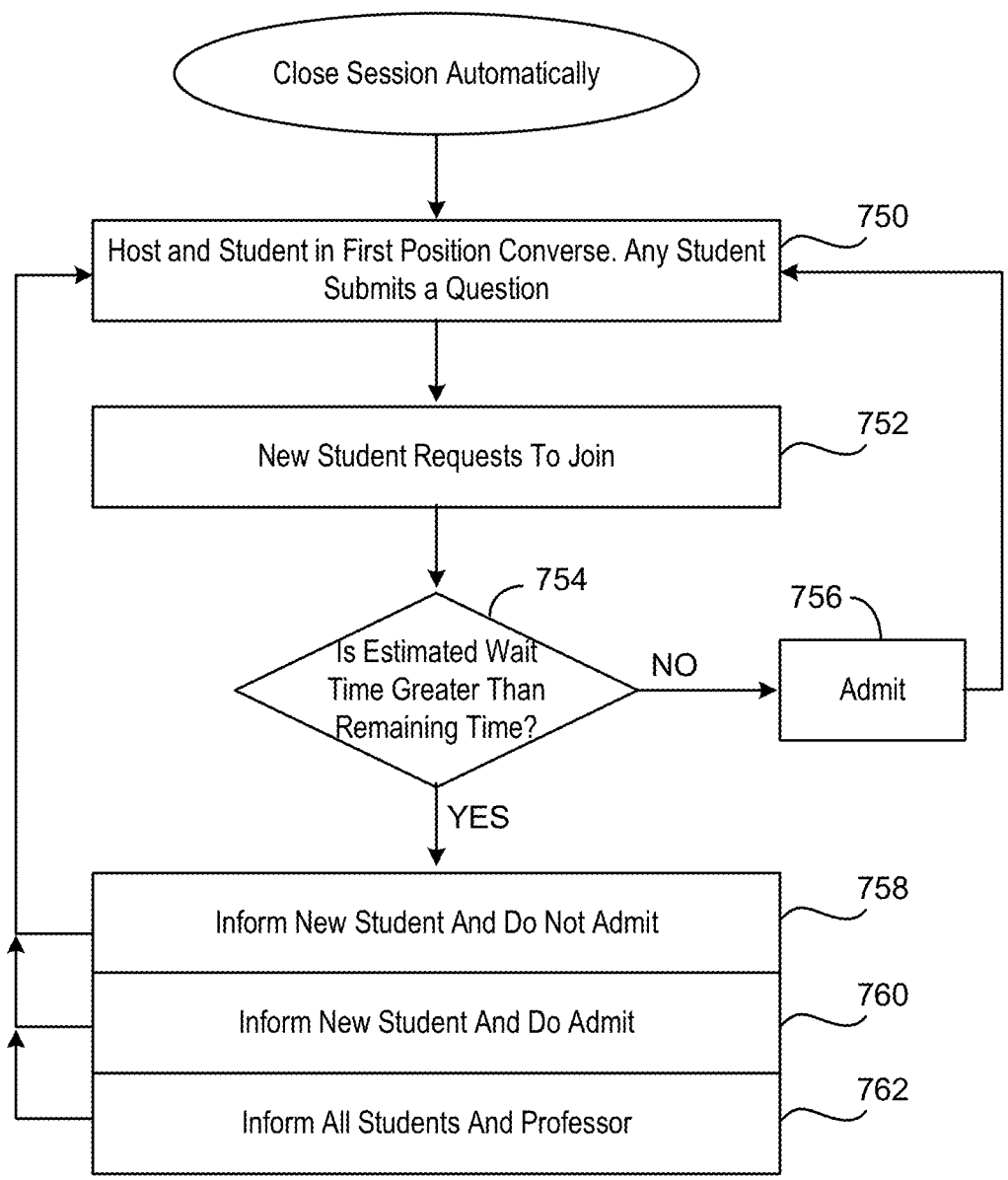
FIG. 31 is a flow diagram describing embodiment in which the session may be closed automatically and in which students may submit questions for later consideration by the professor.

FIG. 31 is a flow diagram describing embodiment in which the session may be closed automatically and in which students may submit questions for later consideration by the professor. In a first step 750 the professor and the spotlight student converse during an online session while other students wait in the queue and listen as has been described above. An example is shown in FIG. 30 (showing the situation if Jessica is allowed to join). In a next step 752 a new student, Jessica, requests to join the session as has been described above, such as by signing in as shown in FIGS. 3A and 3B.

In step 754 application 101 calculates whether the estimated wait time for this new student is greater than the time remaining in the professor's office hours. Using the example as shown in FIG. 30, assuming that the professor's office hours are from three p.m. until five p.m. and that the current time is four forty-five p.m., the application determines that the estimated wait time for Jessica is approximately 34 minutes (based upon the estimated question time for each of the students further ahead in the queue as shown). The application may choose to ignore the estimated wait time for the spotlight student (as he or she may almost be finished) and may choose to weight any of the estimated question times more or less depending upon any of the factors listed above. Because it is then estimated that Jessica will be the spotlight student at 5:19 p.m. (summing all estimated question times), and office hours ends at five p.m., control moves to step 758, Jessica is not admitted to the session and is shown the display screen and window 738 as shown in FIG. 29. The session continues as shown in FIG. 30 but without Jessica. Any other subsequent student who attempts to join would not be admitted. The end of office hours may be a time input by the professor when he or she first joins the session, first reserves the session, first sends out a notice of the session to all participants, by the professor entering the start and stop time of office hours when he logs in, or by input from a calendar application such as a third-party calendar, such as Google Calendar.

On the other hand, if her wait time happens to be 15 minutes or less, the application may choose to admit Jessica because as a design choice any student who begins speaking with the professor before the end of office hours may be allowed to continue speaking with the professor even after office hours has ended. Thus, after step 754 control moves to step 756 and Jessica is admitted as shown in FIG. 30.

An alternative embodiment is shown in the FIG. 30. In this embodiment even though office hours may end before Jessica becomes the spotlight student she is still allowed to join the session and a warning is provided. Thus, control moves from step 754 to steps 756 and 760 and Jessica is admitted. Thus, as shown in FIG. 30 Jessica becomes the last student in the queue and application 101 draws line 744a or 744b, and adds warning 746 indicating that office hours will end before Jessica becomes the spotlight student. Once she is in the session she may input her question into window 748 in case she is not able to speak with the professor. Window 748 is also displayed on the computers of the other students in the session, allowing any of them to input a question (at any time, as shown in step 750) in case they are not able to speak with the professor because office hours and his or because they need to leave. The application accepts this input from window 748 from one or more students, saves it in a suitable database until the session ends, and then makes the questions available to the professor such as by sending the questions in an e-mail message to the professor or by displaying the questions on the professor's screen after the session has ended.

And, as shown in steps 760 and 762, line 744a and 744b and warning 746 are displayed on the computers of the professor and of all the students in the session whether Jessica is admitted or not. In this manner, each student in the professor can quickly and visually see when the session ends. Students who are after the cutoff may decide to input a question into window 748, may decide to leave the session, may decide to stay and take their chances. The professor may use information 744, 746 in order to advise students to input a question, leave the session, one may even tell them verbally or via chat that he is extending office hours.

Turn Student Video On or Off

In other embodiments of the invention the video feeds of the students waiting in the queue may be automatically off when they join the session, and, the professor may manually turn their video feeds on and off. As previously explained and shown in FIG. 5 and in FIG. 19, the video feeds of students joining may by default be turned on when each student joins.

Figure 32:
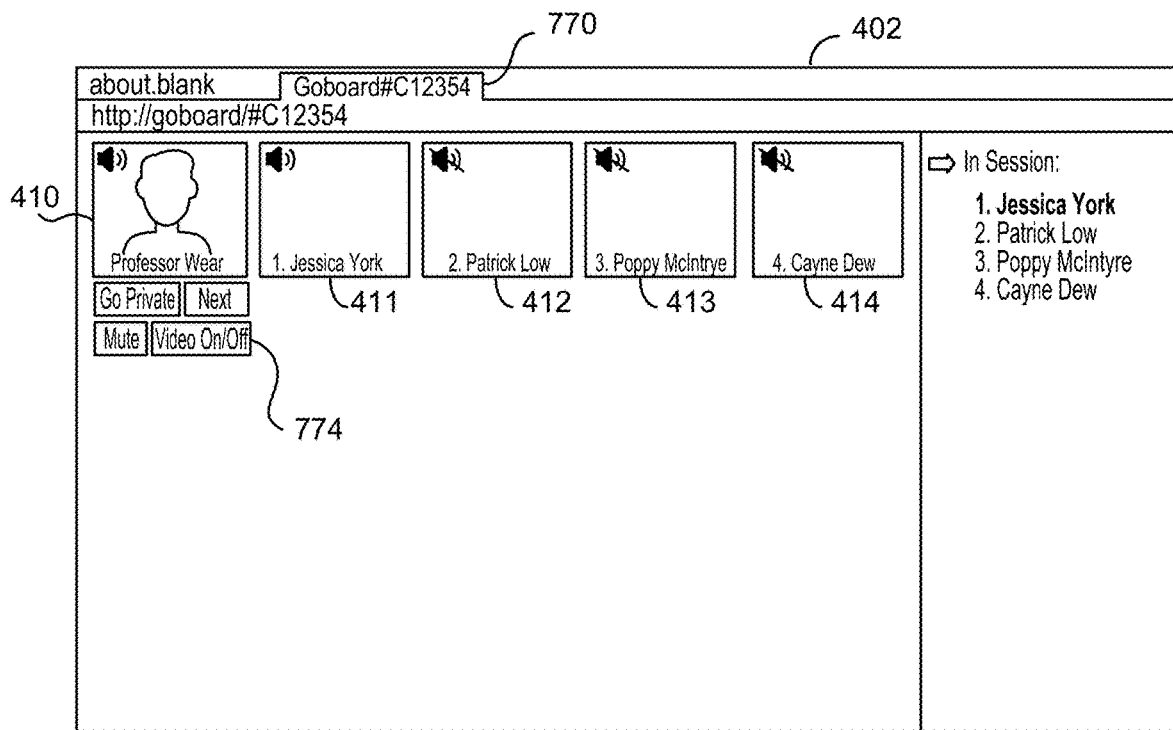
FIG. 32 illustrates a session in which the video feeds of students joining are automatically turned off.

FIG. 32 illustrates a session 770 in which the video feeds of students joining are automatically turned off. As shown, the video feeds of the professor and the spotlight student Jessica are both on (Jessica's video feed being turned on when she became the spotlight student) while the video feeds of Patrick, Poppy and Cayne are all off (their video feeds being turned off automatically when each joins). None of the computers in the session would see the video feeds of these three students in the queue, although these three students would see the video feeds of the professor and Jessica. The professor has a toggle button 774 by which he may turn on the video feeds of these three students, thus allowing every computer in the session to see those three video feeds (not shown). By default, application 101 will turn off the video feeds of the other students in the queue when they join by sending a video feed override to each of the student computers, thus effectively mutating the video feed from these computers.

Figure 33:
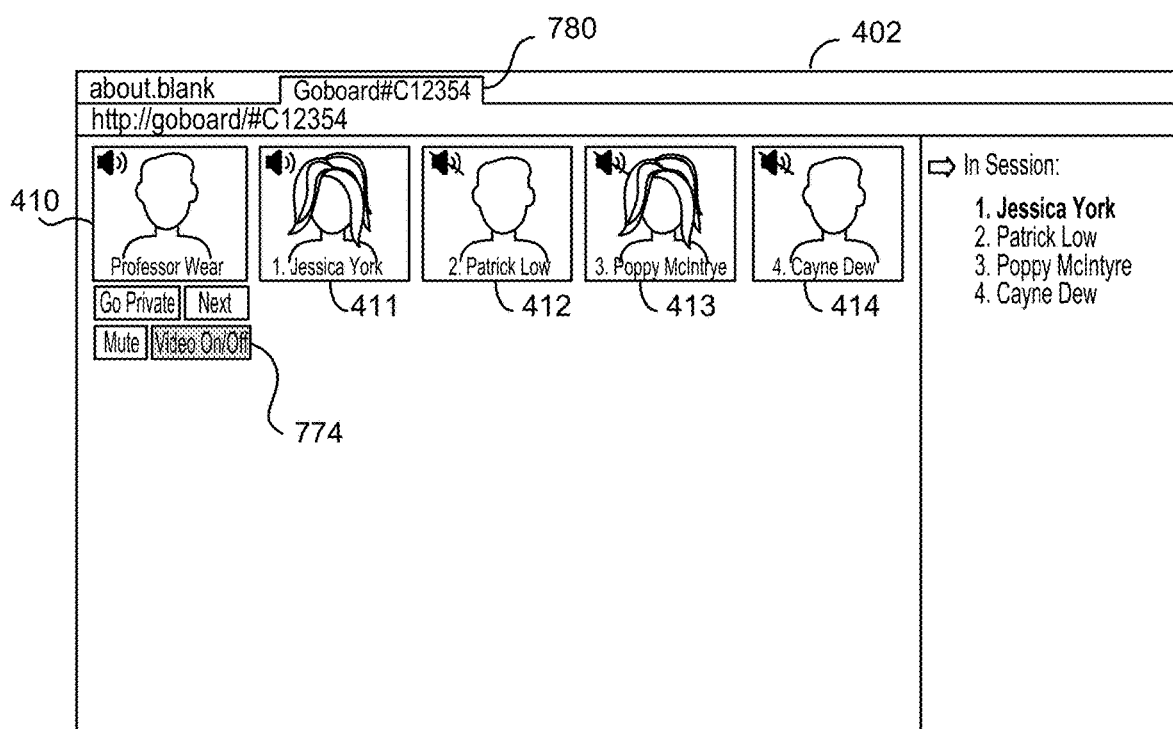
FIG. 33 illustrates a session in which the video feeds of students joining the session are automatically turned on yet the professor has the ability to turn them off.

FIG. 33 illustrates a session 780 in which the video feeds of students joining the session are automatically turned on yet the professor has the ability to turn them off. As shown, all of the video feeds of everyone in the session are on and everyone in the session may see one another. The professor has a toggle button 774 by which he may turn on and off the video feeds of the three students waiting in the queue. Currently, all video feeds are on, but the professor has just clicked button 774 in order to turn off those video feeds. Application 101 will turn off the video feeds of just the students in the queue when the professor selects a button by sending a video feed override to each of these computers.

Figure 34:
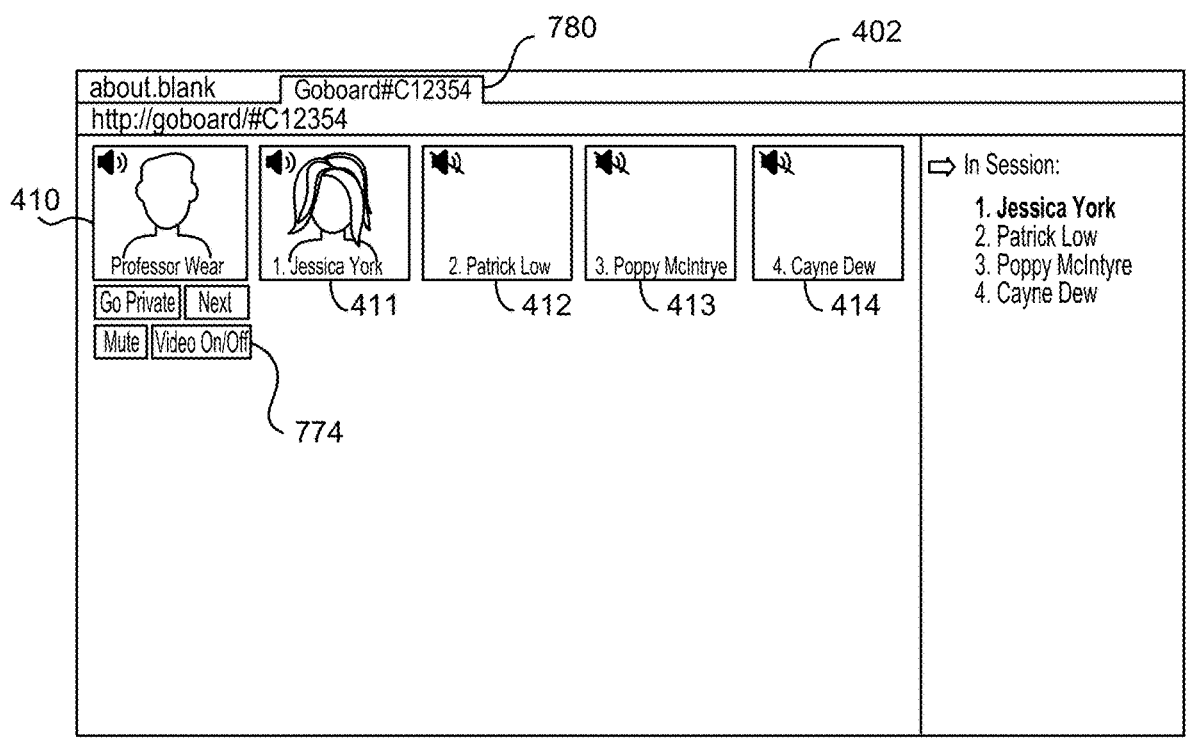
FIG. 34 now shows session in which the video feeds of the students in the queue have been turned off.

FIG. 34 now shows session 780 in which the video feeds of the students in the queue have been turned off. As shown, everyone in the session may see the video feeds of the professor and Jessica, but the video feeds of the other students in the queue are off and no one in the session may see their videos. As previously explained, once the professor hits the Next button (or moves any student up to the spotlight position) the video feed for that student will be turned on.

Move Students to Waiting Room

Above are described techniques in which a queue of students is managed within the actual meeting room where the professor speaking, and these technique specifically do not use a traditional waiting room in the sense that the professor must manage that room and admits students from the waiting room one at a time. In yet another embodiment now described, there is a waiting room that the professor may use when necessary to which he may move students back and forth en masse, although the professor is in complete control, the waiting students are moved altogether and not one by one, and the queue is still implemented within the waiting room. Of course, the professor also has the option of selecting private mode or turning off the video feeds of the waiting students instead of moving them all to a waiting room.

Figure 35:
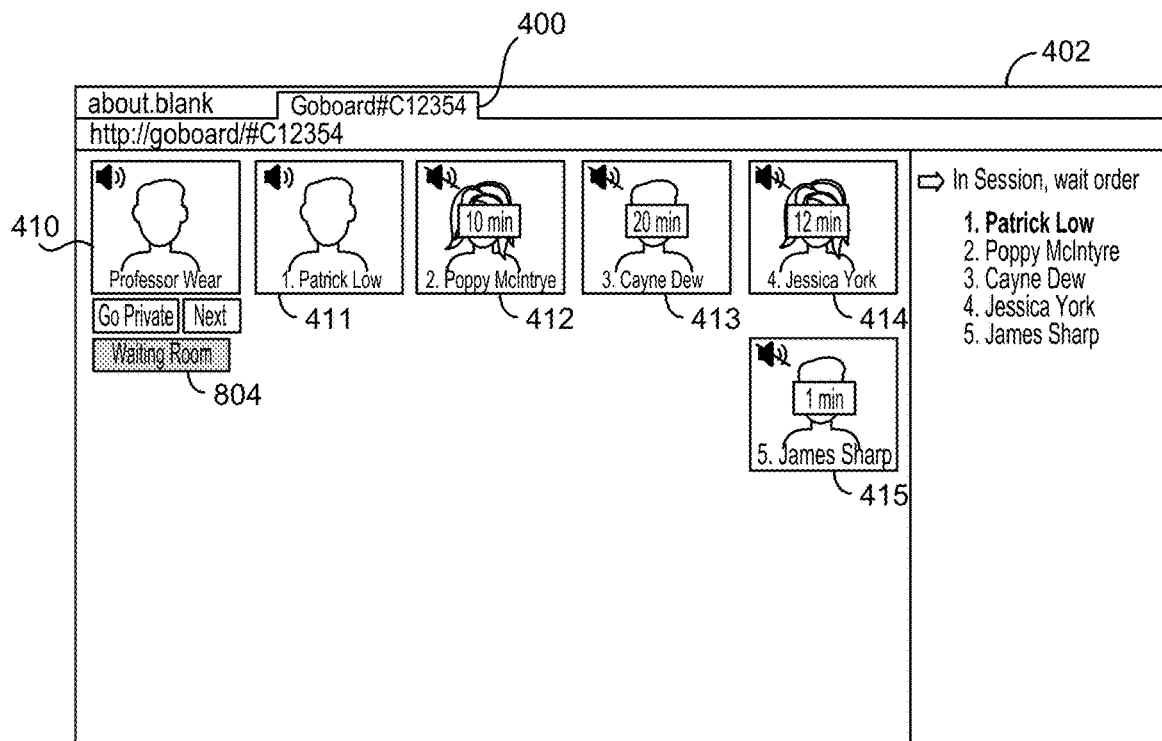
FIG. 35 illustrates a session within the browser of the professor computer where he has the option of moving all waiting students into a waiting room.

FIG. 35 illustrates a session within the browser 402 of the professor computer where he has the option of moving all waiting students into a waiting room. As shown, the professor is conversing with the spotlight student Patrick, and the other three students are waiting in the queue. For whatever reason, the professor has decided that the presence of these four other students in the meeting room is a distraction, affects privacy, etc., and has decided to remove them temporarily from the meeting room, yet still maintain the functionality of the queue. Shown is a Waiting Room button 804 in gray, indicating that the professor has just selected this button in order to move the four waiting students into the waiting room.

Figure 36:
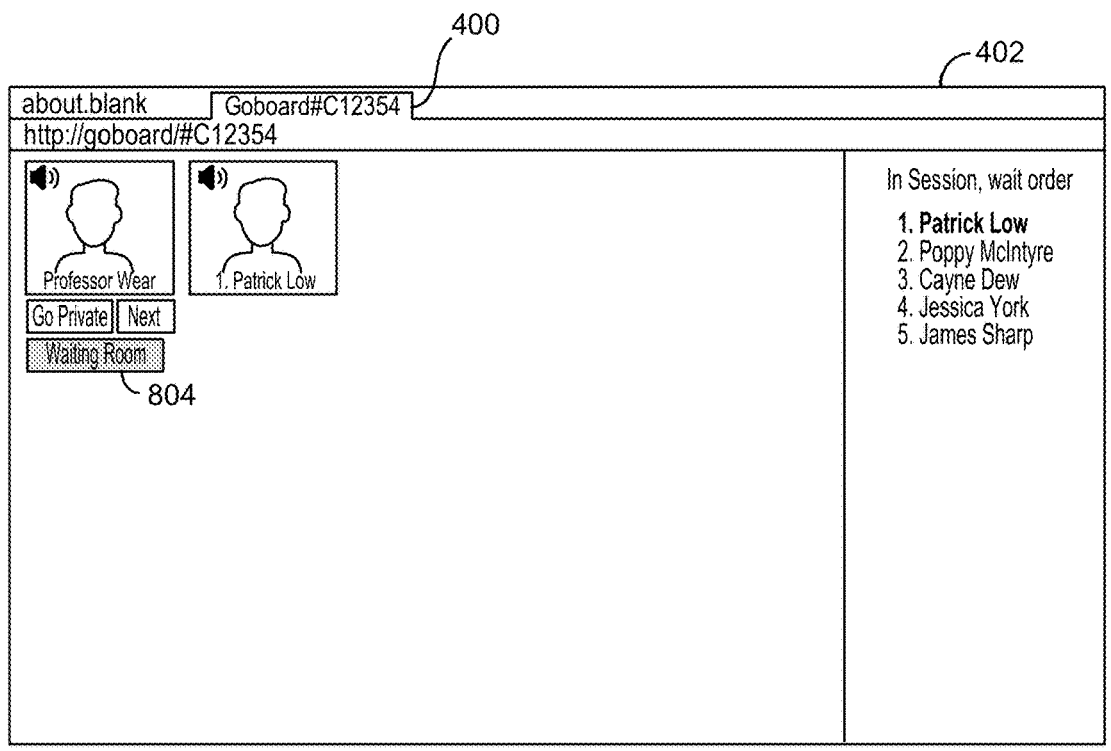
FIG. 36 illustrates the session of the previous figure after the professor has selected the Waiting Room button.

FIG. 36 illustrates the session of the previous figure after the professor has selected the Waiting Room button. As shown, the four waiting students are no longer present within session 400 and button 804 is still in gray indicating that the waiting room functionality has been implemented.

Figure 37:
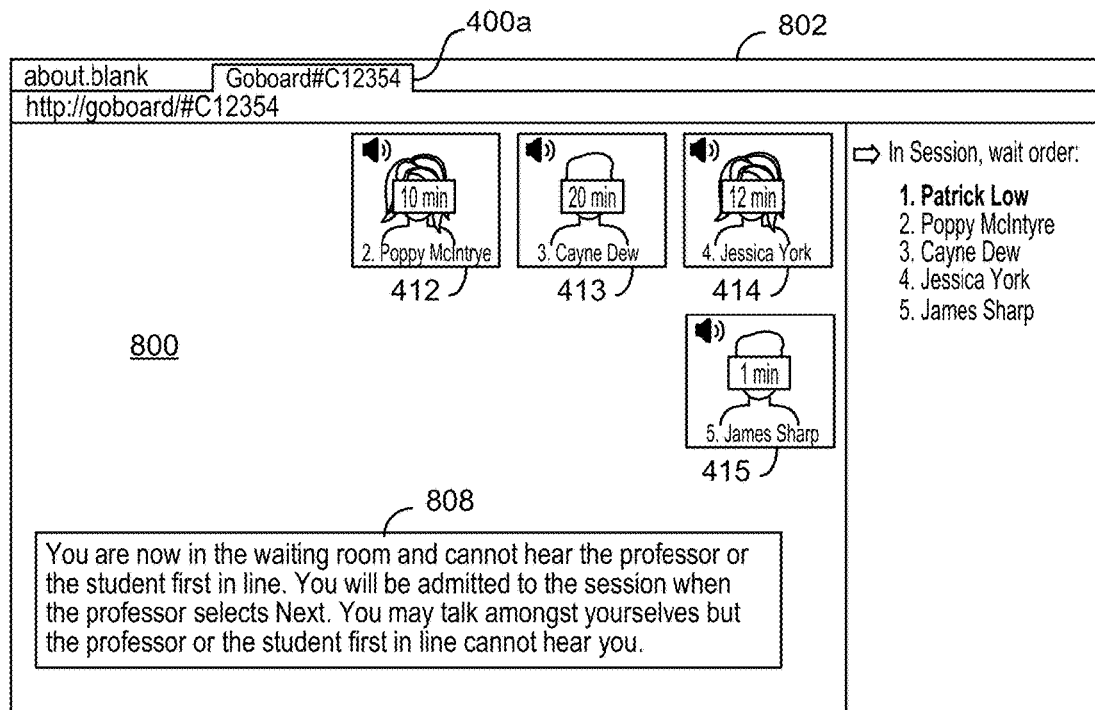
FIG. 37 illustrates a waiting room shown from the perspective of any of the waiting student's computers.

FIG. 37 illustrates a waiting room 800 shown from the perspective of any of the waiting student's computers. Waiting room 800 is implemented within tab 400a of browser 802 on one of the student computers and includes window 828 explaining to the students the purpose of the waiting room. As shown, then these four students are still in the queue in the same order, and their microphones have been un-muted so that they may now speak to one another but their conversation cannot be heard by the professor and the spotlight student, nor can the conversation of the professor and the spotlight student be heard by the students in the waiting room. As their video feeds were enabled in the meeting room, these feeds are enabled in the waiting room. Had these feeds been disabled in the meeting room, they would also be disabled in the waiting room.

Figure 38:
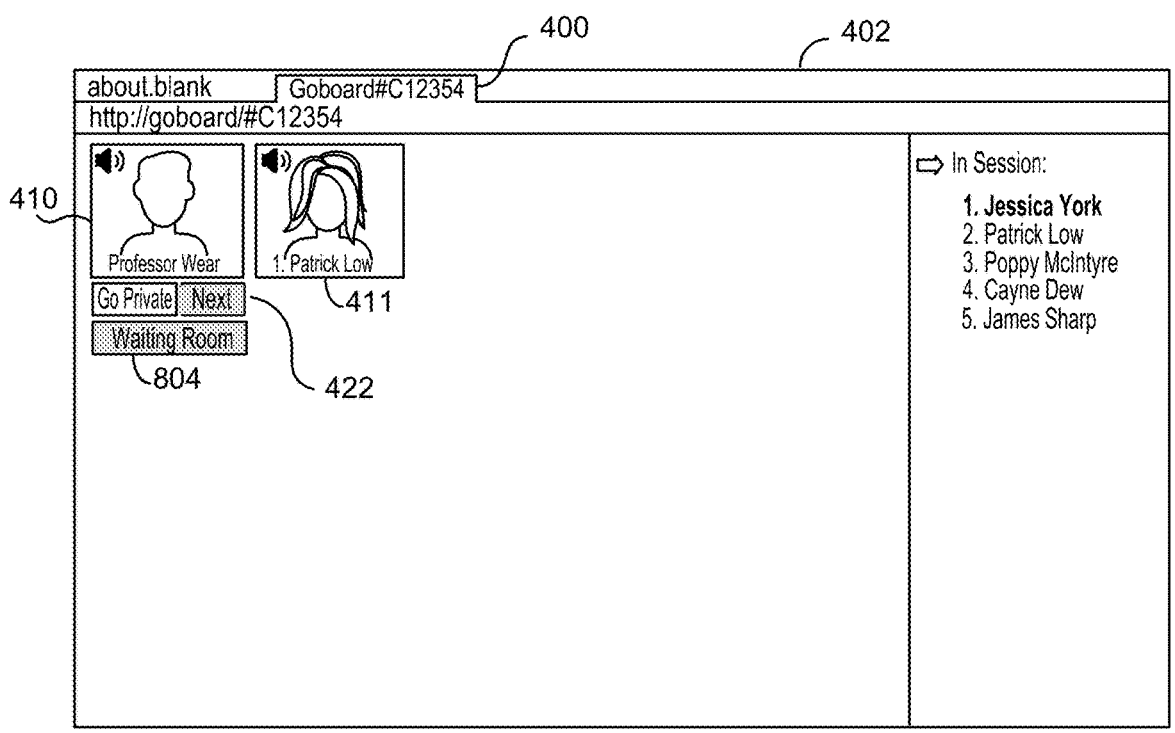
FIG. 38 illustrates the session from the perspective of the professor computer as he prepares to select the next student in the queue.

FIG. 38 illustrates the session from the perspective of the professor computer as he prepares to select the next student in the queue. As shown, the professor is speaking with the spotlight student Patrick, button 804 is still in gray indicating that the waiting students are in the waiting room, and the professor has just selected the Next button 422 in order to speak with the next student in the queue.

Figure 39:
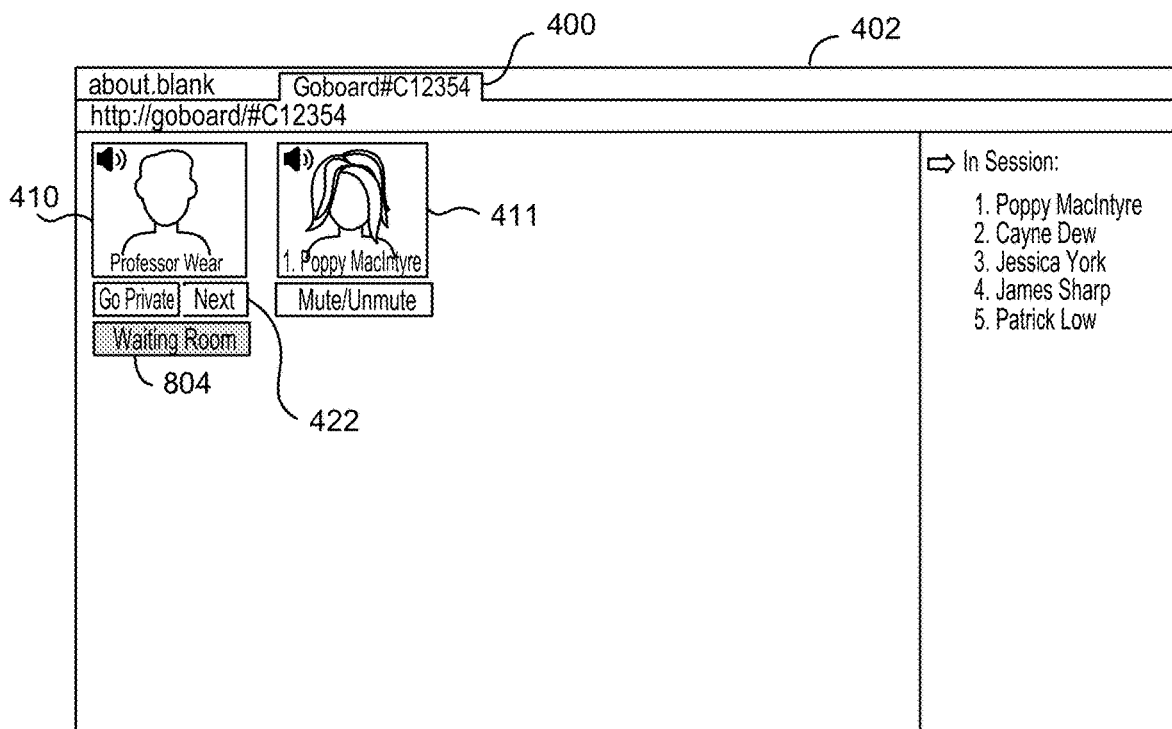
FIG. 39 illustrates the session from the perspective of the professor computer after he has selected the Next button.

FIG. 39 illustrates the session from the perspective of the professor computer after he has selected the Next button. As shown, the former spotlight student Patrick has disappeared and the next student in the queue, Poppy, now appears in the spotlight position with her audio feed now un-muted.

Figure 40:
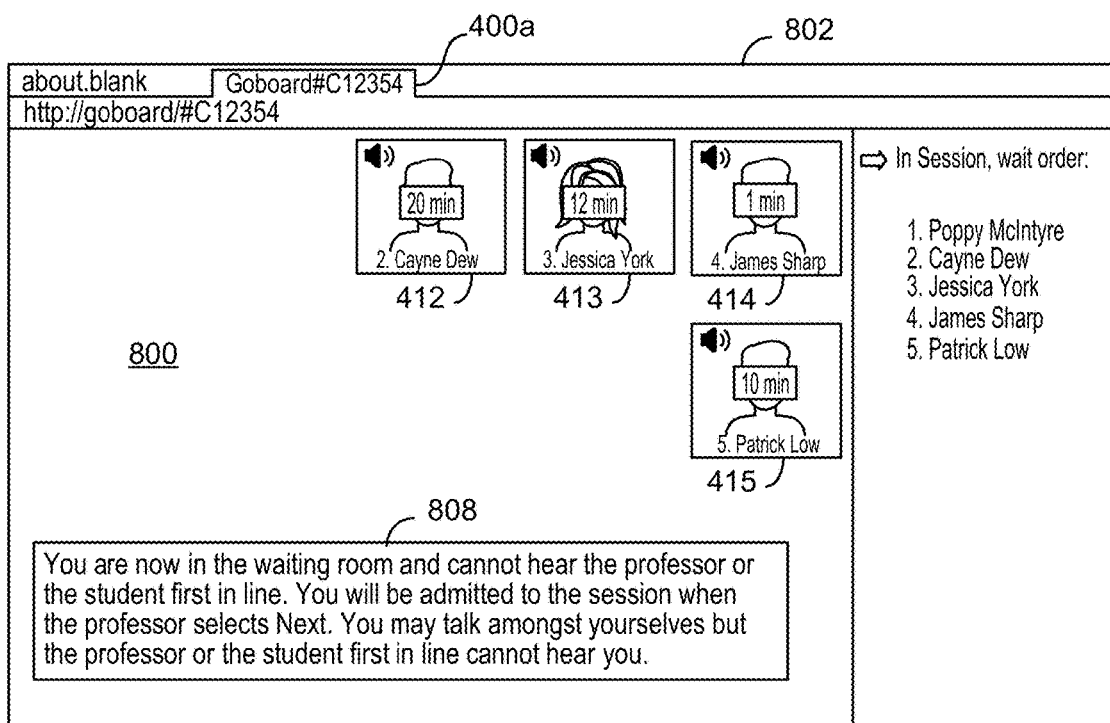
FIG. 40 illustrates the waiting room from the perspective of any of the waiting students computers after the professor has selected the Next button.

FIG. 40 illustrates the waiting room from the perspective of any of the waiting students computers after the professor has selected the Next button. As shown, Poppy is no longer in the queue as she has been moved up to the spotlight position and Patrick has now been moved to the end of the queue. Window 808 is still present and all of the students are un-muted and may speak with one another.

Figure 41:
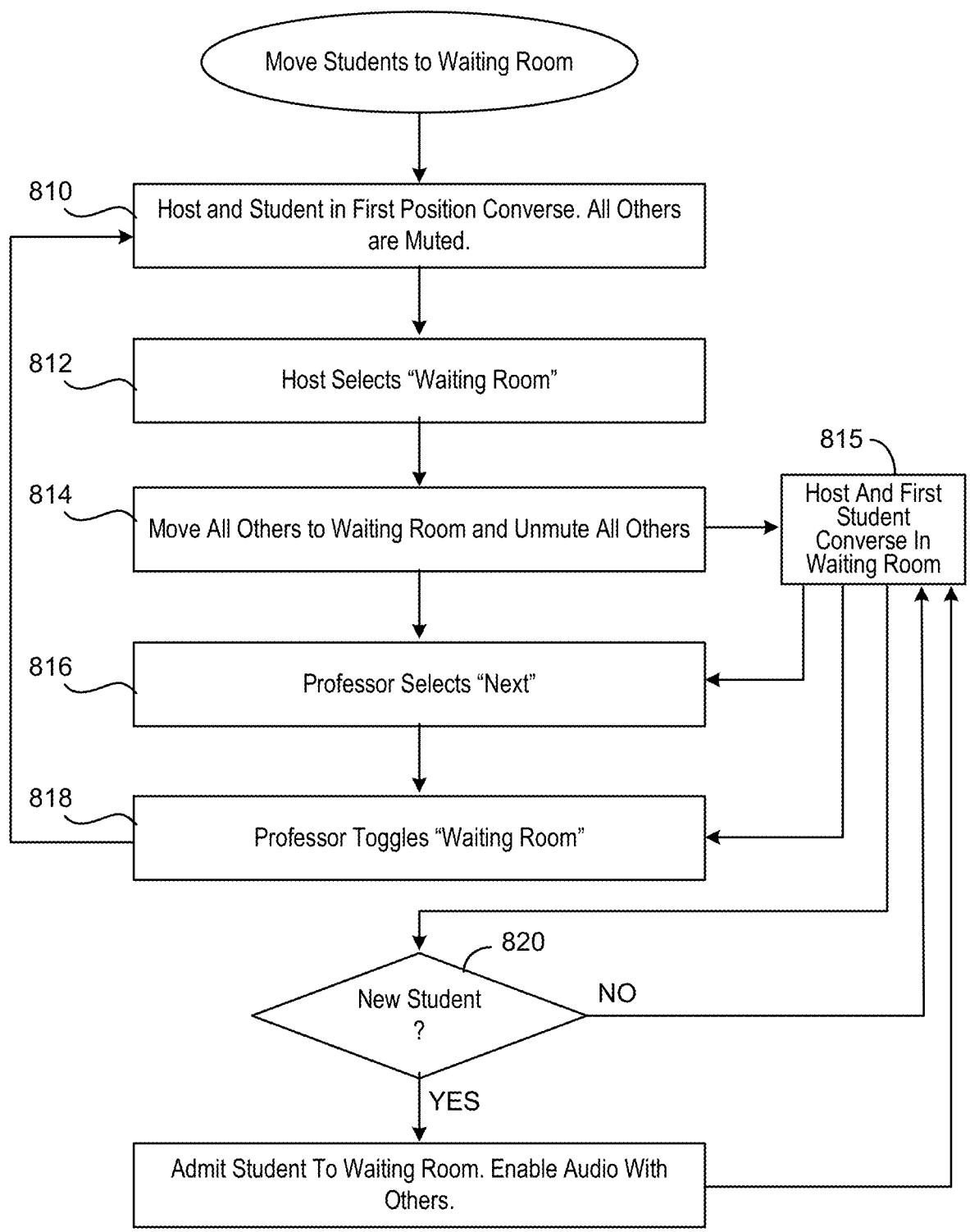
FIG. 41 is a flow diagram describing the embodiment in which the waiting students are moved to the waiting room.

FIG. 41 is a flow diagram describing the embodiment in which the waiting students are moved to the waiting room. In a first step 810 the professor and the spotlight student converse while all other students are muted such as is shown in FIG. 35. Next, for any of a variety of reasons, in step 812 the professor selects his or her Waiting Room button in order to move all the waiting students from the current session into the waiting room. The professor may not wish the other students to watch the conversation, may feel that the other students provide a distraction, may need more room on the screen for a whiteboard, or for other reasons.

In step 814 all of the students waiting in the queue (except for the spotlight student) are moved to the waiting room and their audio feeds are un-muted so that they may talk to one another. Only the professor and the spotlight student remain in the original session, such as is shown in FIG. 36. FIG. 37 shows the students in the queue in the waiting room still in their original order, un-muted and able to speak to one another but unable to listen to or see the conversation between the professor and the spotlight student. Likewise, the professor and the spotlight student cannot hear their conversation.

In addition, the students in the waiting room are unable to see what the professor and the spotlight student may be drawing upon the electronic whiteboard. The electronic whiteboard feed from the central server (or from a peer computer) is disabled to the students who are in the waiting room. The professor and the spotlight student, however, may still draw upon the electronic whiteboard and see what each other has drawn. Disabling of the electronic whiteboard feed also occurs in the "Go Private" Mode; in other words, in the private mode the electronic whiteboard feed is also disabled to the computers of the waiting students who are not in the private mode with the professor.

At this point in time, in step 815, the professor and the spotlight student may converse in complete privacy and, likewise, the waiting students in the waiting room may converse amongst themselves while still within their original queue order. At any time, the professor may click the Next button in step 816, may click the Waiting Room button in step 818 in order to bring those students back into the original session and dispense with the waiting room, or a new student may ask to join the session in step 820.

Accordingly, in a next step 816 the professor has finished speaking with spotlight student Patrick, as shown in FIG. 38, and has selected the Next button 422 in order to bring in the next student from the waiting room. Accordingly, as shown now in FIG. 39, the next student in the queue, Poppy, is moved back to the meeting room and now becomes the spotlight student, is un-muted and may converse with the professor. And, as shown in FIG. 40, the former spotlight student Patrick has now been moved to the end of the queue in the waiting room and the other students each move up one position. The professor may continue conversing in this fashion leaving the waiting students in the waiting room and pressing the Next button when needed.

At some point (after step 816 or after step 815), the professor decides that he would like to bring all the students back into the session and dispense with the waiting room so in step 818 he toggles the Waiting Room button 804 and the queue in the waiting room is now brought back into the original session 400, such as is shown in FIG. 35, except that the queue would be in the order it had been right before the professor toggled button 804 and the spotlight student remains the same. For example, given the situation in FIG. 40, if the professor toggles button 804 at this point in time then Poppy remains the spotlight student, and waiting students Cayne, Jessica, James and Patrick are moved back to the original session in that same order and still in the queue.

Returning now to step 815, if a new student request to join the session in step 820 then that new student signs in, enables camera and microphone as discussed above, but is not admitted into the session as shown in FIG. 36. Instead, because the professor has moved all of the students to the waiting room, the new student is admitted to the waiting room, is placed at the end of the queue, and has his or her audio feed enabled such that he or she may converse with the other students in the waiting room.

Separate Waiting Room

In an additional embodiment, each student computer displays a button "Waiting Room" which allows each student to unilaterally place himself or herself into a separate waiting room if he or she needs some time to privately discuss a matter with someone else. In some situations the other students in the queue may realize that they do not need to listen to the current conversation between the professor and the first student and would rather bide their time by discussing a different matter. When the "Waiting Room" button is pressed, that student then appears in a separate waiting room where he cannot see or hear the other students or the professor, and similarly, the other students in the professor cannot see or hear that student in the waiting room. An icon, name, still image or other of the student in the separate waiting room will still remain upon the displays of the other students and the professor, but below this name will be a symbol, phrase or the like indicating "Waiting Room" (but in gray, or other) thus indicating to the others that this student has moved himself to the separate waiting room. Advantageously, and preferably, more than one student waiting in the queue will move himself or herself to this separate waiting room so that those students may converse privately. Below each of these students in the waiting room will be the button "Waiting Room" in gray, indicating that each is in the separate waiting room, each may press this button to return to waiting in the queue as before.

Use of Whiteboard

In another embodiment of the invention, both the professor and the spotlight student are able to collaborate and draw upon a shared, online whiteboard, while the rest of the waiting students in the queue may not draw upon the whiteboard but may see it.

Figure 42:
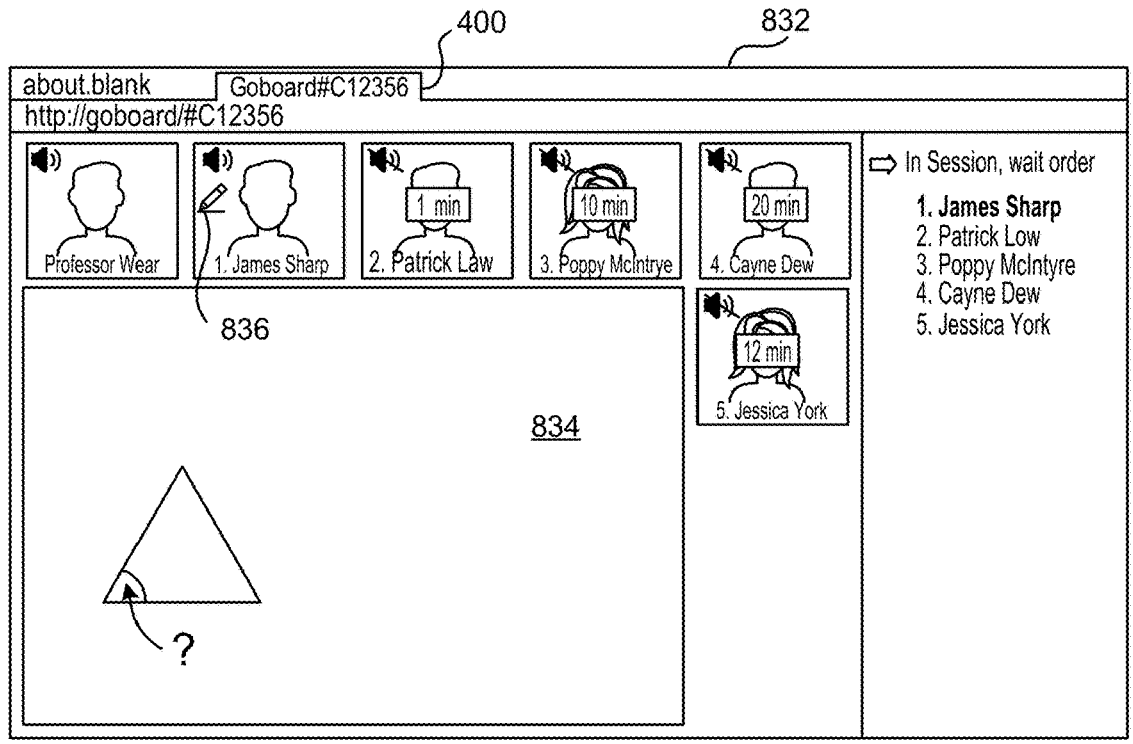
FIG. 42 illustrates a session from the viewpoint of the spotlight student computer showing the ability to draw upon the whiteboard.

FIG. 42 illustrates a session from the viewpoint of the spotlight student computer showing the ability to draw upon the whiteboard. As shown from the perspective of browser 832 on James' computer, by virtue of being the spotlight student, has access to a drawing pen icon 836 which allows him to draw upon whiteboard 834 (in this example showing a triangle with a question about a particular angle). Although not shown, the professor computer also enables him or her to draw upon the shared whiteboard by clicking upon a similar pen icon. Techniques and tools for drawing upon a shared whiteboard, and for displaying a shared whiteboard to many participants during a video conference session are disclosed within the application and patents incorporated above and are generally known in the art. While the professor always has the ability to create and draw upon the shared whiteboard, the spotlight student is only given that capability in step 442, for example, when he or she first joins the session, and whenever he or she becomes the spotlight student as students move up through the queue, such as when the professor clicks the Next button, as described in step 478.

Figure 43:
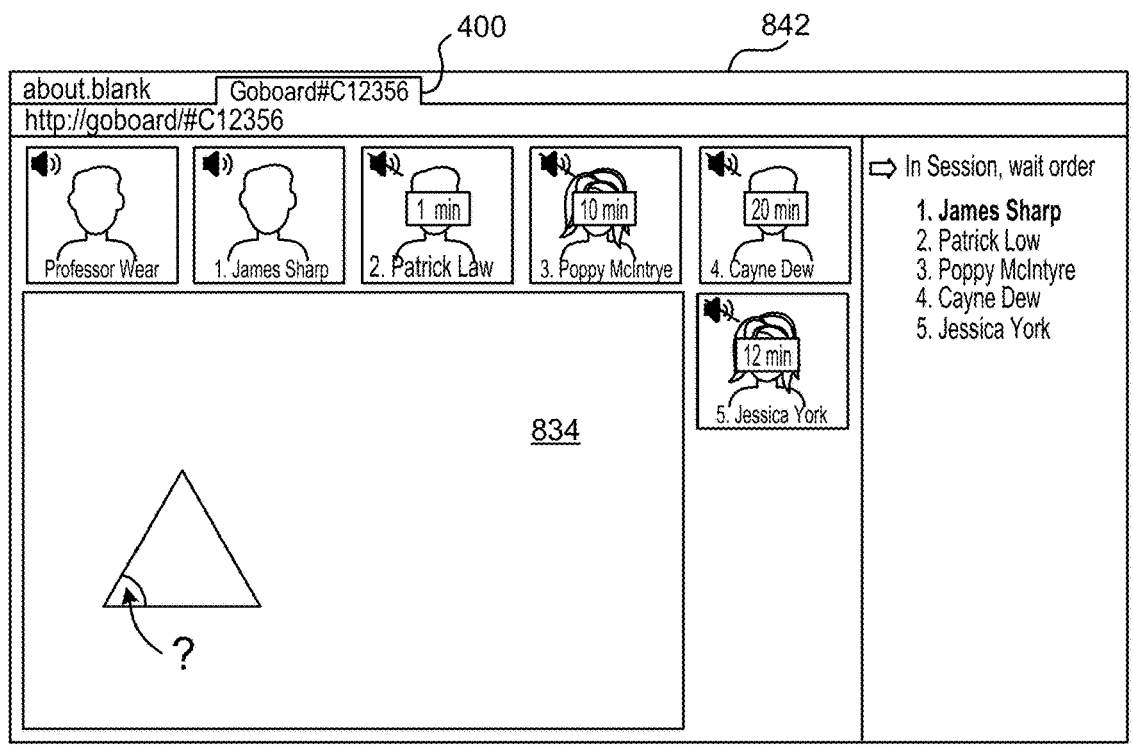
FIG. 43 illustrates the session from the viewpoint of one of the other students waiting in the queue (Patrick, Poppy, Cayne or Jessica).

FIG. 43 illustrates the session from the viewpoint of one of the other students waiting in the queue (Patrick, Poppy, Cayne or Jessica). As shown, while their browser 842 does display the same whiteboard 834 that the professor and spotlight student are drawing upon, there is no pen icon available to any of these waiting students and they are not permitted to draw upon the shared whiteboard. Application 101 restricts the ability to draw upon the shared whiteboard to only the professor and the spotlight student by disabling whiteboard input from the other students.

Student Chat Window

In this embodiment of the invention, students waiting in the queue can chat with each other, but only to each other; the professor and the spotlight student cannot see these conversations, which prevents distractions. These conversations occur in a student chat window, so that all the other waiting students can see the conversations. In addition, there is a normal chat window, the professor chat window, available to all participants in the session and controlled by the professor.

Figure 44:
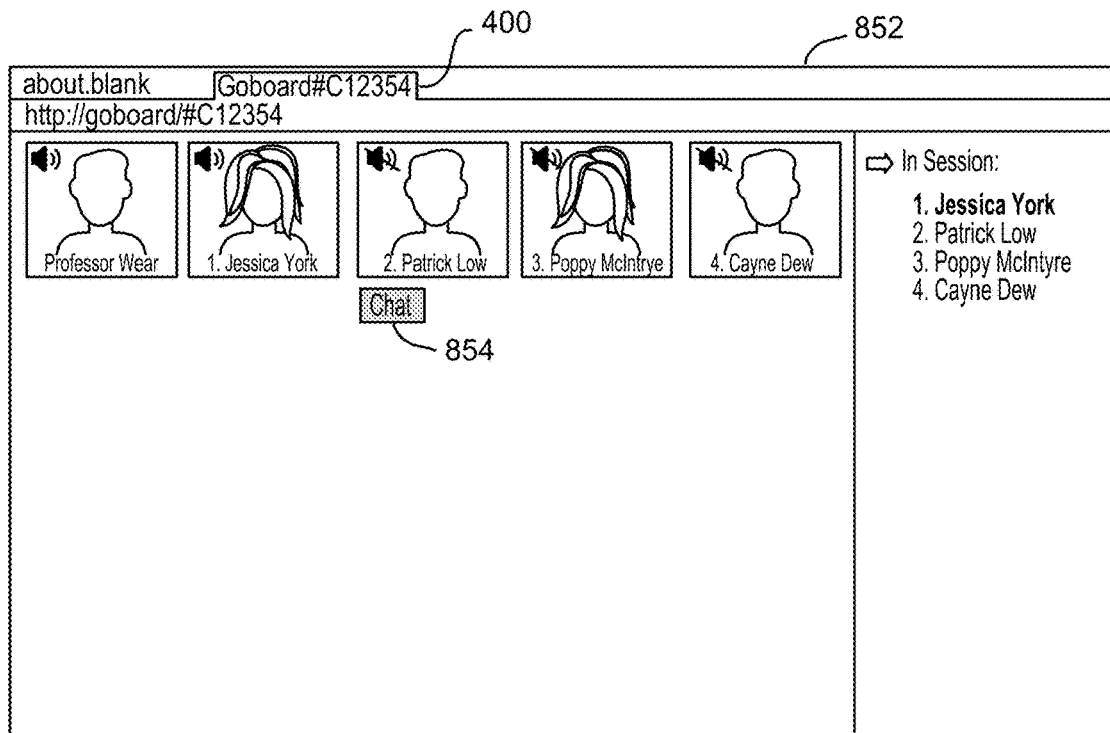
FIG. 44 illustrates a session from the student Patrick perspective in which he has initiated the student chat window.

FIG. 44 illustrates a session from the student Patrick perspective in which he has initiated the student chat window. Shown on Patrick's computer below his image is a Chat button 854 shown in gray indicating that he has selected this button in order to initiate the student chat window. This Chat button also appears on the computers of Poppy and Cayne, but does not appear on the computers of the professor or Jessica.

Figure 45:
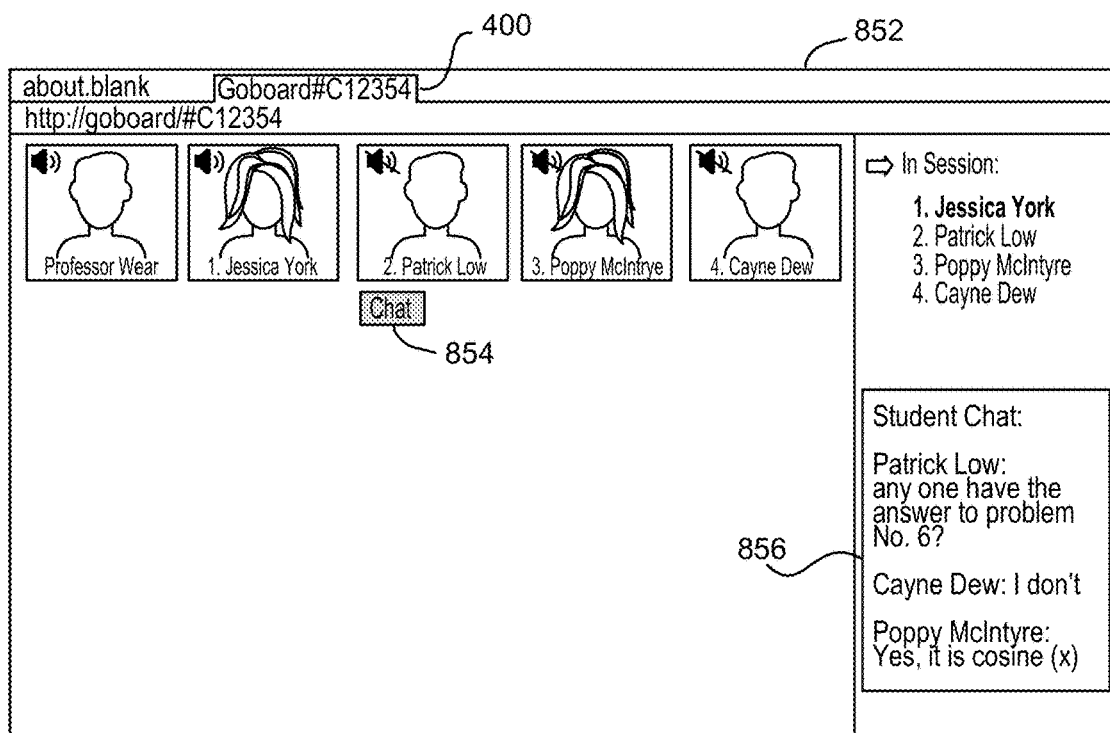
FIG. 45 illustrates the session from the student Patrick perspective in which the student chat window is in use.

FIG. 45 illustrates the session from the student Patrick perspective in which the student chat window is in use. Button 854 is still in gray meaning that he wishes to view the chat window, if pressed again the chat window would disappear from his computer. Shown off to one side of his computer screen (or in any other suitable location) is the student chat window 856 including comments from any of the students currently waiting in the queue. Window 856 cannot be seen on the professor or spotlight student computers as that would be a distraction.

Figure 46:
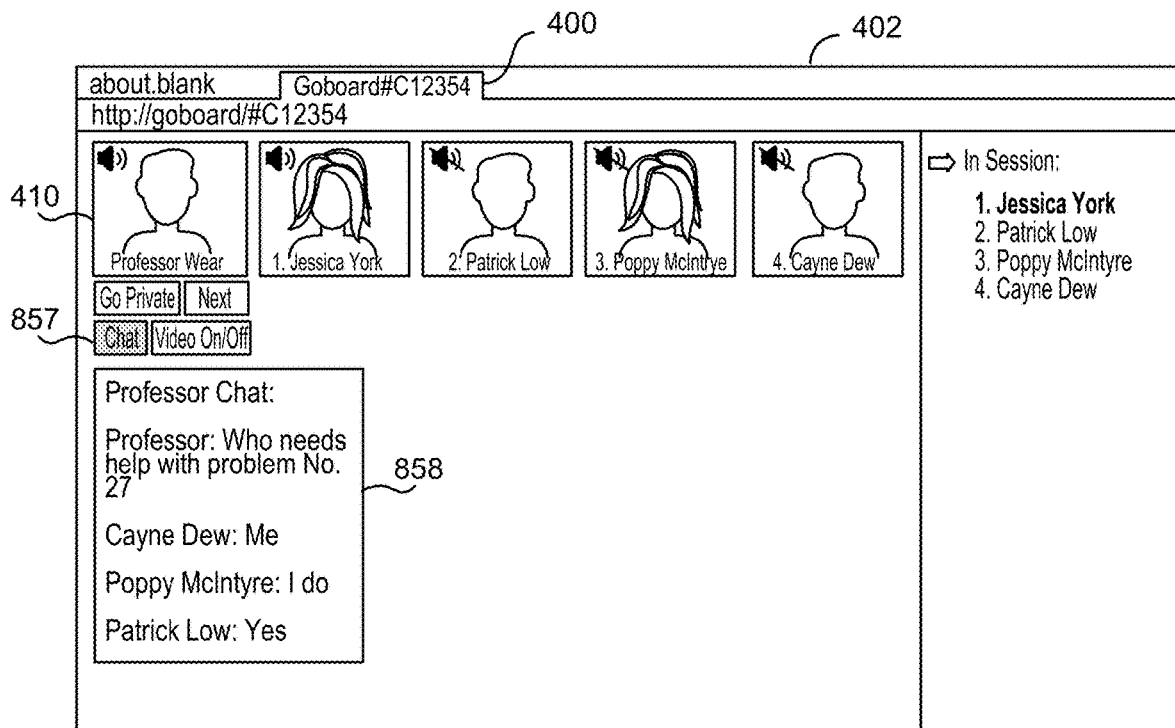
FIG. 46 illustrates the session from the viewpoint of the professor's computer in which the professor has opened the professor chat window.

FIG. 46 illustrates the session from the viewpoint of the professor's computer in which the professor has opened the professor chat window. As shown, the professor has pressed Button 857 which opens the professor chat window 858 upon his and all of the other student's computers. Numerous students have replied.

Figure 47:
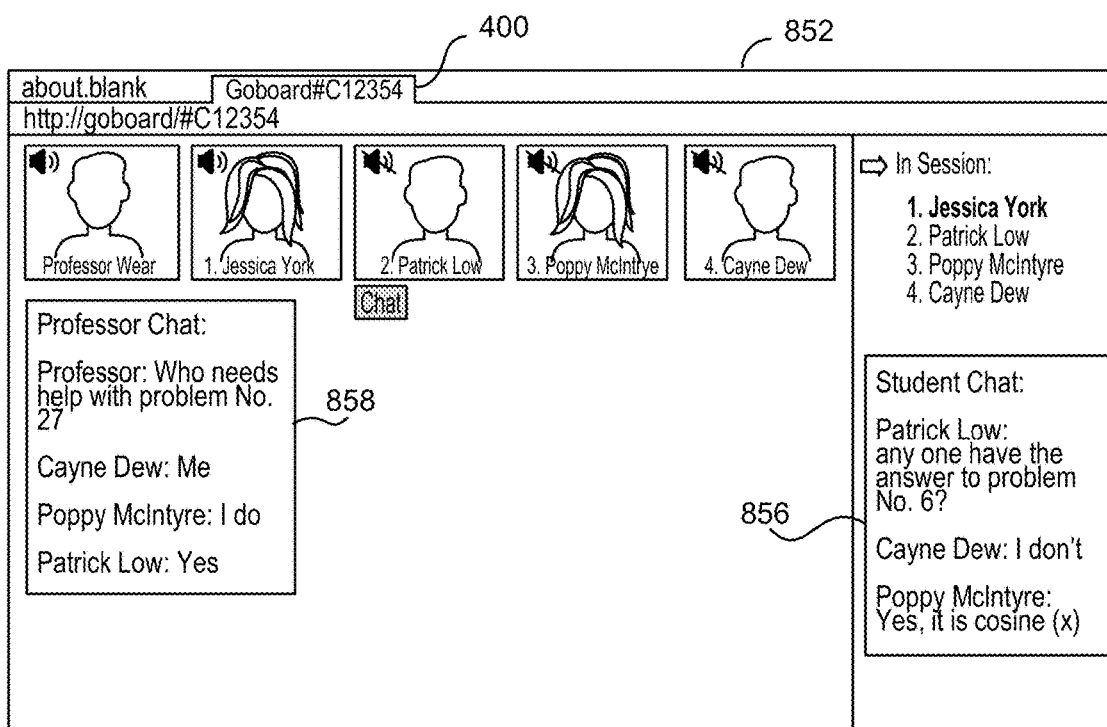
FIG. 47 illustrates the session from the student Patrick perspective after the professor has opened the professor chat window.

FIG. 47 illustrates the session from the student Patrick perspective after the professor has opened the professor chat window. Similar to FIG. 45, the student chat window 856 is still visible on Patrick's computer and now the professor chat window 858 is now visible upon his computer as well.

Figure 48:
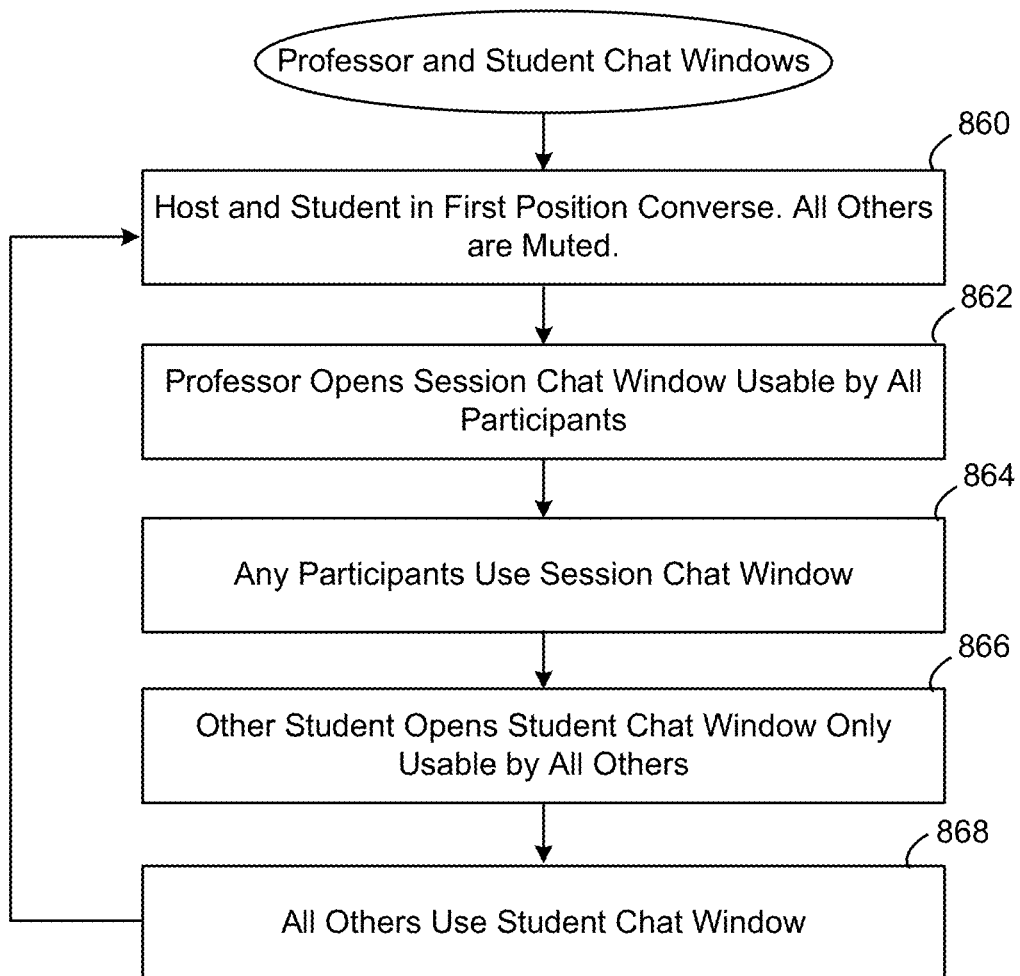
FIG. 48 is a flow diagram describing an embodiment in which the professor and student chat windows are opened and used during a session.

FIG. 48 is a flow diagram describing an embodiment in which the professor and student chat windows are opened and used during a session. In a first step 860 the professor and spotlight student converse while the other students are muted, such as shown in FIG. 44. In step 862 the professor may decide to open the session (or professor) chat window by clicking a button 857 which then opens the professor chat window 858 on the screen of all participant computers, such as is shown in FIGS. 46 and 47. Creation and use of chat windows by a participant in a session is known in the art. In a next step 864, any participants in the session may type a message into the professor chat window 858 as shown in FIGS. 46 and 47, although only the professor has the ability to turn it on or off.

In step 866 student Patrick decides to open a student chat window which will only be visible and usable by those students waiting in the queue, that is, not the professor or the spotlight student. Further, neither the professor nor the spotlight student has the capability to open the student chat window. FIGS. 44, 45 and 47 shows exclusive use of this student chat window by student Patrick, and students Poppy and Cayne in step 868. The professor and the spotlight student may continue to converse amongst themselves and the professor may chat with any of the students in professor chat window 858 even while the other students waiting in the queue are chatting exclusively amongst themselves in student chat window 856. Any new student joining is able to use the student chat window. Similarly, once Next is pressed by the professor, the former spotlight student now at the end of the queue may use the student chat window.

Application 101 restricts the ability to enter text into the student chat window to only those students waiting in the queue by disabling chat window input from the professor and the spotlight student.

Files Ready

In this embodiment of the invention, any student waiting in the queue may upload files, images, videos etc. to be automatically inserted into the session when it is that student's turn to be in the spotlight. Advantageously, the student who is waiting can prepare an upload the text, images or other that he or she wishes to share with the professor and have that material ready to go when the session begins. The student does not need to fumble with trying to find a file when he or she becomes the spotlight student and does not waste time of the professor or of the other students waiting.

Figure 49:
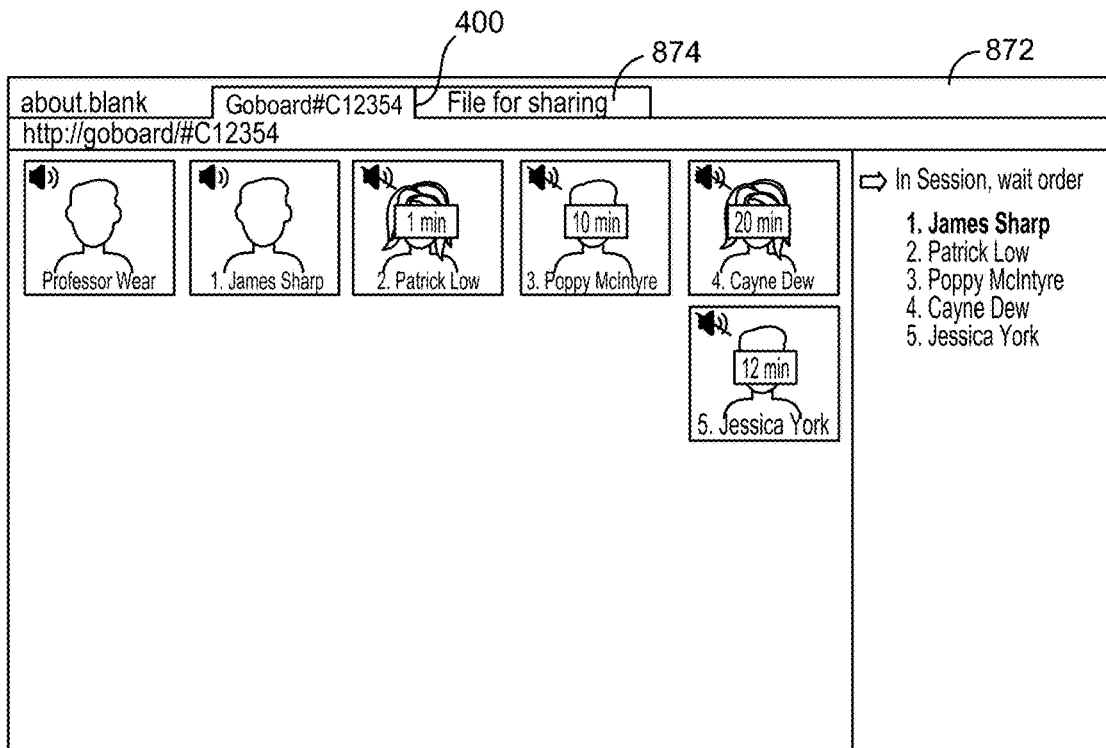
FIG. 49 illustrates a session from the perspective of Patrick's computer in which he has uploaded a file to be viewed in the session when it is his turn.

FIG. 49 illustrates a session from the perspective of Patrick's computer in which he has uploaded a file to be viewed in the session when it is his turn. As shown, the professor and the spotlight student James are conversing during the current session while Patrick, Poppy, Cayne and Jessica are waiting in the queue. Using his browser 872, Patrick has opened a new tab 874 in which he has uploaded a file for sharing. Although not shown, the professor has finished speaking with James and is about to select the Next button in order to bring up Patrick into the spotlight.

Figure 50:
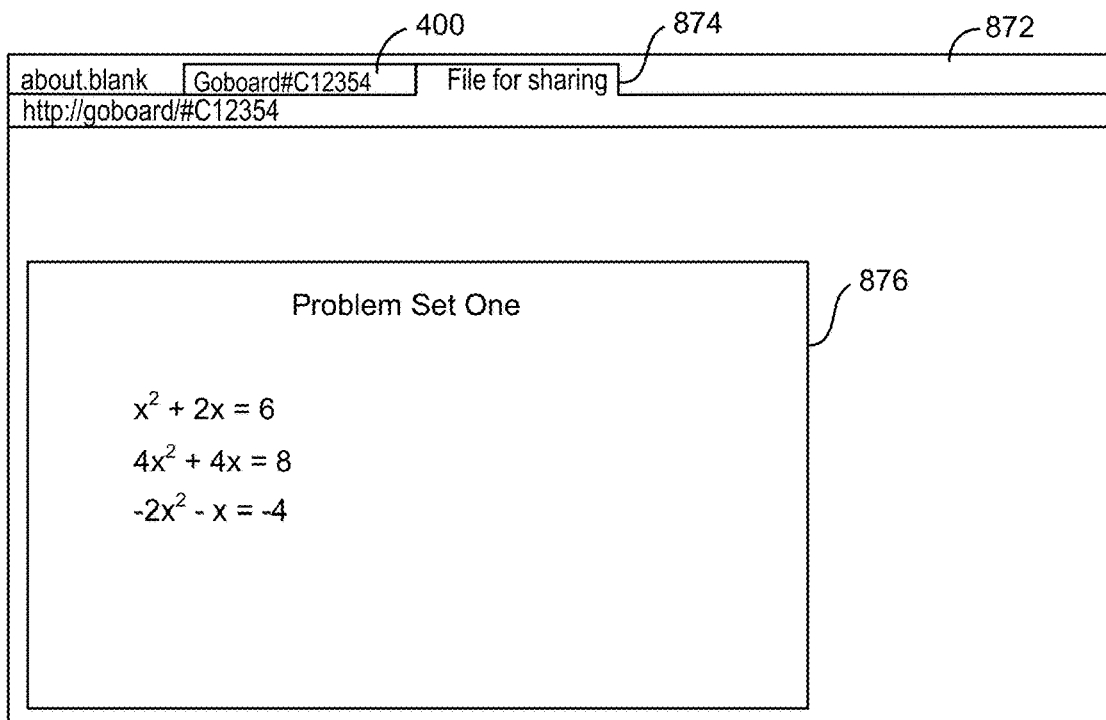
FIG. 50 illustrates the session in which an uploaded file is ready to be inserted into the session.

FIG. 50 illustrates the session in which an uploaded file is ready to be inserted into the session. As shown from the perspective of Patrick's computer, his browser 872 includes a new tab 874 into which he has uploaded a file 876. Shown is the contents of the file; alternatively, a simple file icon or name may be shown.

Figure 51:
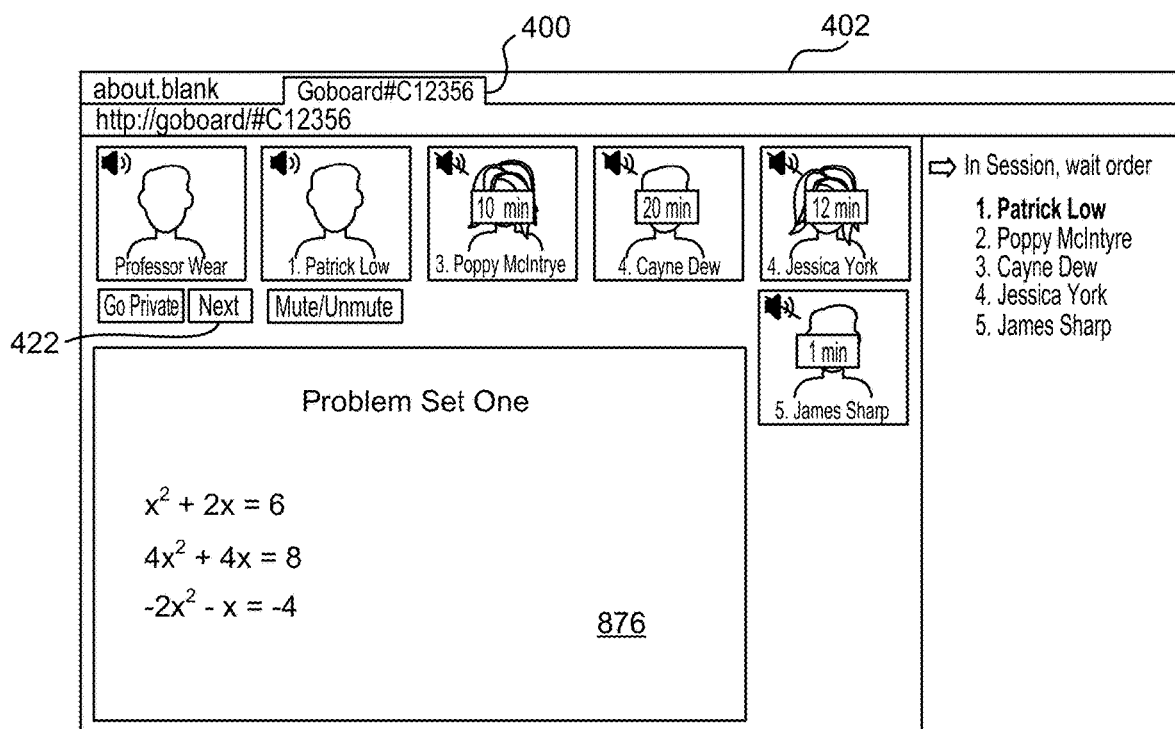
FIG. 51 illustrates the session from the perspective of the professor's computer after the file has been inserted into the session.

FIG. 51 illustrates the session from the perspective of the professor's computer after the file has been inserted into the session. As shown, the professor has already clicked the Next button, James has moved to the end of the queue and Patrick is now the spotlight student. At the same time, the file 876 that Patrick had uploaded while waiting has now been inserted into the session and can be viewed by all students and the professor.

Figure 52:
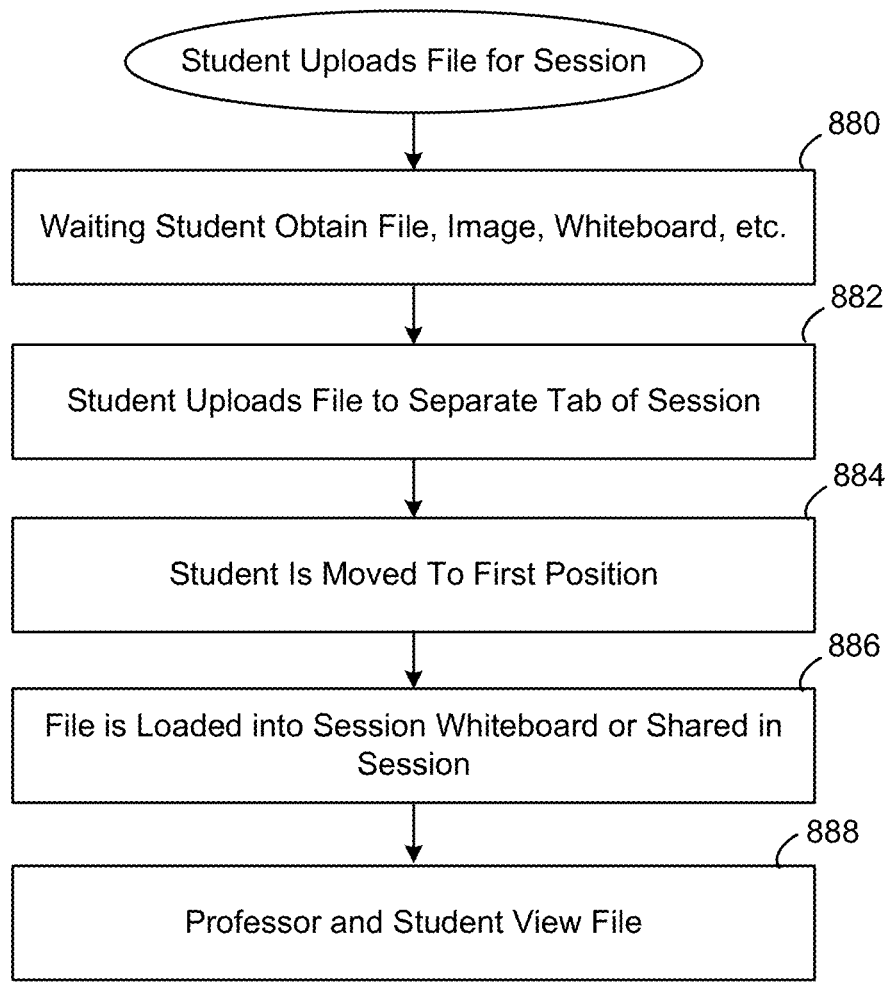
FIG. 52 is a flow diagram describing how a student uploads a file to be inserted into the session when it is his or her turn.

FIG. 52 is a flow diagram describing how a student uploads a file to be inserted into the session when it is his or her turn. In a first step 880, while the professor is conversing with the student first in the queue, the spotlight student, any other student waiting in the queue, e.g., Patrick, identifies and obtains a file, image, video, whiteboard content, sound file, or other digital object that he or she wishes to show, display or render during the session when he is conversing with the professor. This media file may be obtained from Patrick's computer, may be downloaded from a source over the Internet, etc.

In step 882 the student uploads this file to application 101 and a new tab is created within his browser to hold and display this file, such as is shown in FIG. 50. Meanwhile, the student may review this media file and its contents while waiting to be the spotlight student. Finally, in step 884 Patrick becomes the spotlight student after the professor has clicked the Next button, and this step is a trigger to load the file into the session.

In step 886 the file that Patrick had preloaded into tab 874 is now loaded into the existing session and may be viewed by the professor and all of the students in step 888. Advantageously, there is no extra step that the student need take to load the file into the session. Loading happens automatically once the professor clicks the Next button and Patrick becomes the spotlight student. Also, the professor need not take any extra action in order to allow this file to be displayed during the session.

Hand Raising Embodiments

Above have been described embodiments which students are placed in the queue in the order in which they arrive for the video conference. These embodiments can work well when every student has a question or needs to discuss the matter with the professor, but in some cases many students or individuals in the conference simply want to listen and have no questions. Accordingly, two embodiments are disclosed for dealing with these types of situations.

In a first embodiment, after all students have entered the online video conference session they may appear in a queue or in no particular order at all. At some point in time, the professor requests everyone who has a question to "please raise your hand" (indicated by a hand icon on a computer display screen or by an avatar actually raising a hand in a virtual reality room); whoever raises their hand first will be placed first in the queue, the second person to raise their hand will be second, etc. Thus, the queue is dictated by who raises their hand first. The system then creates the queue depending upon who raised their hand first; those who did not raise a hand and only want to listen will be placed at the end of the queue in no particular order. The queue may be displayed as shown in the figures above or in a virtual reality embodiment as explained below. When the professor clicks the "Next" button the spotlight student then returns to the end of those who had raised their hands (but before those who had no question). Alternatively, the spotlight student moves to the end of the queue with those who had not raised their hands. At any point in time the professor may ask again "please raise your hand if you have a question" and the system will reorder the queue based upon who raises their hand and in which order.

In a second embodiment, after all students have entered the online video conference session they may appear in a queue or in no particular order at all. At some point in time, the professor requests everyone who has a question to "please raise your hand" (indicated by a hand icon on a computer display screen or by an avatar actually raising a hand in a virtual reality room); the queue will then be ordered based upon the subsets of students with raised hands, but ordered by when they first appeared in the video conference session. Thus, the queue is dictated not only by who raises their hand, but also by who arrives first in session. The system then creates the queue depending upon this ordering; those who did not raise a hand and only want to listen will be placed at the end of the queue in no particular order. The queue may be displayed as shown in the figures above or in a virtual reality embodiment as explained below. When the professor clicks the "Next" button the spotlight student then returns to the end of those who had raised their hands (but before those who had no question). Alternatively, the spotlight student moves to the end of the queue with those who had not raised their hands. At any point in time the professor may ask again "please raise your hand if you have a question" and the system will reorder the queue based upon the above.

When implementing the virtual reality embodiment discussed below, students may raise their hand by clicking upon a button on a virtual tablet computer, or by physically raising their own hand which is detected by external cameras or other sensors that detect that hand raising and then provide feedback to the server computer which then displays that avatar physically raising hand.

Virtual Reality

In another embodiment of the invention, all of the above embodiments may take place within a shared virtual reality session instead of within an online video conference session. In other words, the above embodiments may be implemented using the techniques disclosed within application No. 63/121,828 in which the professor and all of the students are wearing VR headsets and can perceive one another within a three-dimensional room. Although any of the embodiments above may be implemented within a virtual reality session, only one will be demonstrated below. Thus, the present invention applies also to an embodiment in which participants are meeting in a three-dimensional (3-D) virtual reality (VR) space (or "room") as opposed to a traditional two-dimensional space described above. Participants may wear VR headsets, use tracking cameras, use a 3-D pen, etc., appear as avatars in a room, and see one another as if they all were in a 3-D space, manipulating 3-D objects, whiteboards, etc.

Typically, when first donning a VR headset, each student will log in to application 101 (via the headset or using handheld devices) and each will then be authenticated using an integration between the headset and the application, or a communication with a Student Information System. Each participant may also have displayed in front of them, in virtual reality and in three dimensions, a tablet computer (such as an iPad, etc.) that is arranged to display any or all of the drawings and figures discussed above. In addition, of course, each participant views in virtual reality the avatars of the other participants in the room.

When the participants (or at least the professor) are using virtual tablet computers the buttons displayed in the above drawings may be displayed on these virtual tablet computers. The students displayed in the queue in the above drawings (along with the various buttons and icons shown) may also be displayed upon the professor's virtual tablet computer which he or she is viewing in the virtual reality room the visitor VR headset. Of course, the professor and the students may also view one another via their corresponding avatars in the virtual reality room as shown in the below figures, and the queue may be indicated by how these avatars appear in the virtual reality room, or by numerical or other indicators associated above, below or on each avatar. The various buttons and icons displayed in the above figures may also be displayed within the virtual reality room at various locations or be activated using various motions, objects or 3-D pens, etc., and not necessarily need be present on a virtual tablet computer.

Figure 53:
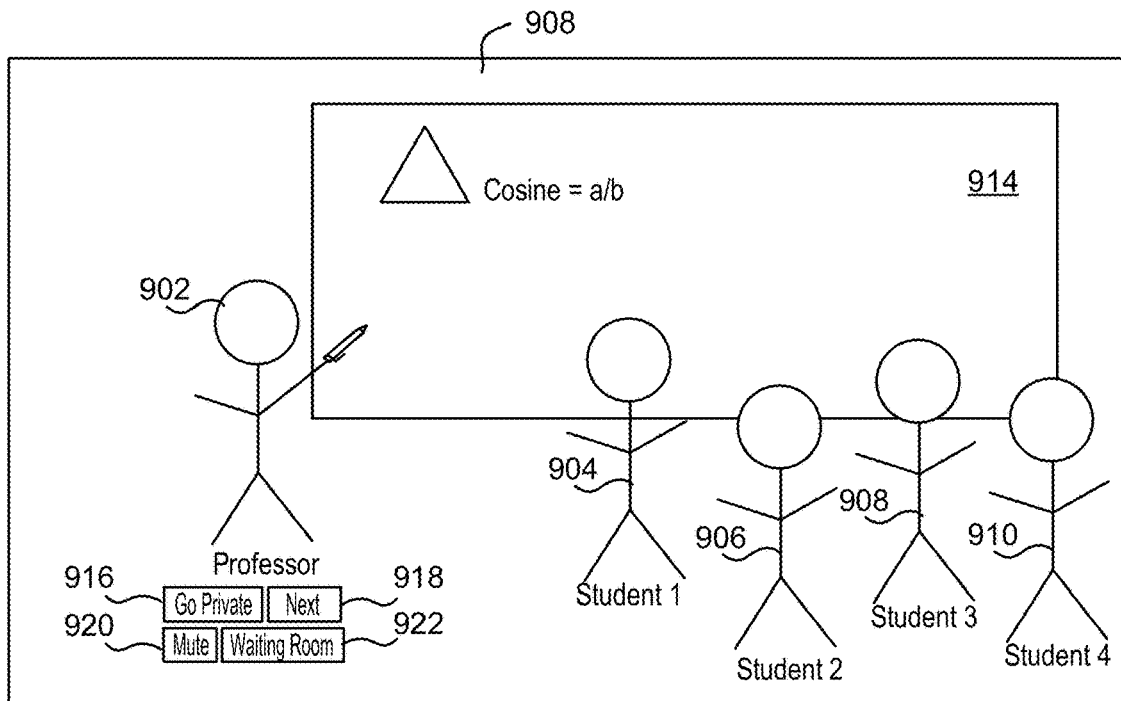
FIG. 53 illustrates a virtual reality session including a three-dimensional room 900.

FIG. 53 illustrates a virtual reality session including a three-dimensional room 900. Inside the room is an avatar of the professor 902, an avatar of the spotlight student 904 and avatars of the other students waiting in the queue 906-910. The professor is drawing upon a board 914 with a pen and below him are buttons 916-922. As shown, the view of this 3-D room is from the viewpoint of a fictitious third party who can see everyone in the room. From the viewpoint of the professor, he would not be able to view his entire body (i.e., his head) but would be able to view parts of his avatar as he moves and walks around within the 3-D room.

Figure 54:
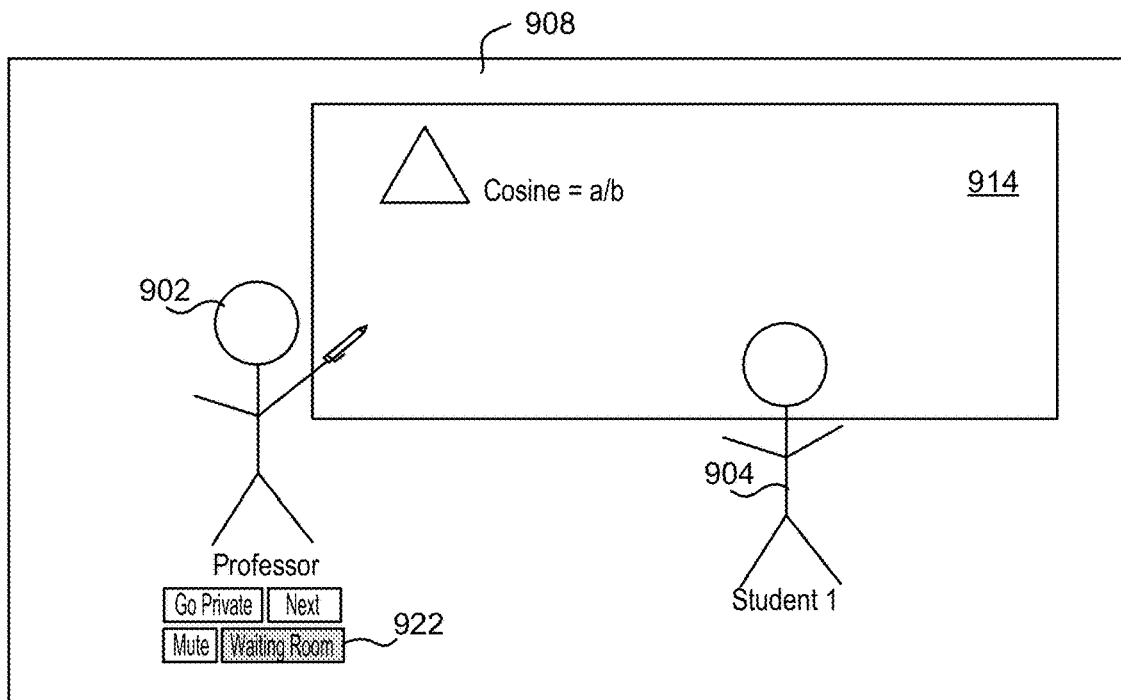
FIG. 54 illustrates the virtual reality session after the professor has clicked upon the Waiting Room button.

FIG. 54 illustrates the virtual reality session after the professor has clicked upon the Waiting Room button 922. As shown, and as previously described above, students 906-910 have now been removed to the waiting room and only the spotlight student 904 remains. Alternatively, since the goal is to remove the distractions from room 900, pressing the Waiting Room button simply makes avatars 906-910 invisible and not necessarily remove them to a separate waiting room. These other students may still see and hear the professor and the spotlight student talking within room 900 but the professor and the spotlight student cannot see avatars of these other students. The avatars may also appear differently (such as in gray, in outline, faded, blurred, etc.) to indicate that these other students cannot hear or see the professor and the spotlight student or two indicate that these others are in the waiting room.

Figure 55:
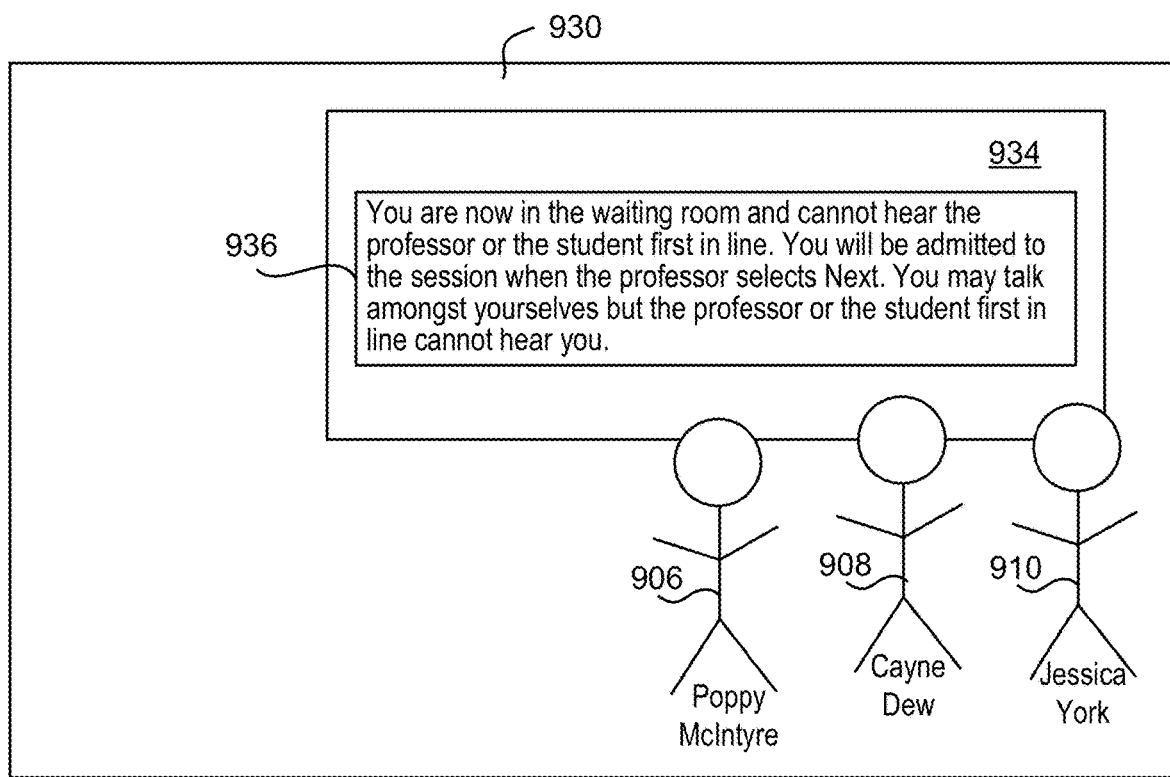
FIG. 55 illustrates a waiting room of the virtual reality session.

FIG. 55 illustrates a waiting room of the virtual reality session. Shown is a representation of the virtual reality waiting room 930, a drawing board 934 and a message upon the board 936. Students 906-910 may converse with themselves within this waiting room and may be brought back into the session if the professor once again clicks button 922, or each may be brought in one of the time if the professor clicks button 918. The waiting room may be a totally separate virtual room from the room in which the professor and the spotlight student are conversing, but it may be a simple barrier such as a wall between the two rooms in order to separate the participants. The virtual waiting room may have a separate identifier from the normal virtual-reality room, etc.

In a related embodiment (not shown), should the professor click upon the "Go Private" button 916 from FIG. 53, the professor and the spotlight student 904 will enter the private mode. In this private mode not only is the audio feed from the professor and the spotlight student disabled to the computers (or VR headsets) of the other students 906-910, but also the display of the virtual electronic whiteboard 914 will be disabled to the VR headsets of students 906-910. Thus, the professor and the spotlight student can speak privately in private mode without the other students hearing nor being able to see what is drawn upon the whiteboard (or perhaps, the students may still see the board, but it is blank). In addition, any three-dimensional objects created or displayed by the professor and the spotlight student during private mode will likewise not be transmitted to the VR headsets of the other students. For example, as shown in FIG. 54, both the professor and student 904 can see and draw upon the virtual board 914 but the students in the waiting room (or, in this case, or not in the private mode with the professor) cannot see that virtual board 914. Although, they may have their own virtual board upon which to write and converse.

In this private mode in virtual reality the avatars of the other students 906-910 may remain in the virtual room with the professor and the spotlight student (even though the other students cannot see or hear what is happening), these other avatars may be removed completely (such as is shown in FIG. 54) to give the spotlight student an increased feeling of privacy, or the avatars of the other students may be shown only in outline, only in a light gray, etc.

Discussed above is the ability of a student in the queue to upload a file so that he or she is ready with the information when he or she becomes the spotlight student. Similarly, any student in the queue may upload, create or otherwise place a file, three-dimensional object or other information upon a virtual whiteboard while waiting for his or her turn to speak with the professor in a virtual reality room. Although FIG. 53, for example, only shows a single virtual whiteboard 914, it is contemplated that there may be dozens, hundreds or even an infinite number of virtual whiteboards to which information may be uploaded or created. These virtual whiteboards are not necessarily always in view to the participants in the virtual room, but an individual whiteboard may be selected for viewing at any time. Accordingly, student 906, for example, may upload a file, document, video to a different virtual whiteboard 915 (not shown), may draw upon whiteboard 915, may create a three-dimensional object in association with or attached to whiteboard 915, etc. he or she may add this information to whiteboard 915 at any time while he or she is waiting in the queue.

While the professor is conversing with the spotlight student this whiteboard 915 is not visible to those in the current virtual reality room because it has not been selected yet by the professor. Nevertheless, once the professor selects "Next", student 906 will become the spotlight student and virtual whiteboard 915 will automatically become visible in the virtual room because it is associated with student 906. Alternatively, whiteboard 915 does not become visible in the virtual room until the professor specifically asks student 906 "on which whiteboard did you upload the file you wish to discuss?" At this point, the professor will then select whiteboard 915 to be visible to everyone in the virtual room.

Record Session

Each session is recorded automatically by application 101, and stamped with the data collected that has been input from the students (class, subject, topic, chapter, one sentence overview of question, etc.), and uploaded to the Learning Management System (LMS). Students can, when they join the queue, scroll through the list of recordings and watch other students' sessions while they wait, so that there is the possibility that the student can answer a question themselves and leave the queue before the professor reaches them.

In addition, the system automatically suggests recordings to students based on the input data they provide about their question. That is, if Jane joins the meeting room and inputs that she is asking about "Biochemistry, Chapter 2, examination preparation," then all of the previously recorded sessions about "Biochemistry, Chapter 2, examination preparation" are suggested to her. These suggestions are ordered by relevance. The students can answer with a "thumbs up/down" input to the question "Was this suggestion helpful?" which will help to train the model over time.

Additional Embodiments

The invention includes these additional embodiments.

D1. A method of un-muting participants in an online video conference session, said method comprising:
  facilitating an online video conference session between a host and a plurality of participants, said host having a host audio feed from a host computer that is not muted;
  ordering said participants in a queue, a first participant being first in said queue and having a first audio feed from a first computer that is not muted, said participants other than said first participant each having a participant audio feed that is muted;
  receiving an indication from said host computer that said host has un-muted the participant audio feed from a second computer of one of said participants other than said first participant; and
  un-muting said participant audio feed of said second computer whereby said host and said plurality of participants can hear said participants audio feed from said second computer.

D2. A method as recited in claim D1 wherein said participants other than said first participants cannot un-mute said each participant audio feed.

D3. A method as recited in claim D1 further comprising:
  displaying, on said host computer, a Mute/Un-mute button in association with a representation of each of said participants other than said first participant.

D4. A method as recited in claim D1 further comprising:
  displaying, on said host computer in association with a representation of each of said participants, an estimated time of a question of said each participant.

D5. A method as recited in claim D1 further comprising:
  displaying, on said host computer in association with a representation of each of said participants, a subject of the question of said each participant.

D6. A method as recited in claim D1 further comprising:
  displaying on said host computer and before said step of receiving, in association with a representation of said second participant, an icon received from said second computer indicating that said second participant wishes to speak.

D7. A method as recited in claim D1 further comprising:
  after said step of un-muting, receiving an indication from said host computer that said host has made a selection to advance said queue;
  un-muting a participant audio feed from a third computer of a third participant who is next in said queue not including said first participant and said second participant;
  moving said first and said second participants to the end of said queue and muting said first and second participants; and
  reordering said participants in said queue such that each participant moves up one position in said queue.

D8. A method as recited in claim D1 wherein said each participant other than said first participant being unable to un-mute said each participant audio feed.

E1. A method of enabling a private mode in an online video conference session, said method comprising:
  facilitating an online video conference session between a host and a plurality of participants, said host having a host audio feed from a host computer that is not muted;
  ordering said participants in a queue, a first participant being first in said queue and having a first audio feed from a first computer that is not muted, said participants other than said first participant each having a participant audio feed that is muted;
  receiving an indication from said host computer that said host has enabled a private mode; and
  disabling said host audio feed and said first audio feed to computers of said participants other than said first participant such that said other participants cannot hear said host or said first participant, whereby said host and said first participant are able to hear one another.

E2. A method as recited in claim E1 further comprising:
disabling a host video feed from said host computer and disabling a first video feed from said first computer to computers of said participants other than said first participant such that said other participants cannot see said host or said first participant, whereby said host and said first participant able to see one another.

E3. A method as recited in claim E1 further comprising:
displaying, on said host computer, a Private Mode button able to be selected by said host.

E4. A method as recited in claim E1 further comprising:
displaying on said computers of said other participants a window indicating that said other participants cannot hear said host or said first participant.

D5. A method as recited in claim E1 wherein said each participant other than said first participant being unable to un-mute said each participant audio feed.

F1. A method of adding a new participant to an online video conference session, said method comprising:
facilitating an online video conference session between a host and a plurality of participants, said host having a host audio feed from a host computer that is not muted;
ordering said participants in a queue, a first participant being first in said queue and having a first audio feed from a first computer that is not muted, said participants other than said first participant each having a participant audio feed that is muted;
receiving a request from a new computer of a new participant to join said session;
receiving from said new computer an estimated time of a question of said new participant; and
after receipt of said estimated time, admitting said new participant to said session and automatically muting a new audio feed from said new computer, said new participant unable to un-mute said new audio feed, whereby said host and said first participant cannot hear said new participant.

F2. A method as recited in claim F1 further comprising:
displaying said estimated time in association with a representation of said new participant during said session; and
displaying, during said session and in association with a representation of each of said participants, an estimated time of a question of said each participant.

F3. A method as recited in claim F1 further comprising:
receiving from said new computer a subject of a question of said new participant; and
only admitting said new participant to said session after receipt of said subject.

F4. A method as recited in claim F1 further comprising:
displaying on said new computer and estimated wait time based upon the sum of estimated times of a question of each of said other participants.

F5. A method as recited in claim F1 wherein said each participant other than said first participant being unable to un-mute said each participant audio feed.

G1. A method of moving a participant up in a queue of an online video conference session, said method comprising:
facilitating an online video conference session between a host and a plurality of participants, said host having a host audio feed from a host computer that is not muted;
ordering said participants in a queue, a first participant being first in said queue and having a first audio feed from a first computer that is not muted, said participants other than said first participant each having a participant audio feed that is muted;
displaying in said session and in association with a representation of each of said participants, an estimated time of a question of said each participant or a topic of said question of said each participant;
receiving an indication from said host computer of a selection of one of said other participants to move up in said queue;
muting said first audio feed from said first computer; and
moving said selected participant to the front of said queue and un-muting said participant audio feed of said selected participant.

G2. A method as recited in claim G1 further comprising:
reordering said queue such that each of said participants other than said selected participant moves down one position.

G3. A method as recited in claim G1 wherein said estimated time a question from said each participant is a number that is input by said each participant.

G4. A method as recited in claim G1 wherein said estimated time of a question from said each participant is calculated.

G5. A method as recited in claim G1 further comprising:
displaying in said session a graphical representation between two of said participants visually indicating the end of office hours of said host.

G6. A method as recited in claim G1 wherein said each participant other than said first participant being unable to un-mute said each participant audio feed.

H1. A method of un-muting participants in an online video conference session, said method comprising:
facilitating an online video conference session between a host and a plurality of participants, said host having a host audio feed from a host computer that is not muted;
ordering said participants in a queue, a first participant being first in said queue and having a first audio feed from a first computer that is not muted, said participants other than said first participant each having a participant audio feed that is muted;
displaying, on said host computer in association with a representation of one of said participants other than said first participant an indication that a question of said one participant is the same as a question of said first participant;
receiving an indication from said host computer that said host has un-muted the participant audio feed from a second computer of said one participant; and
un-muting said participant audio feed of said second computer whereby said host and said first participant can hear said participant audio feed from said second computer.

H2. A method as recited in claim H1 wherein said participants other than said first participants cannot un-mute said each participant audio feed.

H3. A method as recited in claim H1 further comprising:
displaying, on said host computer, a Mute/Un-mute button in association with a representation of each of said participants other than said first participant.

H7. A method as recited in claim H1 further comprising:
after said step of un-muting, receiving an indication from said host computer that said host has made a selection to advance said queue;
un-muting a participant audio feed from a third computer of a third participant who is next in said queue not including said first participant and said one participant;
moving said first participant and said one participant to the end of said queue and muting said first participant and said one participant; and reordering said participants in said queue such that each participant moves up one position in said queue.

I1. A method of automatically closing an online video conference session, said method comprising:
  facilitating an online video conference session between a host and a plurality of participants, said host having a host audio feed from a host computer that is not muted;
  ordering said participants in a queue, a first participant being first in said queue and having a first audio feed from a first computer that is not muted, said participants other than said first participant each having a participant audio feed that is muted;
  receiving a request from a new computer of a new participant to join said session;
  calculating an estimated wait time before said new participant is able to speak with said host;
  calculating an estimated time remaining in said session; and,
  not allowing said new participant to join said session when said estimated wait time is greater than or equal to said estimated time remaining in said session.

I2. A method as recited in claim I1 wherein calculating an estimated wait time is based upon a sum of an estimated time of a question input by each of said participants.

I3. A method as recited in claim I1 wherein calculating an estimated time remaining is based upon a current time and an estimated end of session input by said host I4. A method as recited in claim I1 further comprising:
  allowing said new participant to join said session when said estimated wait time is greater than or equal to said estimated time remaining in said session; and
  displaying a representation of said queue in said session; and
  displaying in said session a graphical representation visually indicating the end of said session between two of said participants, one of said two participants having an estimated wait time less than said estimated time remaining and the other of said two participants having an estimated wait time greater than or equal to said estimated time remaining.

J1. A method of automatically indicating the end of an online video conference session, said method comprising:
  facilitating an online video conference session between a host and a plurality of participants, said host having a host audio feed from a host computer that is not muted;
  ordering said participants in a queue, a first participant being first in said queue and having a first audio feed from a first computer that is not muted, said participants other than said first participant each having a participant audio feed that is muted;
  for each of said participants, calculating an estimated wait time before said each participant is able to speak with said host;
  calculating an estimated time remaining in said session;
  displaying a representation of said queue in said session; and
  displaying in said session a graphical representation visually indicating the end of said session between two of said participants, one of said two participants having an estimated wait time less than said estimated time remaining and the other of said two participants having an estimated wait time greater than or equal to said estimated time remaining.

J2. A method as recited in claim J1 wherein calculating an estimated wait time is based upon a sum of an estimated time of a question input by each of said participants.

J3. A method as recited in claim J1 wherein calculating an estimated time remaining is based upon a current time and an estimated end of session input by said host.

L1. A method of moving participants to a waiting room of an online video conference session, said method comprising:
  facilitating an online video conference session between a host and a plurality of participants, said host having a host audio feed from a host computer that is not muted;
  ordering said participants in a queue, a first participant being first in said queue and having a first audio feed from a first computer that is not muted, said participants other than said first participant each having a participant audio feed that is muted;
  receiving a first indication from said host computer of a selection by said host to move said other participants to a waiting room of said session;
  moving said other participants to said waiting room of said session such that representations of said participants appear in said waiting room; and
  disabling said host audio feed and said first audio feed to a computer of each of said other participants.

L2. A method as recited in claim L1 further comprising:
  after said moving, enabling each participant audio feed to said computers of said other participants whereby said other participants may talk amongst themselves.

L3. A method as recited in claim L1 wherein said representations of said participants are video feeds of said participants.

L4. A method as recited in claim L1 further comprising:
  after said receiving, receiving a second indication from said host computer of a selection by said host to move said other participants back into said session;
  moving said other participants back into said session such that said representations appear in said session; and
  enabling said host audio feed and said first audio feed to said computers of said other participants.

L5. A method as recited in claim L1 further comprising:
  receiving an indication from said host computer that said host has made a selection to advance said queue;
  un-muting a second audio feed from a second computer of a second participant who is second in said queue and is in said waiting room;
  moving said first participant to the end of said queue in said waiting room; and
  reordering said participants in said queue such that each participant moves up one position in said queue, said second participant moving out of said waiting room and into said session.

N1. A method of admitting participants to an online video conference session, said method comprising:
  admitting a host to an online video conference session, said host having a host audio feed from a host computer that is not muted;
  admitting a first participant to said session, said first participant having a first audio feed from a first computer that is not muted, said first participant joining said session before participants other than said host join said session;
  enabling said host and said first participant to draw upon a whiteboard of said session;
  admitting at least a second participant to said session and automatically muting a second audio feed from a second computer of said second participant, said second participant unable to un-mute said second audio feed, whereby said host and said first participant cannot hear said second participant; and automatically disabling said second participant from drawing upon said whiteboard, said whiteboard being visible to said second participant in said session.

N2. A method as recited in claim N1 wherein said session does not include a waiting room, said method further comprising:
admitting said second participant to said session immediately after said second participant signs into said session.

N3. A method as recited in claim N1 further comprising:
admitting a plurality of participants to said session including said second participant after said first participant is admitted to said session and automatically muting an audio feed of said each participants, each of said participants unable to un-mute said each audio feed;
ordering said participants in a queue based upon a time that each of said participants is admitted to said session, and displaying a representation of said queue within said session; and
automatically disabling said plurality of participants from drawing upon said whiteboard.

N4. A method as recited in claim N1 wherein a video feed of each of said host and said participants is enabled and whereby said host and said participants may see one another during said session.

O1. A method of opening a chat window in an online video conference session, said method comprising:
facilitating an online video conference session between a host and a plurality of participants, said host having a host audio feed from a host computer that is not muted;
ordering said participants in a queue, a first participant being first in said queue and having a first audio feed from a first computer that is not muted, said participants other than said first participant each having a participant audio feed that is muted;
receiving a selection from a first computer of one of said other participants to open a student chat window within said session; and
displaying a student chat window in said session that is only visible to said other participants, whereby said other participants may input text into said student chat window.

O2. A method as recited in claim O1 wherein said host and said first participant are unable to input text into said student chat window.

O3. A method as recited in claim O1 further comprising:
receiving text via said first computer from said student chat window and displaying said text in said student chat window in said session, whereby said text is visible to all of said other participants.

O4. A method as recited in claim O1 further comprising:
receiving a selection from said host computer to open a session chat window within said session; and
displaying said session chat window in said session that is visible to said host, to said first participant and to said other participants, whereby said host, said first participant and said other participants may input text into said session chat window.

P1. A method of uploading a media file in an online video conference session, said method comprising:
facilitating an online video conference session between a host and a plurality of participants, said host having a host audio feed from a host computer that is not muted;
ordering said participants in a queue, a first participant being first in said queue and having a first audio feed from a first computer that is not muted, said participants other than said first participant each having a participant audio feed that is muted;
receiving a media file at an online server computer from a second computer of a second participant who is second in said queue and storing said media file in a location of said online server computer such that said media file is not displayed within said session;
receiving an indication to advance said queue;
un-muting an audio feed from said second computer of said second participant; and
in response to said receiving an indication, displaying said media file within said session such that said media file is visible to said host and to said plurality of participants.

P2. A method as recited in claim P1 wherein said receiving an indication includes receiving a selection from said host computer that said queue should be advanced or includes receiving an indication that said first participant has left said session.

P3. A method as recited in claim P2 wherein when said selection from said host computer indicates that said queue should be advanced, said method further comprising:
muting said audio feed from said first computer; and
moving said first participant to the end of said queue.

P4. A method as recited in claim P1 wherein displaying said media file includes displaying said media file within a whiteboard of said session, sharing said media file within said session, displaying said media file within a chat window of said session, or displaying said media file on a screen of said session.

Q1. A method of admitting participants to a shared virtual reality session, said method comprising:
admitting a host to a shared virtual reality session, said host having a host audio feed from a host computer that is not muted and a host avatar visible in said session;
admitting a first participant to said session, said first participant having a first audio feed from a first computer that is not muted and a first participant avatar visible in said session, said first participant joining said session before participants other than said host join said session; and
admitting at least a second participant to said session and automatically muting a second audio feed from a second computer of said second participant, said second participant having a second participant avatar visible in said session, said second participant unable to un-mute said second audio feed, whereby said host and said first participant cannot hear said second participant.

Q6. A method as recited in claim Q1 further comprising:
enabling said host and said first participant to draw upon a whiteboard of said session; and
automatically disabling said second participant from drawing upon said whiteboard when said second participant is admitted to said session.

Q7. A method as recited in claim Q1 further comprising:
receiving a selection from said host computer that avatars other then said host avatar and said first participant avatar should be removed from said session; and
removing at least said second participant avatar from said session, whereby said second participant may see said host avatar and said first participant avatar and may hear said host and said first participant.

R1. A method of recording self ratings of a participant in an online video conference session, said method comprising:

facilitating an online video conference session between a host and at least two participants, said host having a host audio feed from a host computer that is not muted;

ordering said participants in a queue, a first participant being first in said queue and having a first audio feed from a first computer that is not muted, a second participant having a participant audio feed that is muted;

receiving from a second computer of said second participant a first self rating indicating understanding of a topic before a second audio feed of said second participant is unmuted;

unmuting said second audio feed of said second participant such that said second participant and said host may converse;

receiving from said second computer of said second participant a second self rating indicating understanding of said topic after said second audio feed of said second participant is unmuted; and storing, displaying or sending electronically said first and second self ratings.

R2. A method as recited in claim R1 further comprising:

receiving from said second computer an indication of said topic; and displaying said topic in association with a representation of said second participant in said session, whereby said topic is viewable by said host R3. A method as recited in claim R1 further comprising:

unmuting said second audio feed when said second participant is advanced to be first in said queue or when said host selects an unmute button associated with said second participant.

R4. A method as recited in claim R1 further comprising:

receiving from said second computer of said second participant said second self rating after said second participant requests to leave said session, after said second participant is moved to an end of said queue, after said second audio feed is muted when said second participant is moved from being first in said queue, or after said host and said second participant have finished conversing.

Implementation Option A

In addition to the GoBoard implementation described above, other implementations are possible. In an implementation using the Zoom video conference platform, one creates a custom Zoom plug-in application using a "chatbot" (with Web hooks) to implement the above invention embodiments and registers it on the Zoom "marketplace" for applications, using for example, the "education" category. The professor (or tutor) installs this plug-in in their local Zoom application, thus enabling the plug-in functionality and the chatbot.

This plug-in application for Zoom operates in the following manner in order to implement the invention embodiments. The professor downloads the plug-in and launches the scheduled meeting as the host. Each student that joins the session is immediately automatically muted and their video turned off if desired (the host's plug-in can mute users and turn off video). A student will not be able to unmute themselves (nor turn on their video) if they are muted by the host. Thus, initially, all students in the queue (including the first) are muted. Each student is immediately sent an automatically-generated private message in their private chat window from the host (e.g., "Welcome Frank Smith, you are currently third in line. Your estimated wait time is 16 minutes.") A subsequent private message is sent to each student asking for the input data, as explained above.

Thus, before discussion begins, all students who have joined are muted. When the professor is ready he or she types "Next" into the professor chat window (picked up by the chatbot) and the first student in the queue is unmuted and their video turned on, and this student becomes the first spotlight student. The plug-in is aware that the session is about to begin and that typing "Next" in this case only will unmute the first student and not move him or her to the end of the queue. Alternatively, the first student in the queue may be unmuted to begin with, ready to speak with the professor, in which case "Next" functions as described below for all students.

After this first student is done, the professor types "Next" and the plug-in will: mute and turn off the video of this current spotlight student and move him or her to the end of the queue; move the next student in queue up to the front to make them the spotlight student, unmute their audio, and turn on their video; and send a private message to every other student in the queue "You are now X in line. Your estimated wait time is Y."

If a student wants to "go private" they may say that to the professor when they start talking or send a private message to the professor via their chat window. The student may type a message to the professor which is then automatically read by the Web hook. If the message requests private mode in some fashion the professor will type "Private Mode" which will enter private mode as has been described above.

Thus, implementation in this option uses input from the professor into his or her chat window (and thus into the chatbot and plug-in using chat helpers) in order to implement the functionality of the invention, in lieu of a changed graphical interface with visual buttons. In one example, typing "/" in the chat window by the professor followed by a command implements that command, such as: /Next Student, /Start Private, /Stop Private, /Add Student No. 3 (to unmute other students so these other students with same question can participate), etc.

Implementation Option B

This option is similar to option A above, but instead of having to type commands into a chat window (chat helpers), the professor will use a graphical interface inside the chat window. The plug-in application is created as above to provide the functionality of the invention. In addition, one creates a Web-hosted HTML/CSS link (which typically includes text and the HTML link listed); Zoom supports these links. The professor downloads the plug-in and installs it into his or her local Zoom application. When the professor launches Zoom a private message automatically pops up with an image to click upon; the professor clicks it which triggers the plug-in to begin execution. The plug-in provides the professor a graphical interface inside the chat window. This graphical user interface has buttons which, when pressed, trigger code inside the plug-in to fulfill the request by the professor. For example, the buttons in the professor chat window may be "Next", "Go Private", etc.

Implementation Option C

This implementation also uses the Zoom video conference platform along with an SDK. As with other platforms, Zoom provides a full SDK for incorporating Zoom video conferencing inside one's own application, whether it is a Web application, mobile application, or desktop application.

Using the SDK, one may fully customize Zoom to implement the above functionality of the embodiments of the invention. Using this option, the Zoom client is built directly into the GoBoard application. The SDK has implementation options for Android, iOS, Electron, Web SDK and other operating systems. In this option, a Web SDK is built and participants use a Web browser and click upon "https://goboard.com" to access the functionality. Within, GoBoard, a custom interface visually represents the queue showing the student's place in line, etc. Students are able to observe sessions, one or more students are able to participate, professors may unmute all students to have an open discussion, etc.

Of course, the Zoom SDK may be used to implement the embodiments of the present application into any other suitable software application, such as a Web application, mobile application, or desktop application.

Computer and Mobile Device

Figure 56:
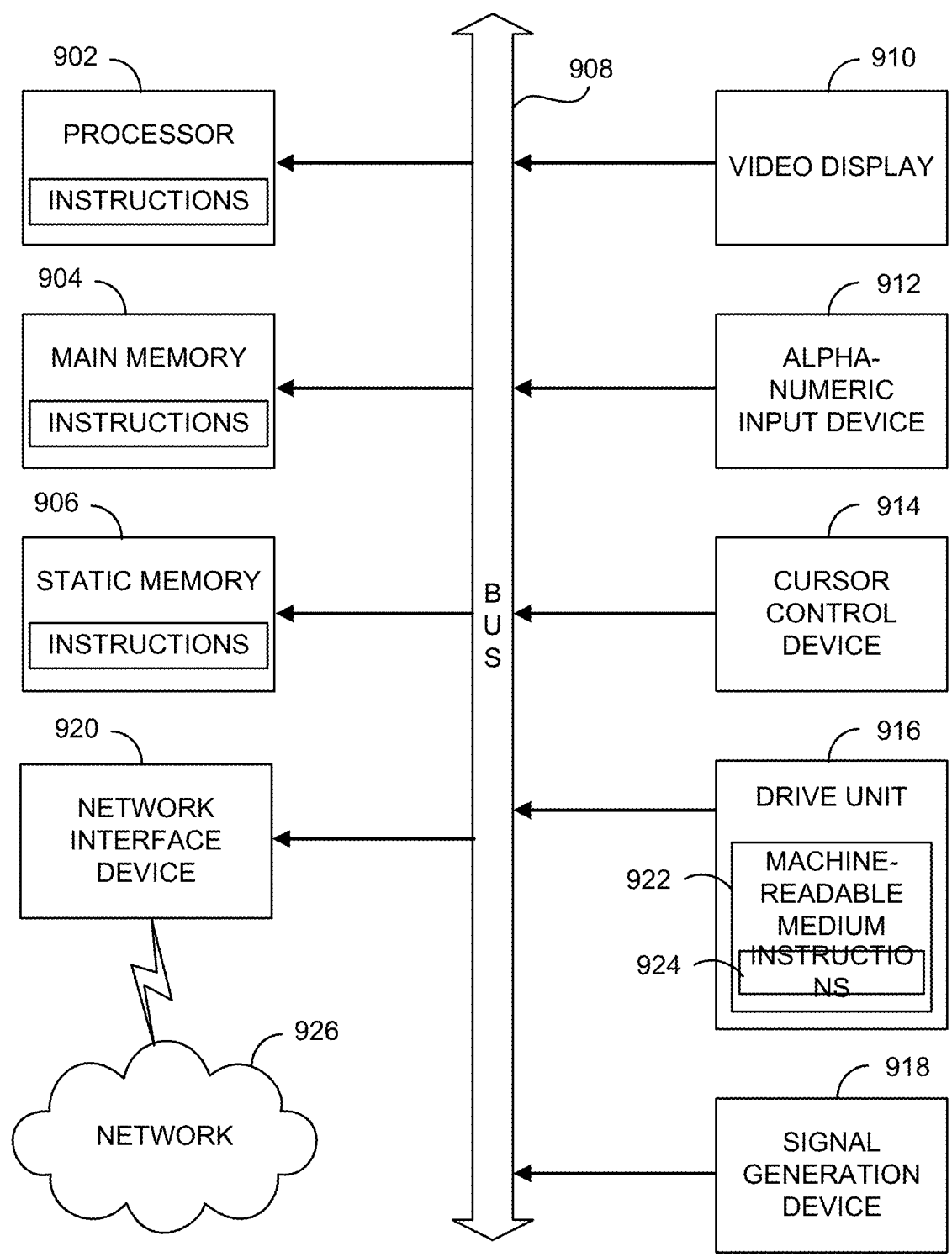
FIG. 56 is a block diagram of a computer system suitable for implementing embodiments of the present invention.

FIG. 56 is a block diagram of a user computer 1900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer 1900 includes a processor 1902 (e.g., a central processing unit (CPU), a graphics processing unit (GPU) or both), a main memory 1904 and a static memory 1906, which communicate with each other via a bus 1908. The computer 1900 may further include a video display unit 1910 (e.g., a liquid crystal display (LCD) or a cathode ray tube (CRT)). The computer 1900 also includes an alphanumeric input device 1912 (e.g., a keyboard), a user interface (UI) navigation device 1914 (e.g., a mouse), a disk drive unit 1916, a signal generation device 1918 (e.g., a speaker) and a network interface device 1920.

The disk drive unit 1916 includes a machine-readable medium 1922 on which is stored one or more sets of instructions and data structures (e.g., software 1924) embodying or utilized by any one or more of the methodologies or functions described herein. The software 1924 may also reside, completely or at least partially, within the main memory 1904 and/or within the processor 1902 during execution thereof by the computer 1900, the main memory 1904 and the processor 1902 also constituting machine-readable media. The software 1924 may further be transmitted or received over a network 1926 via the network interface device 1920 utilizing any one of a number of well-known transfer protocols (e.g., HTTP).

Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, computer 1900 may include a variety of components, modules and/or systems for providing various types of functionality. For example, in at least one embodiment, computer 1900 may include a Web browser application which is operable to process, execute, and/or support the use of scripts (e.g., JavaScript, AJAX, etc.), Plug-ins, executable code, virtual machines, HTML5 vector-based web animation (e.g., Adobe Flash), etc. The Web browser application may be configured to instantiate components and/or objects at the computer in response to processing scripts, instructions, and/or other information received from a remote server such as a Web server.

Figure 57:
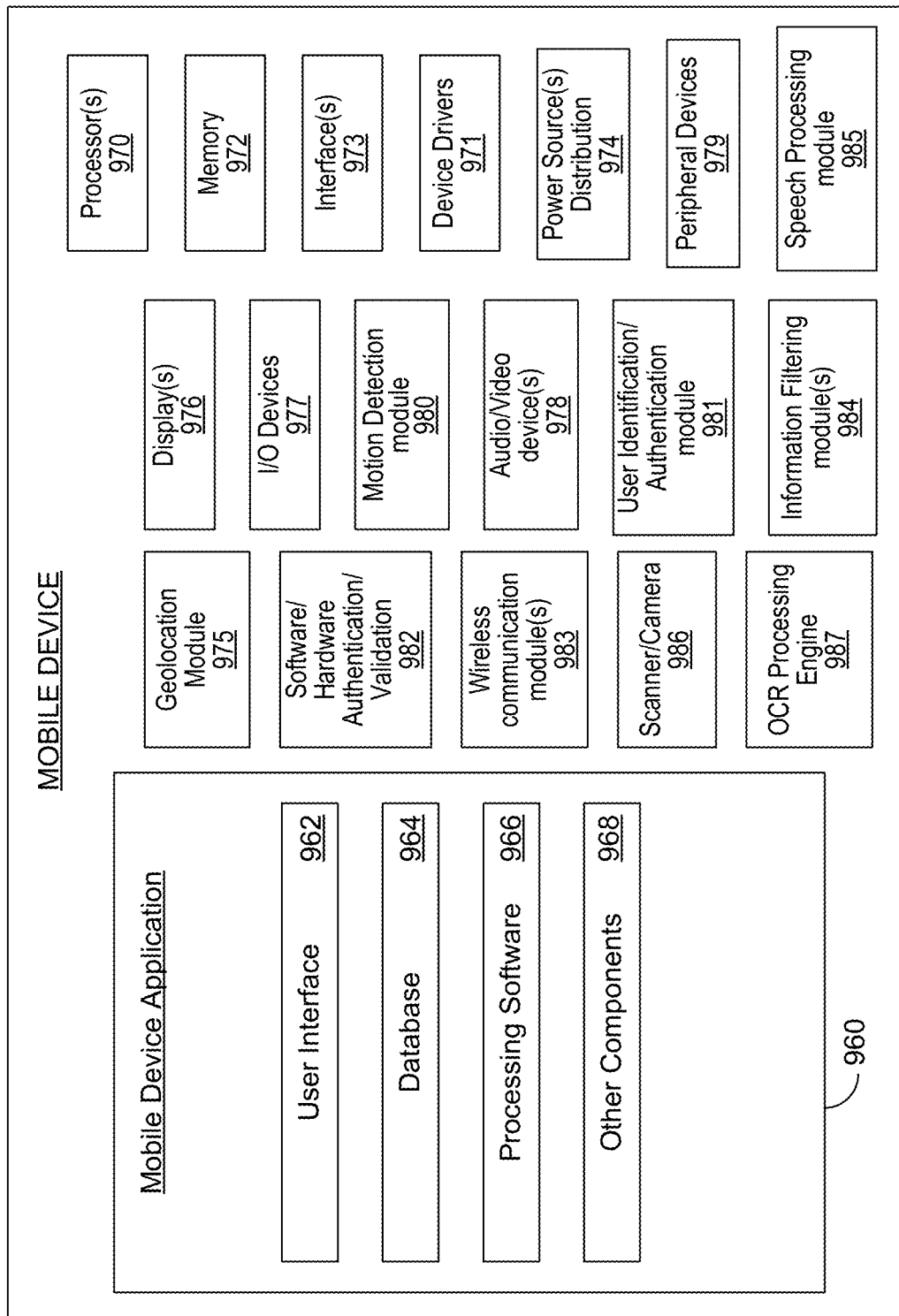
FIG. 57 is a block diagram of a mobile device suitable for implementing embodiments of the present invention.

FIG. 57 is a simplified block diagram of an example mobile device 1950. Mobile device 1950 may include mobile device application 1960 which includes a user interface 1962, a database 1964, processing software 1966, and other components 1968 for enabling the mobile device to perform various types of functions such as those described herein.

Various functionalities of the mobile device may be performed by one or more of the following components: processor(s) 1970; device drivers 1971; memory 1972; interface(s) 1973; power source(s)/distribution 1974; geo-location module 1975; display(s) 1976; I/O devices 1977; audio/video devices(s) 1978; peripheral devices 1979; motion detection module 1980; user identification/authentication module 1981; software/hardware authentication/validation 1982; wireless communication module(s) 1983; information filtering module(s) 1984; speech processing module 1985; scanner/camera 1986; and OCR processing engine 1987.

Memory 1972 may include volatile memory (e.g., RAM) as well as non-volatile memory (e.g., persistent storage, disk memory, FLASH memory, EPROMs, unalterable memory etc.) implemented on a machine-readable medium. Interface(s) 1973 may include wired interfaces or wireless interfaces. The wireless communication interfaces may be configured or designed to communicate with computers, remote servers, other wireless devices. Such wireless communication may be implemented using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Geolocation module 1975 acquires geolocation information from remote sources and uses the acquired geolocation information to determine information relating to a relative or absolute position of the mobile device.

Motion detection component 1980 detects motion or movement of the mobile device and detects motion, movement, gestures or other input data from user. The motion detection component 1980 may include one or more motion detection sensors such as MEMS (Micro Electro Mechanical System) accelerometers that can detect the acceleration or other movements of the mobile device as it is moved by a user. I/O Device(s) 1977 include keys, buttons, scroll wheels, cursors, touchscreen sensors, audio command interfaces, a magnetic strip reader, an optical scanner, etc. Audio/video device(s) 1978 include cameras, speakers, microphones, wireless transmitter/receiver devices for enabling wireless audio and/or visual communication between the mobile device and remote devices (e.g., radios, telephones, computer systems, etc.). Peripheral devices 1979 include memory card readers, fingerprint readers, image projection devices, etc. Wireless communication module 1983 may be configured to communicate with external devices using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Scanner/Camera 1986 may be use in scanning identifiers or other content from other devices or objects such as mobile device displays, computer displays, static displays (e.g., printed on tangible mediums), etc. OCR Processing Engine 1987 is operable to perform image processing and optical character recognition of images such as those captured by a mobile device camera, for example. Speech processing module 1985 performs speech recognition, speech-to-text conversion, etc.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of managing a queue in an online virtual reality session, said method comprising:
   facilitating an online virtual reality session between a host and a plurality of participants, said host having a host audio feed from a host computer that is not muted;
   displaying avatars of said host and said participants in a virtual reality room of said virtual reality session;
   ordering said participants in a queue based upon a time that each of said participants is admitted to said session, a first participant being first in said queue and having a first audio feed from a first computer that is not muted, said participants other than said first participant each having an audio feed that is muted, and displaying said queue in said virtual reality room before receiving an indication from said host computer that said host has made a selection to advance said queue;
   un-muting a second audio feed from a second computer of a second participant who is second in said queue;
   moving said first participant to the end of said queue and muting said first audio feed;
   reordering said participants in said queue such that each participant moves up one position in said queue, and displaying said reordered queue in said virtual reality room; and
   receiving input data from said first computer of said first participant after said step of moving indicating an estimated time of a question of said first participant.

2. A method of managing a queue in an online virtual reality session, said method comprising:
   facilitating an online virtual reality session between a host and a plurality of participants, said host having a host audio feed from a host computer that is not muted;
   displaying avatars of said host and said participants in a virtual reality room of said virtual reality session;
   ordering said participants in a queue based upon a time that each of said participants is admitted to said session, a first participant being first in said queue and having a first audio feed from a first computer that is not muted, said participants other than said first participant each having an audio feed that is muted, and displaying said queue in said virtual reality room before receiving an indication from said host computer that said host has made a selection to advance said queue;
   un-muting a second audio feed from a second computer of a second participant who is second in said queue;
   moving said first participant to the end of said queue and muting said first audio feed;
   reordering said participants in said queue such that each participant moves up one position in said queue, and displaying said reordered queue in said virtual reality room; and
   receiving input data from said first computer of said first participant after said step of moving indicating a subject of a question of said first participant.

3. A method of managing a queue in an online virtual reality session, said method comprising:
   facilitating an online virtual reality session between a host and a plurality of participants, said host having a host audio feed from a host computer that is not muted;
   displaying avatars of said host and said participants in a virtual reality room of said virtual reality session;
   ordering said participants in a queue based upon a time that each of said participants is admitted to said session, a first participant being first in said queue and having a first audio feed from a first computer that is not muted, said participants other than said first participant each having an audio feed that is muted, and displaying said queue in said virtual reality room before receiving an indication from said host computer that said host has made a selection to advance said queue;
   un-muting a second audio feed from a second computer of a second participant who is second in said queue;
   moving said first participant to the end of said queue and muting said first audio feed;
   reordering said participants in said queue such that each participant moves up one position in said queue, and displaying said reordered queue in said virtual reality room; and displaying on said first computer of said first participant after said step of moving an estimated wait time based upon the sum of estimated times of a question of each of said other participants.

* * * * *